United States Patent
Kim et al.

(10) Patent No.: US 11,197,194 B2
(45) Date of Patent: Dec. 7, 2021

(54) METHOD AND DEVICE FOR IMPROVED COMMUNICATION PERFORMANCE IN WIRELESS COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR); Sangbum Kim, Suwon-si (KR); Seungri Jin, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/959,659

(22) PCT Filed: Jan. 7, 2019

(86) PCT No.: PCT/KR2019/000197
§ 371 (c)(1),
(2) Date: Jul. 1, 2020

(87) PCT Pub. No.: WO2019/135649
PCT Pub. Date: Jul. 11, 2019

(65) Prior Publication Data
US 2021/0084534 A1    Mar. 18, 2021

(30) Foreign Application Priority Data

Jan. 5, 2018  (KR) .................. 10-2018-0001821
Mar. 28, 2018  (KR) .................. 10-2018-0036079

(51) Int. Cl.
*H04W 28/06*    (2009.01)
*H04L 29/06*    (2006.01)

(52) U.S. Cl.
CPC ............. *H04W 28/06* (2013.01); *H04L 69/04* (2013.01)

(58) Field of Classification Search
None
See application file for complete search history.

(56) References Cited

U.S. PATENT DOCUMENTS 10,462,700 B2 * 10/2019 Cho .................. H04W 28/02
2014/0211620 A1 7/2014 Kubota et al.
(Continued)

FOREIGN PATENT DOCUMENTS

KR    10-2019-0060410 A    6/2019

OTHER PUBLICATIONS

"3rd Generation Partnership Project; Technical Specification Group Radio Access Network; Evolved Universal Terrestrial Radio Access (E-UTRA); Packet Data Convergence Protocol (PDCP) specification (Release 14)", 3GPP TS 36.323 V14.4.0 (Sep. 2017), 43 pages.
(Continued)

*Primary Examiner* — Diane L Lo

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, health care, digital education, retail, security, and safety related services, and the like) on the basis of 5G communication technology and IoT-related technology. Disclosed is an operating method of a terminal, comprising the steps of: receiving, from a base station, a radio resource control (RRC) message including information for indicating whether to use uplink data compression (UDC); receiving data from an upper application layer of the terminal; compressing the data and encoding the compressed data; generating an uplink data compression (UDC) header and a service data adaption protocol (SDAP) header together; generating a block to which the UDC header and the SDAP header are bonded in
(Continued)

the encoded data; and transmitting the block to a lower layer of the terminal.

15 Claims, 42 Drawing Sheets

(56) References Cited

U.S. PATENT DOCUMENTS

| | | | |
|---|---|---|---|
| 2016/0142518 A1 | 5/2016 | Raina et al. | |
| 2019/0097936 A1* | 3/2019 | Yang | H04W 28/0268 |
| 2019/0124181 A1* | 4/2019 | Park | H04W 74/0833 |
| 2019/0141567 A1* | 5/2019 | Liu | H04L 69/04 |

OTHER PUBLICATIONS

"3rd Generation Partnership Project; Technical Specification Group Radio Access Network; E-UTRA and NR; Service Data Adaptation Protocol (SDAP) specification (Release 15)", 3GPP TS 37.324 V1.1.1 (Nov. 2017), 11 pages.

Huawei, HiSilicon, "Discussion on UDC functionality in PDCP layer", 3GPP TSG RAN2 Meeting #100, Nov. 27-Dec. 1, 2017, R2-1712722, 3 pages.

Catt, "Introduction of DEFLATE based UDC Solution", 3GPP TSG-RAN2 Meeting #100, Nov. 27-Dec. 1, 2017, R2-1714278, 12 pages.

International Search Report dated Apr. 12, 2019 in connection with International Patent Application No. PCT/KR2019/000197, 3 pages.

Written Opinion of the International Searching Authority dated Apr. 12, 2019 in connection with International Patent Application No. PCT/KR2019/000197, 5 pages.

Supplementary European Search Report in connection with European Application No. 19736168.6 dated Oct. 29, 2020, 11 pages.

Huawei et al., "ROHC," R2-1705214, 3GPP TSG RAN WG2 Meeting #98, Hangzhou, China, May 15-19, 2017, 3 pages.

* cited by examiner

RRC state mismatch problem

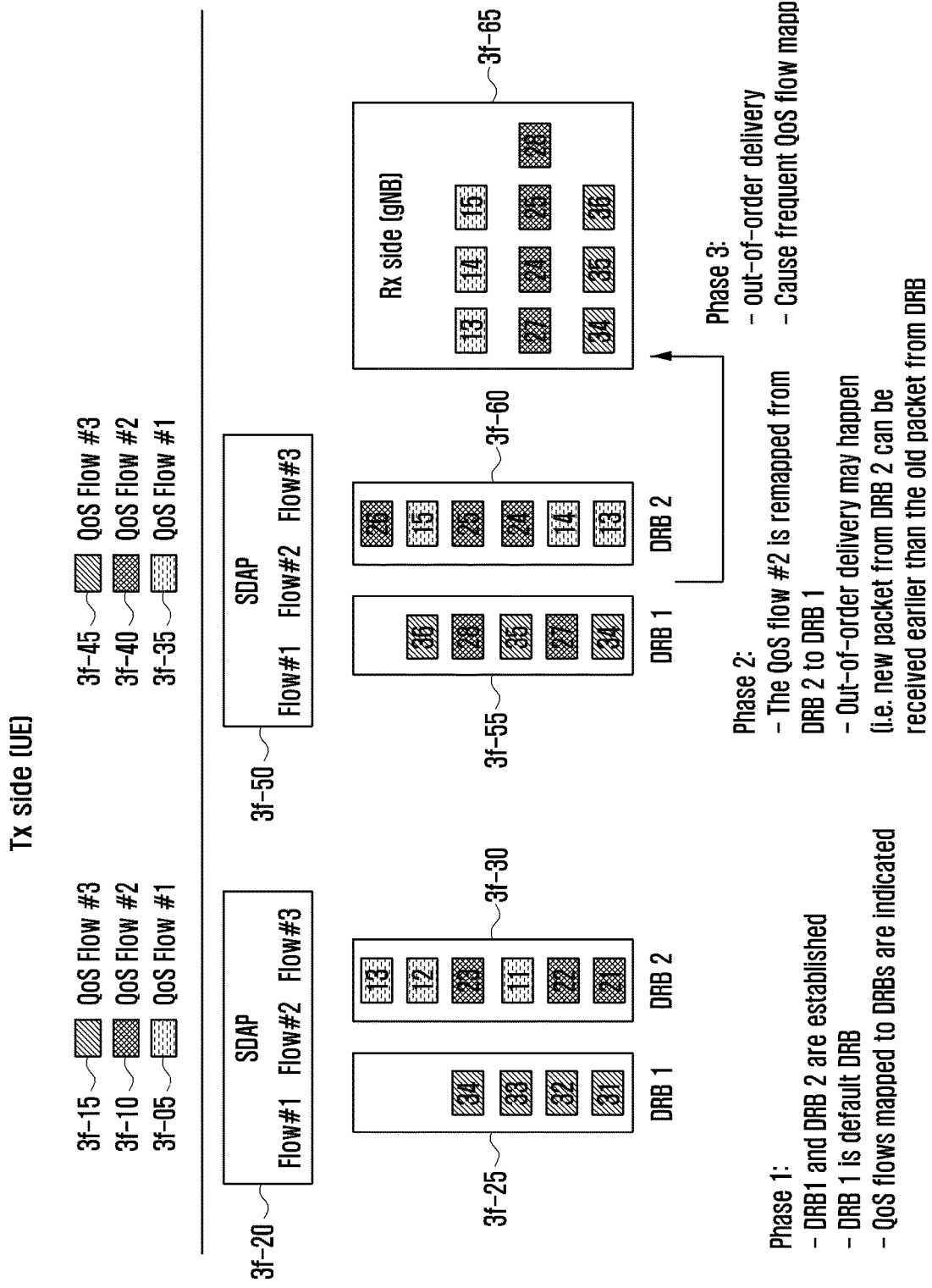

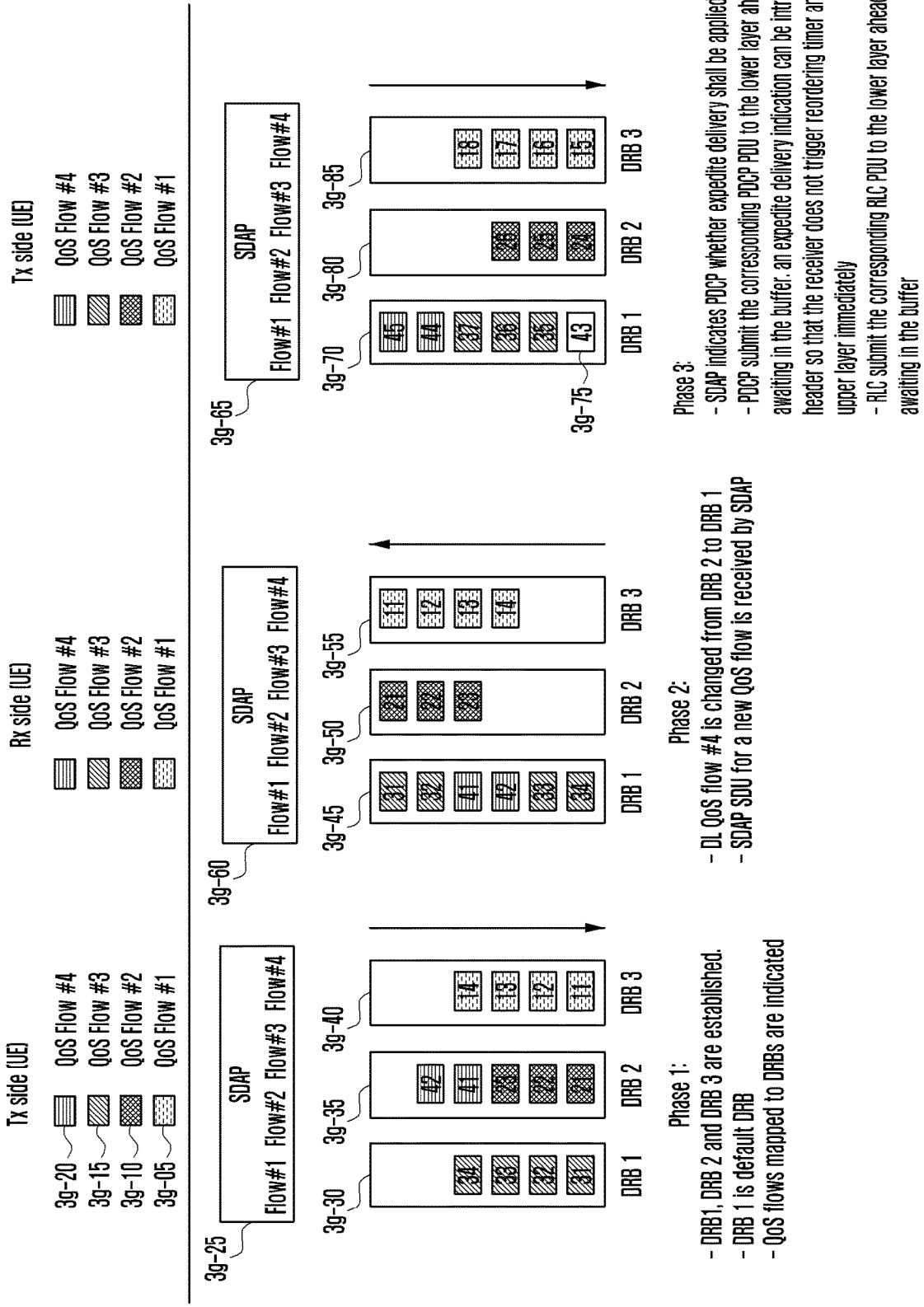

METHOD AND DEVICE FOR IMPROVED COMMUNICATION PERFORMANCE IN WIRELESS COMMUNICATION SYSTEM

CROSS-REFERENCE TO RELATED APPLICATIONS

This application is a 371 of International Application No. PCT/KR2019/000197 filed on Jan. 7, 2019, which claims priority to Korean Patent Application No. 10-2018-0001821 filed on Jan. 5, 2018 and Korean Patent Application No. 10-2018-0036079 filed on Mar. 28, 2018, the disclosures of which are herein incorporated by reference in their entirety.

BACKGROUND

1. Field

The disclosure relates to a next-generation wireless communication system. The disclosure relates to a terminal and a base station in a mobile communication system. In addition, the disclosure relates to a data compression processing header non-encryption method and device in a next-generation mobile communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a "Beyond 4G Network" or a "Post LTE System". The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (RAN) as the above-described big data processing technology may also be considered an example of convergence of the 5G technology with the IoT technology.

The technical problem to be achieved in the embodiment of the disclosure is to provide a method and device for providing improved communication performance in a next-generation wireless communication system.

In addition, the technical problem to be achieved in the embodiment of the disclosure is to provide a method that supports a variety of implementation structures on the base station side in a next-generation mobile communication system and is capable of reducing the processing burden on the terminal for supporting a service having a high data rate and a low transmission delay on the terminal side.

Unlike the existing LTE, the next-generation mobile communication system provides flow-based quality of service (QoS) and introduces a new QoS layer (service data adaption protocol (SDAP)), which indicates the change of the flow mapping rule in the access stratum (AS) and the non-access stratum (NAS) to the wireless protocols of the terminal and the base station in the user packet. However, the base station cannot recognize that a new QoS flow has been transmitted until the first packet of the new QoS flow transmitted by the terminal arrives, and thus, if there is a lot of buffered data in the data radio bearer (DRB), the delay in transmission of the first packet may be longer. To this end, the technical problem to be achieved in the embodiment of the disclosure is to provide a method for processing by the terminal so that the scheduler of the base station can quickly recognize and process the reception of the new QoS flow, and for ensuring in-sequence delivery when performing QoS re-mapping in response to a change in a DRB.

SUMMARY

An embodiment of the disclosure may provide an operation method of a terminal, the method including: receiving, from a base station, a radio resource control (RRC) message including information indicating whether to use uplink data compression (UDC); receiving data from an upper application layer of the terminal; compressing the data and encrypting the compressed data; generating an uplink data compression (UDC) header and a service data adaptation protocol (SDAP) header together; generating a block to which the UDC header and the SDAP header are bonded in the encrypted data; and transmitting the block to a lower layer of the terminal.

In addition, according to an embodiment of the disclosure, there may be provided a terminal including: a transceiver, and a controller configured to control to receive a radio resource control (RRC) message including information indicating whether to use uplink data compression (UDC) from a base station, receive data from an upper application layer of the terminal, compress the data and encrypt the compressed data, generate an uplink data compression (UDC) header and a service data adaptation protocol (SDAP) header together, generate a block to which the UDC header and the SDAP header are bonded in the encrypted data, and transmit the block to a lower layer of the terminal.

In addition, according to an embodiment of the disclosure, there may be provided an operation method of a base station including: transmitting a radio resource control (RRC) message including information indicating whether to use uplink data compression (UDC) to a terminal; receiving first data from the terminal; obtaining an uplink data compression (UDC) header and a service data adaptation protocol (SDAP) header that are bonded in the first data; decoding and decompressing second data from which the UDC header and the SDAP header are removed; and transmitting the decompressed second data to an upper layer of the base station.

In addition, according to an embodiment of the disclosure, there may be provided a base station including: a transceiver, and a controller configured to control to transmit a radio resource control (RRC) message including information indicating whether to use uplink data compression (UDC) to a terminal, receive first data from the terminal, obtain an uplink data compression (UDC) header and a service data adaptation protocol (SDAP) header, which are bonded in the first data, decode and decompress second data from which the UDC header and the SDAP header are removed, and transmit the decompressed second data to an upper layer of the base station.

The technical problems to be achieved in the disclosure are not limited to the technical problems mentioned above, and other technical problems that are not mentioned will be clearly understood by those skilled in the art from the following description.

According to an embodiment of the disclosure, it is possible to provide a method and device for providing improved communication performance in a next-generation wireless communication system.

In addition, according to an embodiment of the disclosure, it is possible to provide a header-processing method for compressing user data and headers of an SDAP-layer device and a packet data convergence protocol (PDCP)-layer device, which makes it easy to realize various implementations of a base station and is capable of reducing the processing burden on a terminal.

In addition, according to an embodiment of the disclosure, by suggesting a structure in which a flow-based QoS is supported by the wireless interface and the first packet can be preferentially transmitted for the new QoS flow in a next-generation mobile communication system, the QoS change can be quickly identified. In addition, according to an embodiment of the disclosure, when a QoS flow is transmitted to the new DRB in response to a terminal operation, in-sequence delivery is guaranteed, so that frequent QoS flow update operations, which may occur during out-of-sequence delivery, can be reduced, thereby reducing computational complexity at the receiving end.

BRIEF DESCRIPTION OF THE DRAWINGS

FIG. 2O is a view for proposing and explaining a method of generating an SDAP header for data received from an upper layer and not applying a user data compression (UDC) procedure to the SDAP header in a PDCP-layer device according to an embodiment of the disclosure;

FIG. 3EB is a view showing a protocol stack including SDAP in NR according to an embodiment of the disclosure;

FIG. 3F is a view for explaining problems and issues when a first packet of a new QoS flow in a specific DRB is received in a delayed manner, considered in an embodiment of the disclosure;

FIG. 3G is a view for explaining a method of preferentially processing a corresponding SDAP packet when a new QoS flow is received in the receiving SDAP layer of the terminal according to Embodiment 3-1 of the disclosure;

DETAILED DESCRIPTION

Hereinafter, the operation principle of the disclosure will be described in detail in conjunction with the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made based on the contents throughout the specification.

In the following description of the disclosure, a detailed description of known functions or configurations incorporated herein will be omitted when it may make the subject matter of the disclosure rather unclear.

In the following description, terms for identifying access nodes, terms referring to network entities, terms referring to messages, terms referring to interfaces between network entities, terms referring to various identification information, and the like are illustratively used for the sake of convenience. Therefore, the disclosure is not limited by the terms as used below, and other terms referring to subjects having equivalent technical meanings may be used.

In the following description, the disclosure uses terms and names defined in 3rd generation partnership project long term evolution (3GPP LTE) standards for the convenience of description. However, the disclosure is not limited by these terms and names, and may be applied in the same way to systems that conform other standards. In the disclosure, the term "eNB" may be interchangeably used with the term "gNB". That is, a base station described as "eNB" may indicate "gNB".

First Embodiment

Figure 1A:
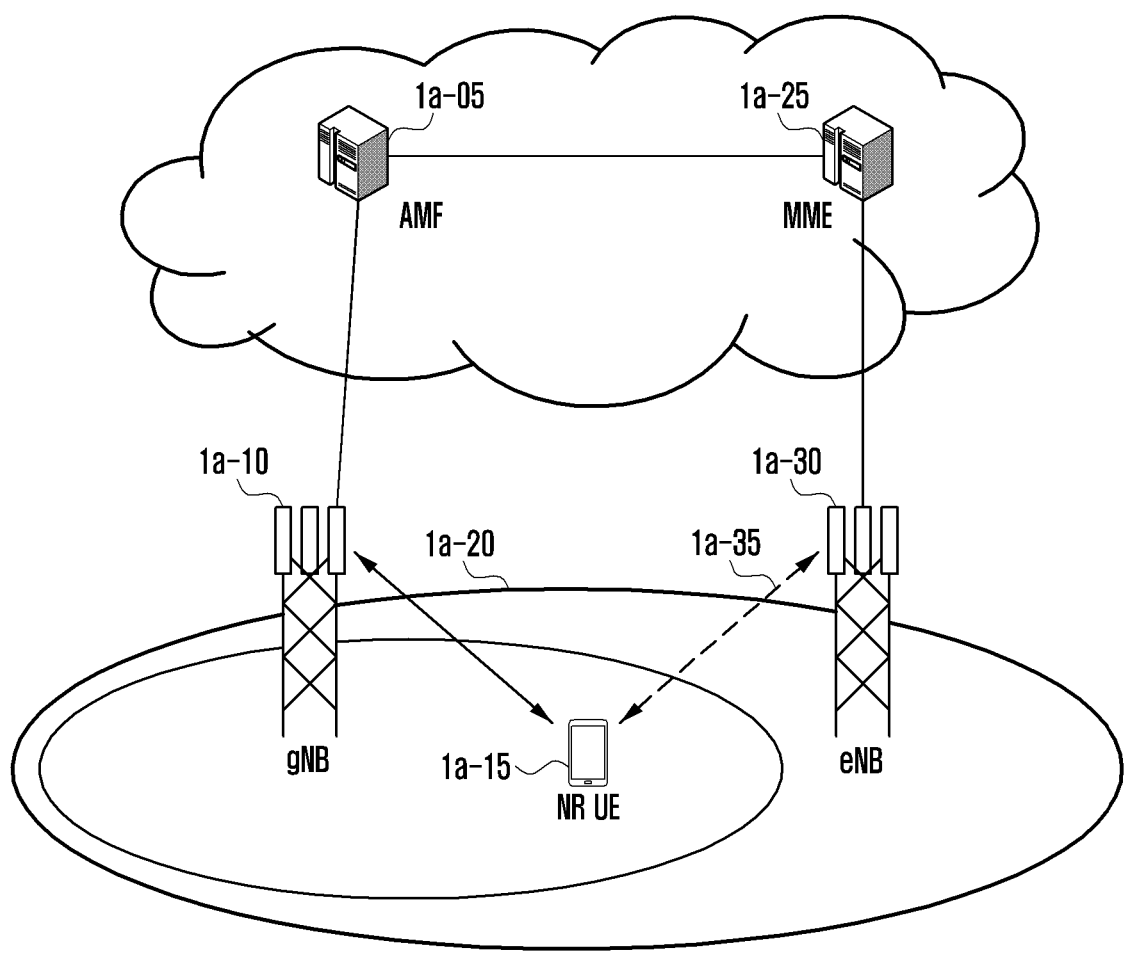
FIG. 1A is a view illustrating the structure of a next-generation mobile communication system.

FIG. 1A is a view illustrating the structure of a next-generation mobile communication system.

Referring to FIG. 1A, as illustrated, the radio access network of the next-generation (new-radio (NR)) mobile communication system is composed of a next-generation base station (new-radio node B, hereinafter "gNB") 1a-10 and a new-radio core network (AMF) 1a-05. A user terminal (new-radio user equipment, hereinafter, "NR UE" or "terminal") 1a-15 is connected to an external network via the gNB 1a-10 and the AMF 1a-05.

In FIG. 1A, the gNB 1a-10 corresponds to the evolved node B (eNB) 1a-30 of the existing LTE system. The gNB 1a-10 is connected to the NR UE 1a-15 via a radio channel, and can provide service superior to that of the existing Node B 1a-20. In the next-generation mobile communication system, since all user traffic is served via a shared channel, a device for performing scheduling by collecting state information, such as the buffer state of the UEs, available transmission power state, and channel state, is required, and the gNB 1a-10 is in charge thereof. One gNB usually controls multiple cells. In order to implement ultra-high speed data transmission compared to the existing LTE, bandwidth wider than the existing maximum bandwidth may be supported, and an orthogonal frequency-division multiplexing (hereinafter referred to as "OFDM") method may be additionally applied the beamforming technology using radio access technology. In addition, an adaptive modulation and coding (hereinafter referred to as AMC) method for determining the modulation scheme and the channel-coding rate according to the channel condition of a terminal is applied. The AMF 1a-05 performs functions such as mobility support, bearer configuration, and QoS configuration. The AMF 1a-05 is a device that is responsible for various control functions as well as mobility management functions for a terminal, and is connected to multiple base stations. In addition, the next-generation mobile communication system may be linked with an existing LTE system, and the AMF 1a-05 may be connected to an MME 1a-25 through a network interface. The MME 1a-25 is connected to the existing base station eNB 1a-30. The terminal 1a-15 supporting LTE-NR dual connectivity can transmit and receive data, while maintaining a connection to the eNB 1a-30 as well as the gNB 1a-10 (1a-35).

Figure 1B:
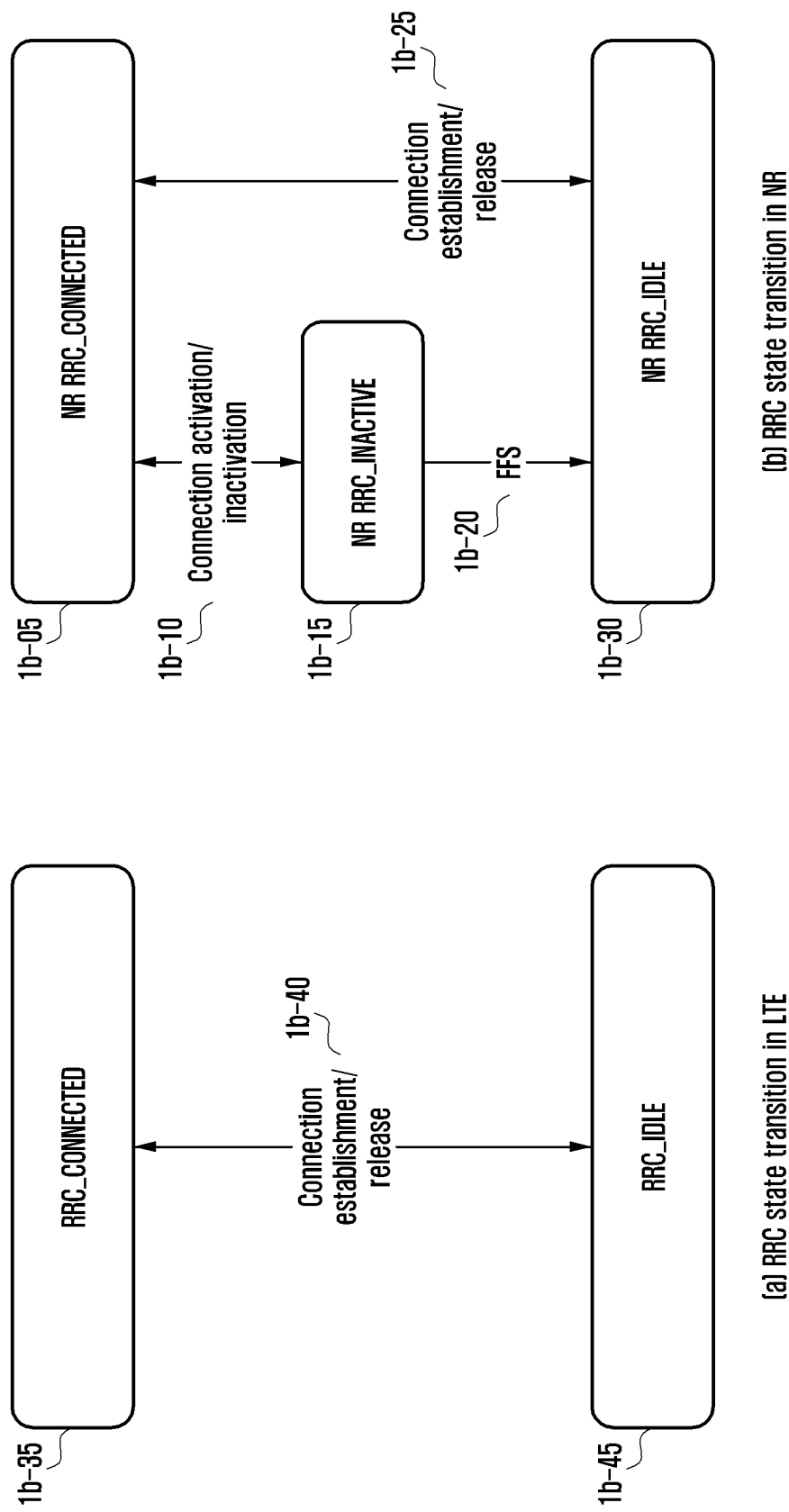
FIG. 1B is a view for explaining wireless connection state transition in a next-generation mobile communication system.

FIG. 1B is a view for explaining wireless connection state transition in a next-generation mobile communication system according to an embodiment of the disclosure.

In the existing LTE system, there are two wireless connection modes, namely a connected mode (or RRC connected mode) 1b-35 and an idle mode (or RRC idle mode) 1b-45. Switching between the two modes (1b-40) is performed via an establishment procedure and a release procedure.

In contrast, the next-generation mobile communication system has three wireless connection (RRC) states. The connected mode (or RRC_CONNECTED) 1b-05 is a wireless connection state in which a terminal can transmit and receive data. The idle mode (or RRC_IDLE) 1b-30 is a wireless access state in which the terminal monitors whether paging is transmitted to itself. The two modes are radio access states that are also applied to the existing LTE system, and the detailed technology is the same as that of the existing LTE system. In the next-generation mobile communication system, an inactive mode (RRC_INACTIVE) 1b-15 radio access state has been newly defined. In this radio access state, the UE context is maintained at the base station and the terminal, and RAN-based paging is supported. The characteristics of the new wireless connection state are as follows.

Cell re-selection mobility;
CN-NR RAN connection (both C/U-planes) has been established for UE;
The UE AS context is stored in at least one gNB and the UE;
Paging is initiated by NR RAN;
RAN-based notification area is managed by NR RAN;
NR RAN knows the RAN-based notification area to which the UE belongs The new INACTIVE wireless connection state may transition to a connection mode or a standby mode using a specific procedure. Depending on the connection activation, it is switched from an INACTIVE mode to a connected mode, and it is switched from the connected mode to the INACTIVE mode using the connection inactivation procedure (1b-10). The connection activation/inactivation procedure is characterized in that one or more RRC messages are transmitted and received between the terminal and the base station, and consist of one or more steps. It is also possible to switch from an INACTIVE mode to a standby mode according to a specific procedure (1b-20). Various methods such as specific message exchange or timer-based or event-based methods may be considered as the above-mentioned specific procedure. Switching between the connected mode and the standby mode can follow the existing LTE technology. That is, switching between the modes may be performed through a connection establishment or release procedure (1b-25).

Figure 1C:
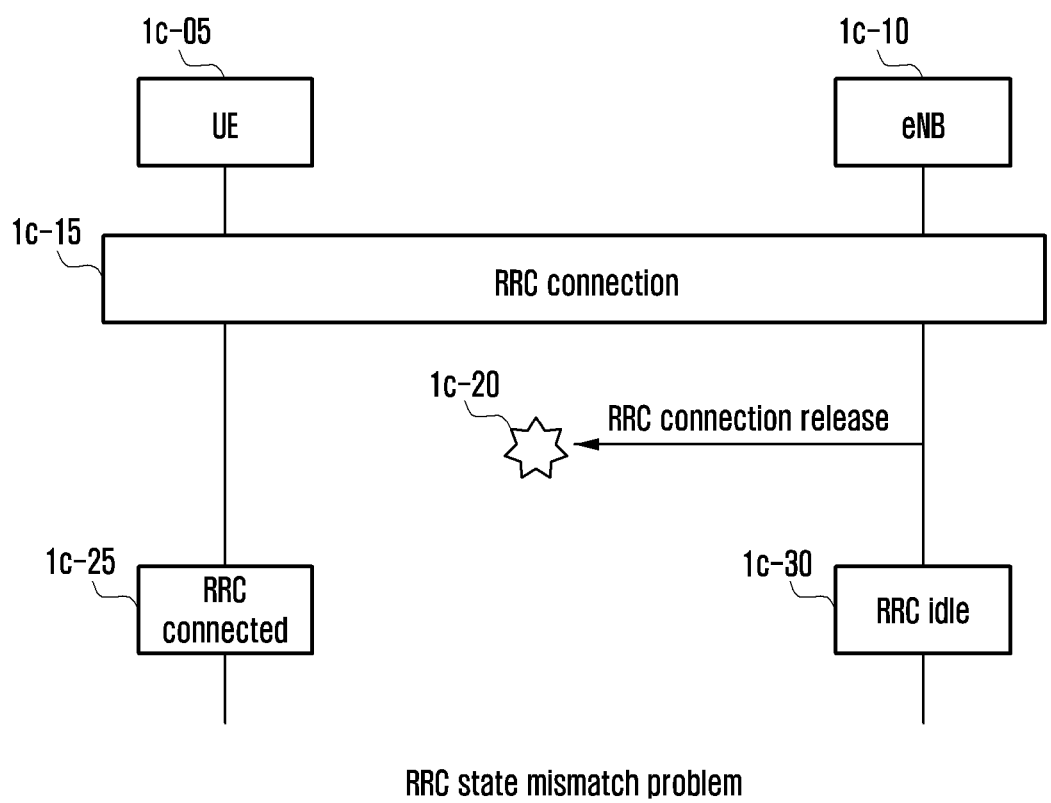
FIG. 1C is a view for explaining a phenomenon in which a radio access state is inconsistent in an LTE system.

FIG. 1C is a view for explaining a phenomenon in which a radio access state is inconsistent in an LTE system according to an embodiment of the disclosure.

The terminal 1c-50 is in a connected state with a base station 1c-10 (1c-15). The base station 1c-10 transmits an RRC connection release message to the terminal 1c-05 in order to transit the terminal 1c-05 to an idle mode. However, the radio channel is not good, and the terminal 1c-05 might not receive the message (1c-20). In the existing standard technology, the base station 1c-10 does not wait for hybrid automatic repeat request (HARQ) feedback for the message, and immediately assumes that the terminal 1c-05 has been switched to the idle mode (1c-30). Conversely, since the terminal 1c-05 has not received the release message, the terminal 1c-05 still maintains the connected mode (1c-25).

Figure 1D:
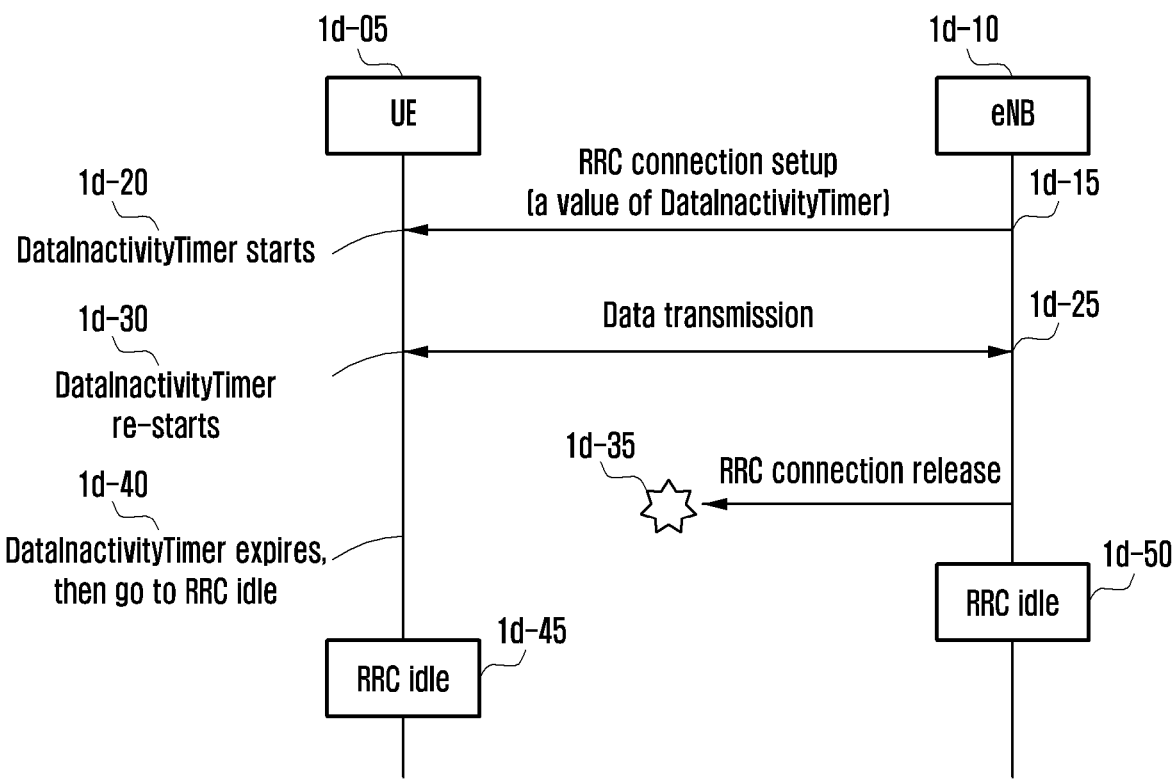
FIG. 1D is a view for explaining a method of dealing with a phenomenon in which a radio access state is inconsistent in an LTE system.

FIG. 1D is a view for explaining a method of dealing with a phenomenon in which a radio access state is inconsistent in an LTE system according to an embodiment of the disclosure.

In order to solve the above-described problem, one timer, DataInactivityTimer, is introduced in the LTE system. The timer is provided to a terminal 1d-05 using dedicated signaling. For example, a base station 1d-10 may include the timer information in the RRC connection setup message in the establishment procedure and provide the same to the terminal 1d-05 (1d-15). Upon receiving the timer information, the terminal 1d-05 drives the timer (1d-20). The timer restarts whenever data occurs in the uplink and downlink (1d-25). If the timer expires, the terminal 1d-05 automatically switches to the idle mode (1d-40). This solves the problem of inconsistency in the radio access state that may occur due to the terminal 1d-05 not receiving the release message (1d-35). Therefore, both the terminal 1d-05 and the base station 1d-10 are in the idle mode (1d-45, 1d-50).

An embodiment of the disclosure is characterized in that the RRC state to which the terminal should switch or the action to be performed is configured together with the existing DataInactivityTimer when the timer expires. In the next-generation mobile communication system, the RRC connection release message can be used to switch the connected-state terminal to the standby mode or the inactive mode. Therefore, when the timer expires, it may be effective to configure the RRC state to which to switch according to the intention of the network, rather than being switched to a fixed RRC state. For example, it is possible to minimize the signaling overhead that is required when switching back to the connected mode by switching to the inactive mode rather than batch switching to the idle mode.

In Embodiment 1-1, when DataInactivityTimer expires, the RRC state to which the terminal should switch is configured.

The network configures the timer for the terminal, and also configures the RRC state to which to switch when the timer expires. If the RRC state is an inactive mode, the network may provide parameters related to the inactive mode. The parameters may be I-RNTI, paging area configuration, and the like. Here, I-RNTI is an indicator for distinguishing between terminals in an inactive mode, and the paging area configuration is area information of a cell unit or a specific cell group unit in which paging provided to the terminal is transmitted. If the RRC state to which to switch is the standby mode, the network sends an RRC connection release message and then switches to the standby mode. After the timer expires, the terminal switches to the standby mode. If the RRC state to which to switch is an inactive mode, the network sends an RRC connection release message and then switches to the inactive mode. After the timer expires, the terminal switches to the inactive mode. If the RRC state to which to switch is an active mode and the parameters related to the inactive mode are not provided from the network, the terminal performs RRC connection establishment after releasing the existing connection in order to acquire the parameters. After transmitting the RRC connection release message, the network switches to the inactive mode, but responds to RRC connection establishment by the terminal.

In Embodiment 1-2, the operation that the terminal should perform when DataInactivityTimer expires is configured.

The network configures the timer for the terminal, and also configures the operation to be performed when the timer expires. If the operation to be performed is to switch to the standby mode, the network sends an RRC connection release message and then switches to the standby mode. After the timer expires, the terminal switches to the standby mode. If the operation to be performed is RRC connection establishment, the terminal performs RRC connection establishment after the timer expires. After transmitting the RRC connection release message, the network switches to the inactive mode, but responds to the RRC connection establishment of the terminal.

When dual connectivity is configured to transmit and receive data by connecting to multiple base stations, the DataInactivityTimer configuration is applied only to the MAC layer that manages the master eNB (MeNB). That is, if data transmission to the MeNB does not occur until the timer expires, the terminal performs the operation. On the other hand, if the data transmission to the secondary eNB (SeNB) does not affect the start or restart of the timer, or if the data transmission connected to the SeNB does not occur until the timer expires, the terminal does not perform the operation, and merely restarts the timer.

Figure 1E:
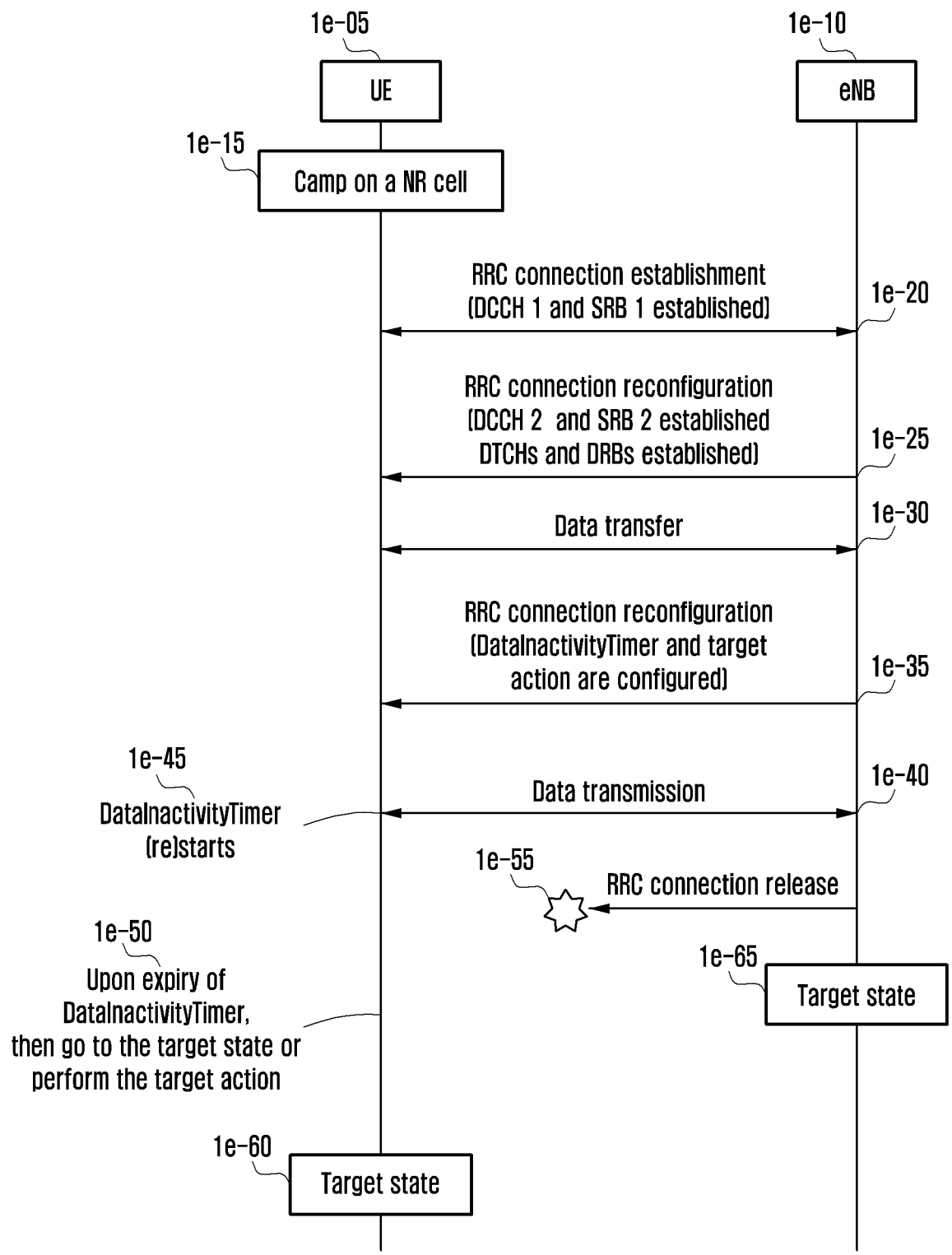
FIG. 1E is a flowchart of a process for dealing with a phenomenon in which a wireless connection state is inconsistent according to an embodiment of the disclosure.

FIG. 1E is a flowchart of a process for dealing with a phenomenon in which a wireless connection state is inconsistent according to an embodiment of the disclosure.

A terminal 1$e$-05 camps on one cell 1$e$-15. The terminal 1$e$-05 performs RRC connection establishment with a base station 1$e$-10 (1$e$-20). In the above process, a dedicated control channel (DCCH) 1 and a signaling radio bearer 1 (SRB) are configured. The base station 1$e$-10 configures DCCH 2 and SRB 2 for the terminal 1$e$-05 using the RRC connection reconfiguration message, and configures a dedicated traffic channel (DTCH) and DRB (1$e$-25). The terminal transmits and receives data to and from the base station through the established logical channel and radio bearer. A medium access control (MAC) layer receives or transmits a MAC service data unit (SDU) through the DCCH or DTCH.

At this time, the base station 1$e$-10 uses the RRC connection reconfiguration message to the terminal 1$e$-05 to configure the DataInactivityTimer and the RRC state to which the terminal 1$e$-05 should switch or the action to be performed (1$e$-35). The configuration may be provided to the terminal 1$e$-05 in the RRC connection establishment process as well as RRC connection reconfiguration. After configuration, the terminal 1$e$-05 starts a timer, and restarts the timer whenever data transmission/reception occurs (1$e$-45). If the RRC connection release message transmitted by the network is lost in the wireless transmission section (1$e$-55) and the timer expires, the terminal 1$e$-05 checks the configured RRC state to which to switch or the action to be performed (1$e$-50). Depending on the RRC state to which to switch or the operation to be performed, the operations of Embodiment 1-1 or Embodiment 1-2 are performed. In the end, the terminal 1$e$-05 and the base station 1$e$-10 maintain the same RRC state (1$e$-60, 1$e$-65).

Figure 1F:
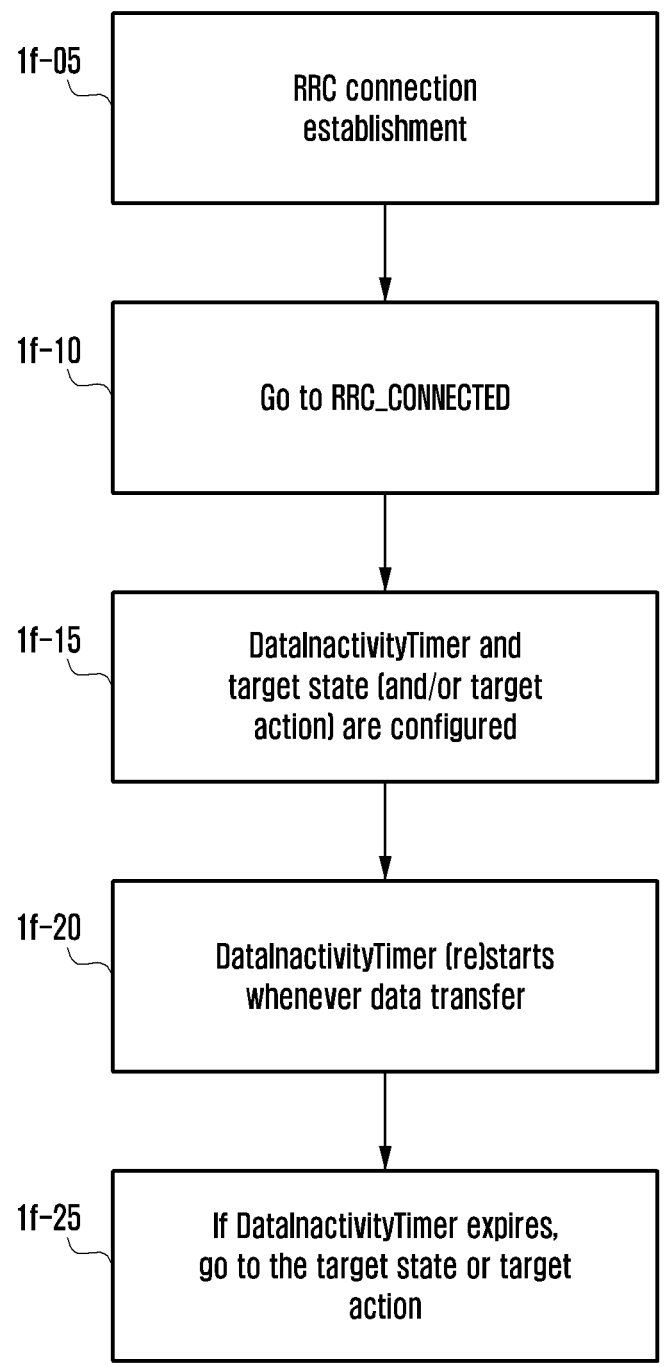
FIG. 1F is a flowchart showing the operation of a terminal according to an embodiment of the disclosure.

FIG. 1F is a flowchart showing the operation of a terminal according to an embodiment of the disclosure.

In operation 1$f$-05, a terminal performs RRC connection establishment with a base station.

In operation 1$f$-10, the terminal switches to the connected mode.

In operation 1$f$-15, the terminal receives a DataInactivityTimer and an RRC state that the UE needs in order to switch or an operation to be performed from the BS.

In operation 1$f$-20, the terminal starts a timer after the configuration, and restarts the timer whenever data transmission/reception occurs.

When the timer expires in operation 1$f$-25, the terminal identifies the configured RRC state to which to switch or an operation to be performed. Depending on the RRC state to which to switch or the operation to be performed, the operations of Embodiment 1-1 or Embodiment 1-2 are performed.

Figure 1G:
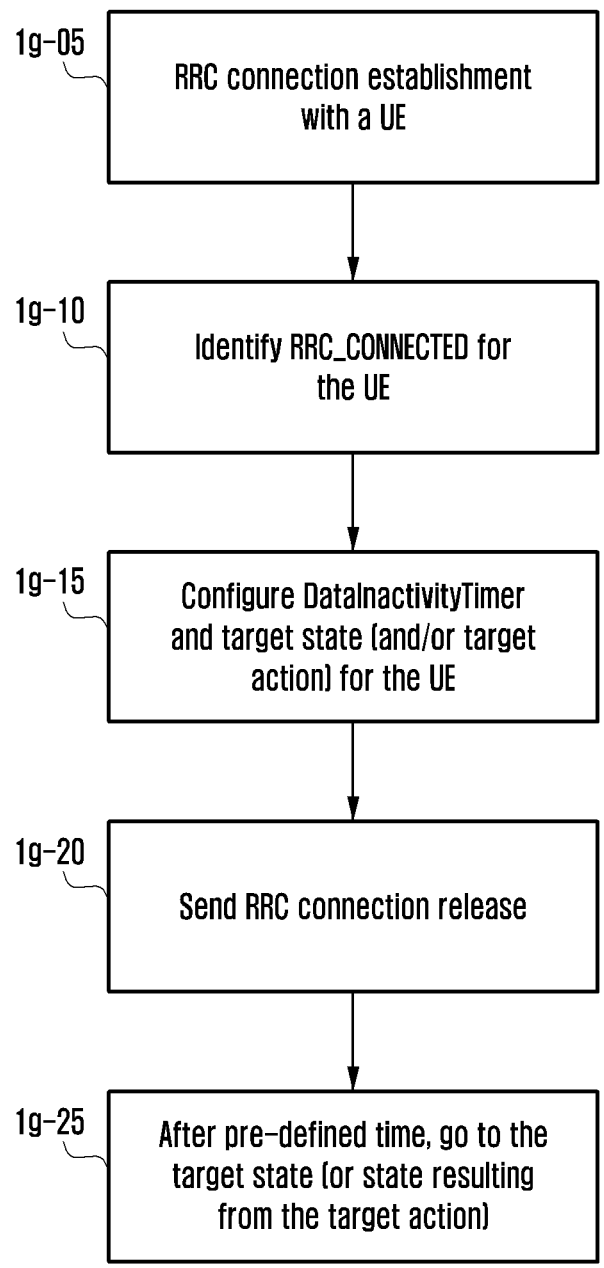
FIG. 1G is a flowchart showing the operation of a base station according to an embodiment of the disclosure.

FIG. 1G is a flowchart showing the operation of a base station according to an embodiment of the disclosure.

In operation 1$g$-05, a base station performs RRC connection establishment with a terminal.

In operation 1$g$-10, the base station recognizes that the terminal is switched to the connected mode.

In operation 1$g$-15, the base station configures the DataInactivityTimer and the RRC state to which the terminal should switch, or the operation to be performed, for the terminal.

In operation 1$g$-20, the base station transmits an RRC connection release message to the terminal.

In operation 1$g$-25, the base station switches the terminal to a specific RRC state after a certain time. If the base station configures the standby mode as the RRC state to which the terminal should switch, the base station transmits the RRC message, and after a specific time, the terminal switches to the standby mode. If the base station configures the inactive mode as the RRC state to which the terminal should switch, the base station transmits the RRC message, and after a certain time, the terminal is switched to the inactive mode.

Figure 1H:
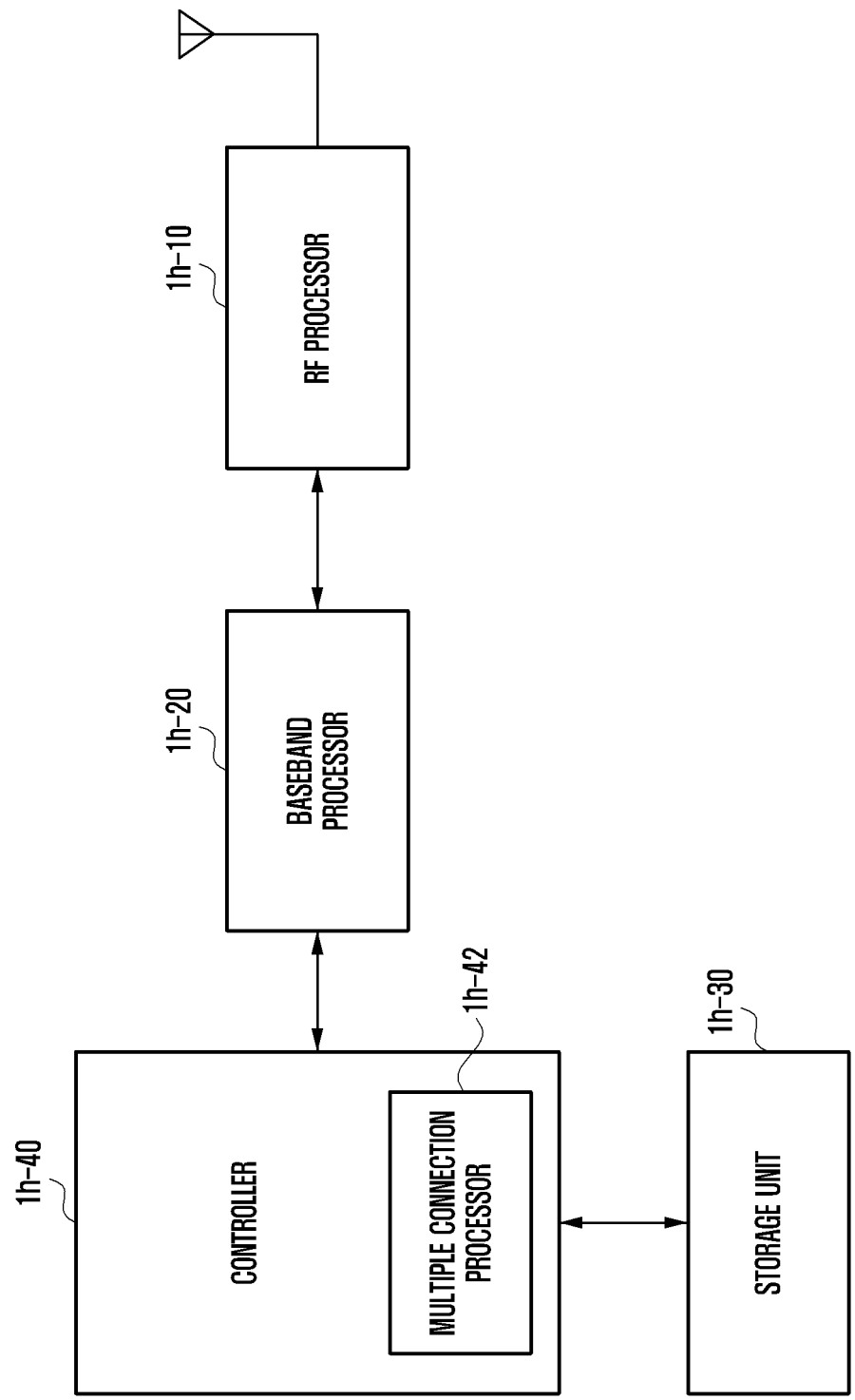
FIG. 1H is a view illustrating the configuration of a terminal according to an embodiment of the disclosure.

FIG. 1H is a view illustrating the configuration of a terminal according to an embodiment of the disclosure.

Referring to FIG. 1H, the terminal includes a radio-frequency (RF) processor 1$h$-10, a baseband processor 1$h$-20, a storage unit 1$h$-30, and a controller 1$h$-40. The controller 1$h$-40 may include a multiple-connection processor 1$h$-42.

The RF processor 1$h$-10 performs a function for transmitting and receiving a signal via a wireless channel, such as band conversion and amplification of the signal. That is, the RF processor 1$h$-10 up-converts a baseband signal provided from the baseband processor 1$h$-20 to an RF band signal and then transmits the same through an antenna, and down-converts an RF band signal received through the antenna to a baseband signal. For example, the RF processor 1$h$-10 may include a transmission filter, a reception filter, an amplifier, a mixer, an oscillator, a digital-to-analog converter (DAC), an analog-to-digital converter (ADC), etc. In FIG. 1H, although only one antenna is illustrated, the terminal may have multiple antennas. Also, the RF processor 1$h$-10 may include a plurality of RF chains. Furthermore, the RF processor 1$h$-10 may perform beamforming. For the beamforming, the RF processor 1$h$-10 may adjust the phase and magnitude of each of signals transmitted and received through multiple antennas or antenna elements. In addition, the RF processor may perform MIMO, and may receive multiple layers when performing MIMO operations.

The baseband processor 1h-20 performs a function of conversion between a baseband signal and a bit stream according to the physical-layer standard of a system. For example, during data transmission, the baseband processor 1h-20 generates complex symbols by encoding and modulating a transmission bit stream. In addition, upon receiving data, the baseband processor 1h-20 restores the received bit stream through demodulation and decoding of the baseband signal provided from the RF processor 1h-10. For example, in the case of conforming to an orthogonal frequency-division multiplexing (OFDM) method, when transmitting data, the baseband processor 1h-20 encodes and modulates a transmission bit stream to generate complex symbols, maps the complex symbols to subcarriers, and then configures OFDM symbols via an inverse fast Fourier transform (IFFT) operation and cyclic prefix (CP) insertion. In addition, when receiving data, the baseband processor 1h-20 divides the baseband signal provided from the RF processor 1h-10 into units of OFDM symbols, restores signals mapped to subcarriers via the fast Fourier transform (FFT) operation, and then restores a received bit stream via demodulation and decoding.

The baseband processor 1h-20 and the RF processor 1h-10 transmit and receive signals as described above. Accordingly, each of the baseband processor 1h-20 and the RF processor 1h-10 may be referred to as a transmitter, a receiver, a transceiver, or a communicator. Furthermore, at least one of the baseband processor 1h-20 and the RF processor 1h-10 may include a plurality of communication modules to support a plurality of different radio access technologies. In addition, at least one of the baseband processor 1h-20 and the RF processor 1h-10 may include different communication modules to process signals in different frequency bands. For example, the different radio access technologies may include a wireless LAN (e.g., IEEE 802.11), a cellular network (e.g., LTE), and the like. In addition, the different frequency bands may include a super-high-frequency (SHF) (e.g., 2.NRHz, NRhz) band and a millimeter-wave (e.g., 60 GHz) band.

The storage unit 1h-30 stores data such as a basic program, an application, or configuration information for the operation of the terminal. In particular, the storage unit 1h-30 may store information related to the second access node, which performs wireless communication using the second wireless access technology. The storage unit 1h-30 provides stored data in response to a request from the controller 1h-40.

The controller 1h-40 controls the overall operation of the terminal according to an embodiment of the disclosure. For example, the controller 1h-40 transmits and receives signals through the baseband processor 1h-20 and the RF processor 1h-10. In addition, the controller 1h-40 records and reads data in the storage unit 1h-30. To this end, the controller 1h-40 may include at least one processor. For example, the controller 1h-40 may include a communication processor (CP) that performs control for communication and an application processor (AP) that controls an upper layer such as an application.

Figure 1I:
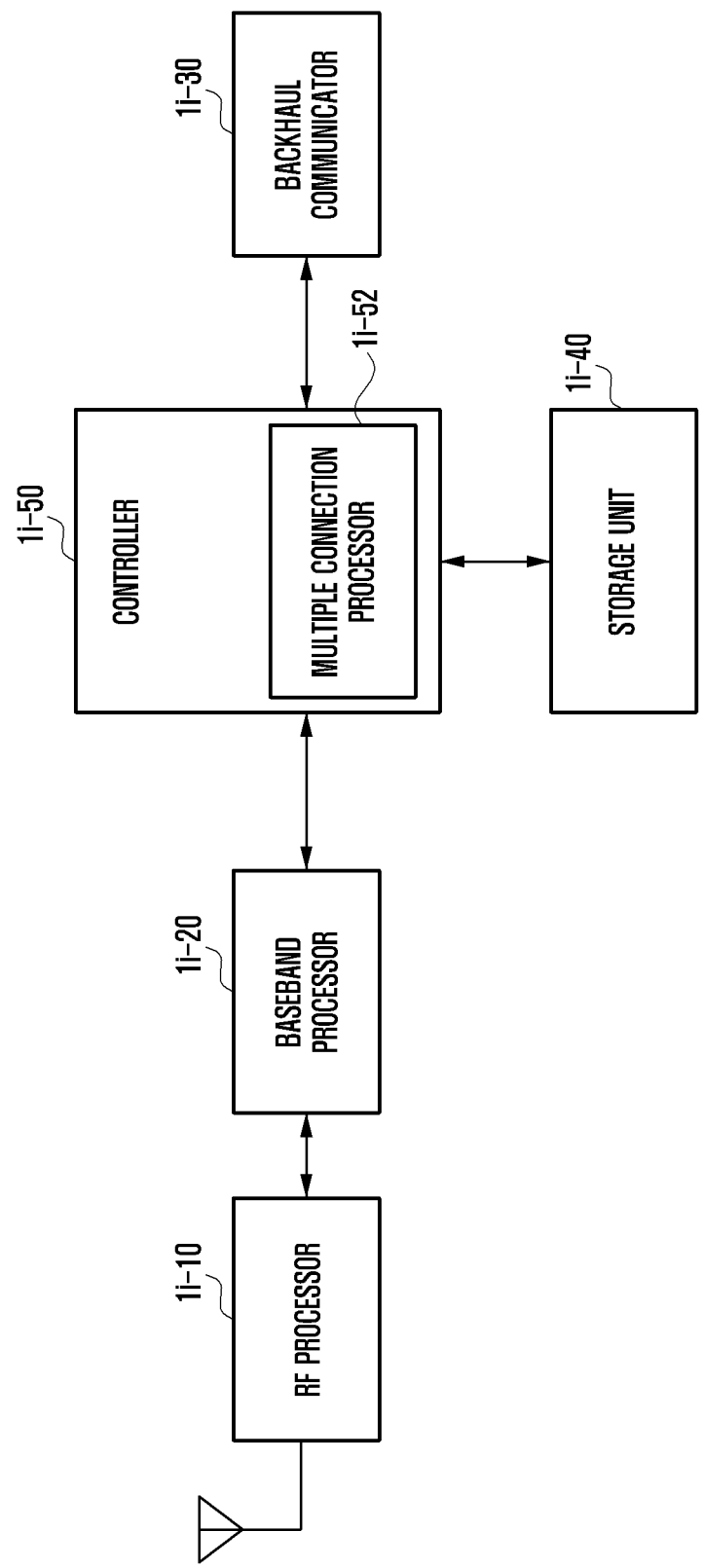
FIG. 1I is a view illustrating the configuration of a base station according to an embodiment of the disclosure.

FIG. 1I is a view illustrating the configuration of a base station according to an embodiment of the disclosure.

The base station includes an RF processor 1i-10, a baseband processor 1i-20, a backhaul communicator 1i-30, a storage unit 1i-40, and a controller 1i-50.

The RF processor 1i-10 performs a function for transmitting and receiving a signal via a wireless channel, such as band conversion and amplification of the signal. That is, the RF processor 1i-10 up-converts a baseband signal provided from the baseband processor 1i-20 to an RF band signal and then transmits the same through an antenna, and down-converts an RF band signal received through the antenna to a baseband signal. For example, the RF processor 1i-10 may include a transmission filter, a reception filter, an amplifier, a mixer, an oscillator, a digital-to-analog converter (DAC), an analog-to-digital converter (ADC), etc. In FIG. 1I, although only one antenna is illustrated, the first connection node may have multiple antennas. Also, the RF processor 1i-10 may include a plurality of RF chains. Furthermore, the RF processor 1i-10 may perform beamforming. For the beamforming, the RF processor 1i-10 may adjust the phase and magnitude of each of signals transmitted and received through multiple antennas or antenna elements. The RF processor may perform down-MIMO operations by transmitting one or more layers.

The baseband processor 1i-20 performs a function of conversion between a baseband signal and a bit stream according to the physical layer standard of a first radio access technology. For example, during data transmission, the baseband processor 1i-20 generates complex symbols by encoding and modulating a transmission bit stream. In addition, upon receiving data, the baseband processor 1i-20 restores the received bit stream through demodulation and decoding of the baseband signal provided from the RF processor 1i-10. For example, in the case of conforming to the OFDM method, when transmitting data, the baseband processor 1i-20 encodes and modulates a transmission bit stream to generate complex symbols, maps the complex symbols to subcarriers, and then configures OFDM symbols via an inverse fast Fourier transform (IFFT) operation and cyclic prefix (CP) insertion. In addition, when receiving data, the baseband processor 1i-20 divides the baseband signal provided from the RF processor 1i-10 into units of OFDM symbols, restores signals mapped to subcarriers via the FFT operation, and then restores a received bit stream via demodulation and decoding. The baseband processor 1i-20 and the RF processor 1i-10 transmit and receive signals as described above. Accordingly, each of the baseband processor 1i-20 and the RF processor 1i-10 may be referred to as a transmitter, a receiver, a transceiver, or a wireless communicator.

The backhaul communicator 1i-30 provides an interface for performing communication with other nodes in a network. That is, the backhaul communicator 1i-30 converts a bit stream transmitted from the base station to another node, for example, an auxiliary base station or a core network, into a physical signal, and converts the physical signal received from the other node into a bit stream.

The storage unit 1i-40 stores data such as a basic program, an application, and configuration information for the operation of the base station. In particular, the storage unit 1i-40 may store information on bearers allocated to the connected terminal, measurement results reported from the connected terminal, and the like. In addition, the storage unit 1i-40 may store information serving as a criterion for determining whether to provide or stop multiple connections to the terminal. Then, the storage unit 1i-40 provides stored data in response to a request from the controller 1i-50.

The controller 1i-50 controls the overall operation of the terminal according to an embodiment of the disclosure. For example, the controller 1i-50 transmits and receives signals through the baseband processor 1i-20 and the RF processor 1i-10 or through the backhaul communicator 1i-30. In addition, the controller 1i-50 records and reads data in the storage unit 1*i*-40. To this end, the controller 1*i*-50 may include at least one processor.

Second Embodiment

Figure 2A:
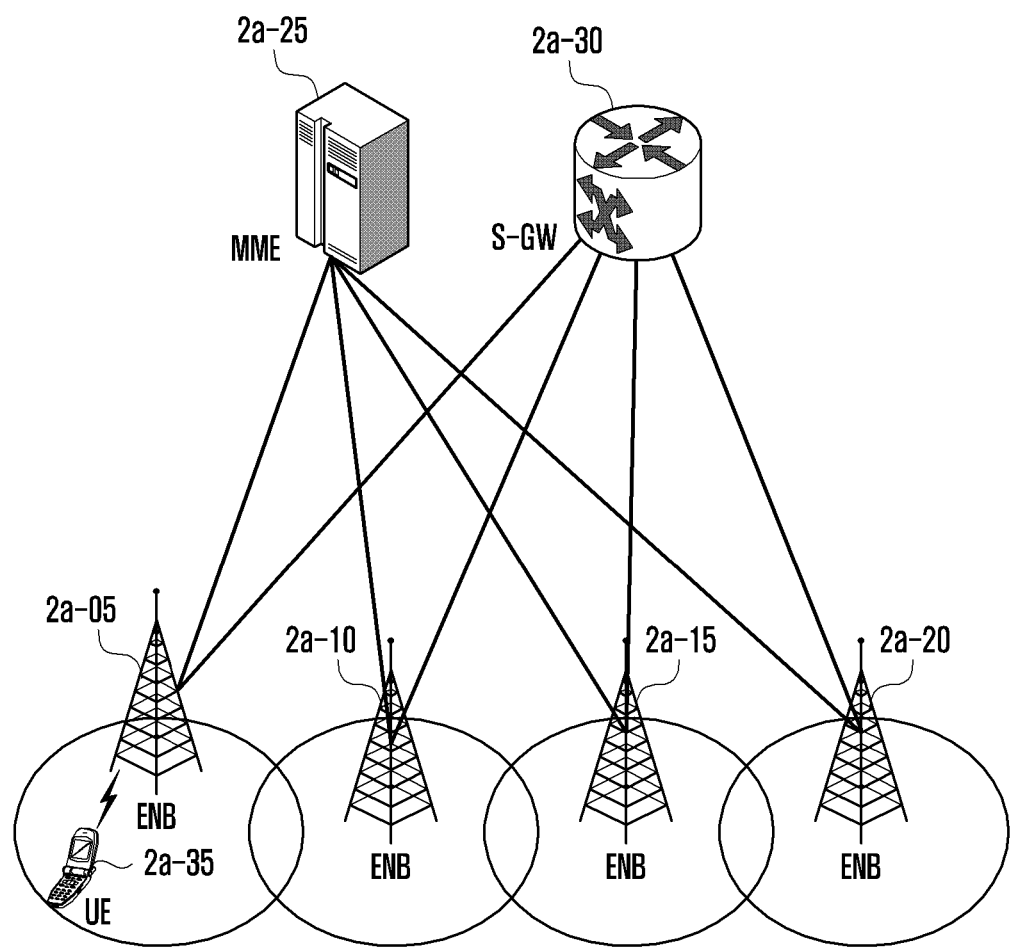
FIG. 2A is a view illustrating the structure of an LTE system according to an embodiment of the disclosure.

FIG. 2A is a view illustrating the structure of an LTE system according to an embodiment of the disclosure.

Referring to FIG. 2A, as illustrated, the wireless access network of the LTE system is composed of next-generation base stations (evolved node B, hereinafter ENB, Node B or base station) 2*a*-05, 2*a*-10, 2*a*-15, and 2*a*-20, a mobility management entity (MME) 2*a*-25, and a serving gateway (S-GW) 2*a*-30. A user equipment (hereinafter, UE or terminal) 2*a*-35 is connected to an external network through the ENB 2*a*-05, 2*a*-10, 2*a*-15, and 2*a*-20 and the S-GW 2*a*-30.

In FIG. 2A, the ENBs 2*a*-05, 2*a*-10, 2*a*-15, and 2*a*-20 correspond to the existing node B of a UMTS system. The ENB 2*a*-05 is connected to the UE 2*a*-35 by a wireless channel, and performs a more complicated role than the existing Node B. In the LTE system, since all user traffic including real-time services such as Voice over IP (VoIP), carried over the Internet protocol, are served through a shared channel, a device is required to perform scheduling by collecting status information such as buffer status, available transmission power status, and channel status of UEs, and the ENBs 2*a*-05, 2*a*-10, 2*a*-15, and 2*a*-20 are responsible therefor.

One ENB usually controls multiple cells. For example, in order to realize a transmission rate of 100 Mbps, the LTE system uses orthogonal frequency-division multiplexing (OFDM) in, for example, a 20 MHz bandwidth as a radio access technology. In addition, an adaptive modulation and coding (hereinafter, referred to as AMC) method is applied to determine the modulation scheme and the channel-coding rate according to the state of a channel used by a terminal. The S-GW 2*a*-30 is a device that provides a data bearer, and creates or removes a data bearer under the control of the MME 2*a*-25. The MME 2*a*-25 is a device that is responsible for various control functions as well as mobility management functions for the terminals 2*a*-35, and is connected to multiple base stations 2*a*-05, 2*a*-10, 2*a*-15, and 2*a*-20.

Figure 2B:
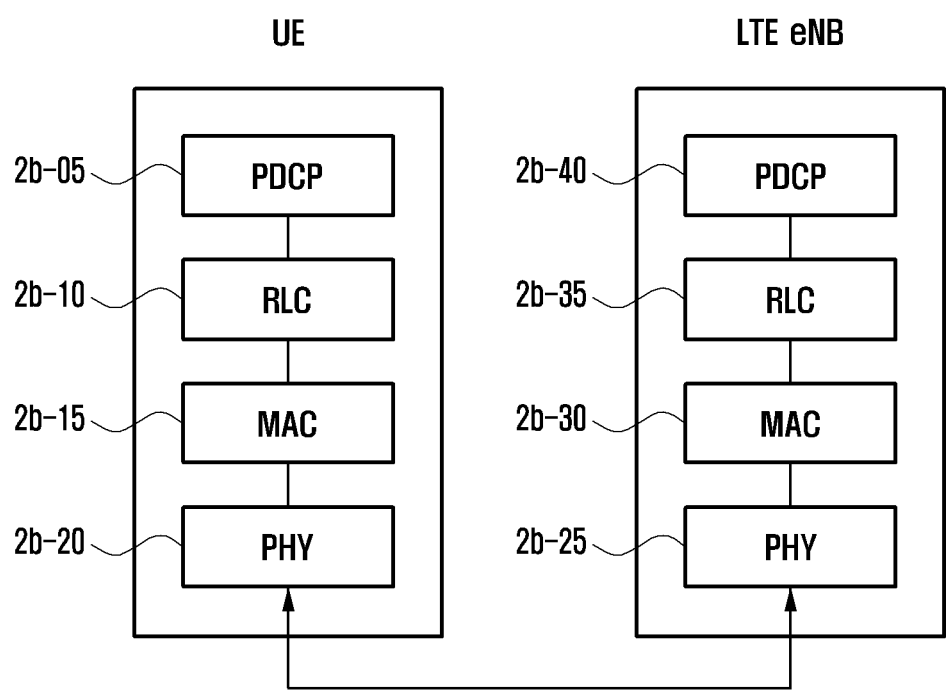
FIG. 2B is a view illustrating the structure of a wireless protocol of an LTE system according to an embodiment of the disclosure.

FIG. 2B is a view illustrating the structure of a wireless protocol of an LTE system according to an embodiment of the disclosure.

Referring to FIG. 2B, the wireless protocol of the LTE system is composed of a packet data convergence protocol (PDCP) 2*b*-05 and 2*b*-40, a radio link control (RLC) 2*b*-10 and 2*b*-35, and a medium access control (MAC) 2*b*-15 and 2*b*-30, in a terminal and ENB. The packet data convergence protocols (PDCPs) 2*b*-05 and 2*b*-40 are responsible for IP header compression/restoration. The main functions of the PDCP are summarized as follows.
  Header compression and decompression: ROHC only
  Transfer of user data
  In-sequence delivery of upper-layer PDUs at PDCP re-establishment procedure for RLC AM
  For split bearers in DC (only support for RLC AM): PDCP PDU routing for transmission and PDCP PDU reordering for reception
  Duplicate detection of lower-layer SDUs at PDCP re-establishment procedure for RLC AM
  Retransmission of PDCP SDUs at handover and, for split bearers in DC, of PDCP PDUs at PDCP data recovery procedure, for RLC AM
  Ciphering and deciphering
  Timer-based SDU discard in uplink
  The radio link control (hereinafter, referred to as RLC) 2*b*-10 and 2*b*-35 reconfigures the PDCP packet data unit (PDU) to an appropriate size to perform an automatic repeat request (ARQ) operation. The main functions of the RLC are summarized as follows.
  Transfer of upper-layer PDUs
  Error Correction through ARQ (only for AM data transfer)
  Concatenation, segmentation and reassembly of RLC SDUs (only for UM and AM data transfer)
  Re-segmentation of RLC data PDUs (only for AM data transfer)
  Reordering of RLC data PDUs (only for UM and AM data transfer
  Duplicate detection (only for UM and AM data transfer)
  Protocol error detection (only for AM data transfer)
  RLC SDU discard (only for UM and AM data transfer)
  RLC re-establishment The MACs 2*b*-15 and 2*b*-30 are connected to various RLC-layer devices configured in a terminal or a base station, and perform operations of multiplexing RLC PDUs to MAC PDUs and demultiplexing RLC PDUs from MAC PDUs. The main functions of MAC are summarized as follows.
  Mapping between logical channels and transport channels
  Multiplexing/demultiplexing of MAC SDUs belonging to one or different logical channels into/from transport blocks (TB) delivered to/from the physical layer on transport channels—Scheduling information reporting
  Error correction through HARQ
  Priority handling between logical channels of one UE
  Priority handling between UEs by means of dynamic scheduling
  MBMS service identification function
  Transport format selection function
  Padding function The physical layers 2*b*-20 and 2*b*-25 channel-code and modulate the upper-layer data, convert the same into an OFDM symbol and transmit the same to a radio channel, or demodulate and channel decode an OFDM symbol received through the radio channel and transmit the same to the upper layer.

Figure 2C:
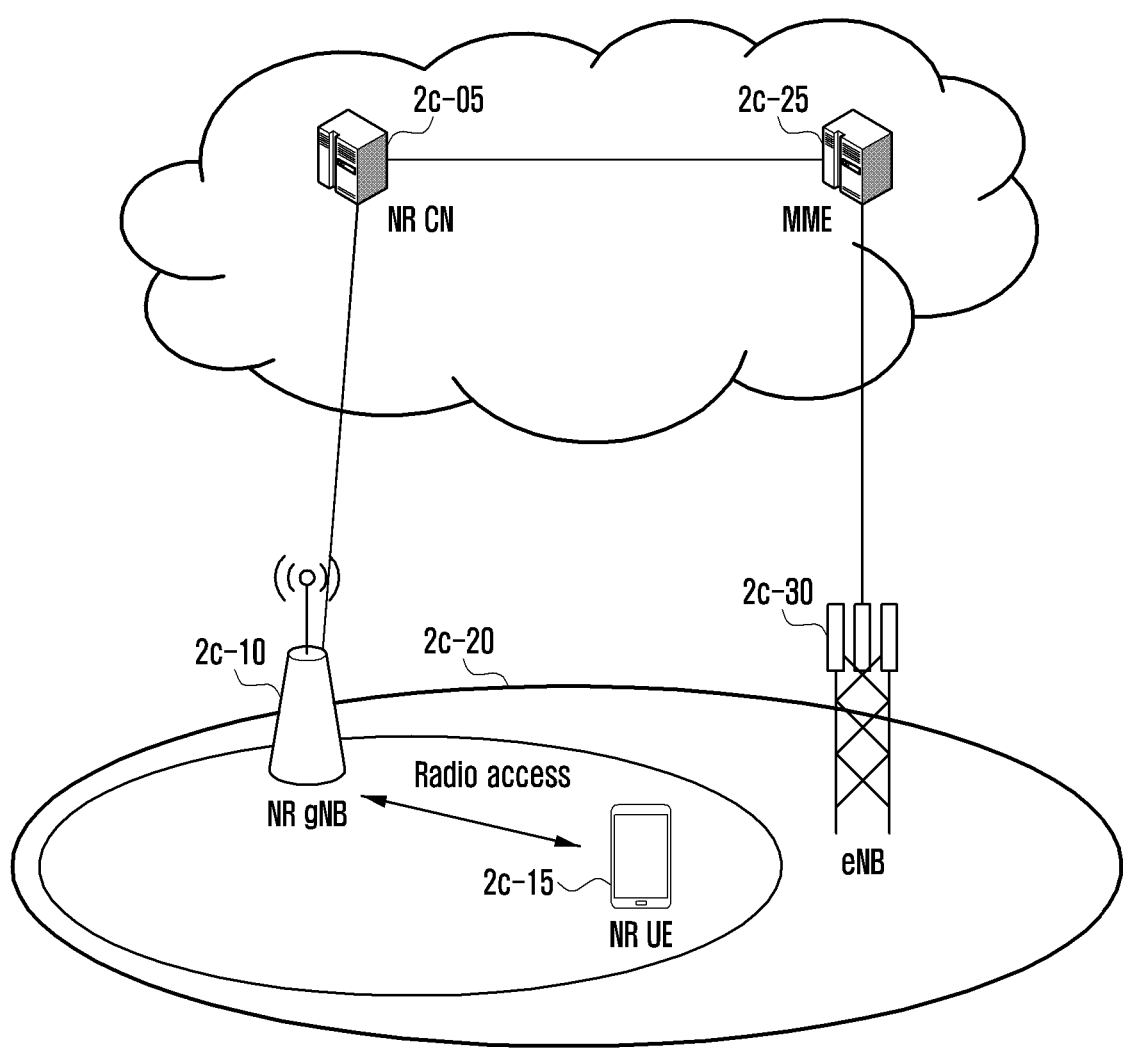
FIG. 2C is a view illustrating the structure of a next-generation mobile communication system according to an embodiment of the disclosure.

FIG. 2C is a view illustrating the structure of a next-generation mobile communication system according to an embodiment of the disclosure.

Referring to FIG. 2C, the radio access network of the next-generation mobile communication system (hereinafter, referred to as NR or 5G) includes a next-generation base station (new-radio Node B, NR gNB or NR base station) 2*c*-10 and new-radio core network (NR CN) 2*c*-05. The user terminal (new-radio user equipment, NR UE or terminal) 2*c*-15 accesses the external network through the NR gNB 2*c*-10 and the NR CN 2*c*-05.

In FIG. 2C, the NR gNB 2*c*-10 corresponds to an evolved node B (eNB) of an existing LTE system. The NR gNB 2*c*-10 is connected to the NR UE 2*c*-15 through a wireless channel and can provide superior service than the existing Node B. In the next-generation mobile communication system, since all user traffic is served through a shared channel, a device is required to collect and schedule status information such as buffer status of UEs, available transmission power status, and channel status, and the NR NB 2*c*-10 is responsible therefor. One NR gNB usually controls multiple cells. In order to implement ultra-high-speed data transmission compared to the current LTE, more than the existing maximum bandwidth may be provided, and orthogonal frequency-division multiplexing (OFDM) radio access technology may be additionally combined with beamforming technology. In addition, an adaptive modulation and coding (hereinafter, referred to as AMC) method is applied to determine the modulation scheme and the channel-coding rate according to the state of a channel used by a terminal. The NR CN 2c-05 performs functions such as mobility support, bearer setup, and QoS configuration. The NR CN 2c-05 is a device that is responsible for various control functions as well as mobility management functions for a terminal, and is connected to multiple base stations. In addition, the next-generation mobile communication system can be linked with the existing LTE system, and the NR CN 2c-05 is connected to the MME 2c-25 through a network interface. The MME 2c-25 is connected to the existing base station eNB 2c-30.

Figure 2D:
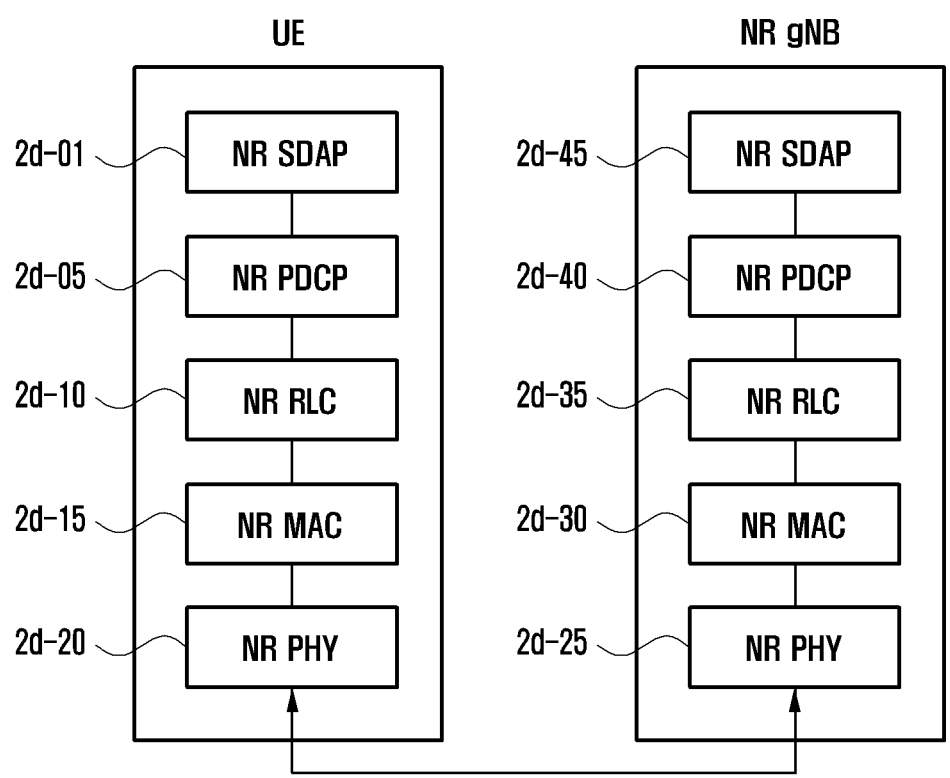
FIG. 2D is a view illustrating the structure of a wireless protocol of a next-generation mobile communication system according to an embodiment of the disclosure.

FIG. 2D is a view illustrating the structure of a wireless protocol of a next-generation mobile communication system according to an embodiment of the disclosure.

Referring to FIG. 2D, the wireless protocol structure of a next-generation mobile communication system is composed of an NR SDAP 2d-01, 2d-45, NR PDCP 2d-05, 2d-40, an NR RLC 2d-10, 2d-35, and an NR MAC 2d-15, 2d-30 in a terminal and an NR base station, respectively.

The main functions of the NR SDAPs 2d-01 and 2d-45 may include some of the following functions.
Transfer of user-plane data
Mapping between a QoS flow and a DRB for both DL and UL
Marking QoS flow ID in both DL and UL packets
Mapping reflective QoS flow to DRB for the UL SDAP PDUs For the SDAP-layer device, the UE can be configured with regard to whether to use the header of the SDAP-layer device or the function of the SDAP-layer device for each PDCP-layer device, for each bearer, or for each logical channel through an RRC message, and when the SDAP header is configured, the NAS QoS reflection configuration 1-bit indicator (NAS reflective QoS) of the SDAP header and the AS QoS reflection configuration 1-bit indicator (AS reflective QoS) may indicate that the terminal can update or reset the QoS flow of uplink and downlink and mapping information for the data bearer. The SDAP header may include QoS flow ID information indicating QoS. The QoS information may be used as data-processing priority and scheduling information to support smooth service.

The main functions of the NR PDCP 2d-05, 2d-40 may include some of the following functions.
Header compression and decompression: ROHC only
Transfer user data
In-sequence delivery of upper-layer PDUs
Out-of-sequence delivery of upper-layer PDUs
PDCP PDU reordering for reception
Duplicate detection of lower-layer SDUs
Retransmission of PDCP SDUs
Ciphering and deciphering
Timer-based SDU discard in uplink In the above, reordering function of the NR PDCP device (reordering) refers to a function of reordering PDCP PDUs received from a lower layer in order based on PDCP sequence numbers (SN), and may include transmitting data to an upper layer in a reordered order, or may include a function for immediately transmitting without consideration of the order, may include a function for reordering the order to record the lost PDCP PDUs, may include a function for sending a status report for the lost PDCP PDUs to the transmitting side, and may include a function for requesting retransmission for lost PDCP PDUs.

The main functions of the NR RLCs 2d-10 and 2d-35 may include some of the following functions.
Transfer of upper-layer PDUs
In-sequence delivery of upper-layer PDUs
Out-of-sequence delivery of upper-layer PDUs
Error Correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment In the above, the in-sequence delivery of the NR RLC device refers to a function of sequentially transmitting RLC SDUs received from a lower layer to an upper layer. Originally, when one RLC SDU is received by being divided into several RLC SDUs, it may include a function of reassembling and transmitting the same, may include a function of rearranging the received RLC PDUs based on an RLC sequence number (SN) or a sequence number (PDCP SN), may include a function of rearranging the order to record the lost RLC PDUs, may include a function for sending a status report for the lost RLC PDUs to the transmitting side, and may include a function for requesting retransmission for the lost RLC PDUs. If there is a lost RLC SDU, it may include a function of transmitting only the RLC SDUs up to the lost RLC SDU to the upper layer in sequence. Alternatively, even if there is a lost RLC SDU, if a predetermined timer has expired, a function of delivering all RLC SDUs received before the timer starts, in sequence, to an upper layer may be included. Alternatively, even if there is a lost RLC SDU, if a predetermined timer expires, a function of delivering all RLC SDUs received so far to the upper layer in sequence may be included. In addition, the RLC PDUs may be processed in the order in which they are received (regardless of the sequence number, in the order of arrival) and delivered to the PDCP device in any order (out-of-sequence delivery). In the case of segments, segments that are stored in a buffer or that are to be received at a later time can be received, reconstructed into a complete RLC PDU, processed, and then delivered to a PDCP device. The NR RLC layer may not include a concatenation function, and the function may be performed in the NR MAC layer, or may be replaced by a multiplexing function of the NR MAC layer.

In the above, out-of-sequence delivery of the NR RLC device refers to a function of directly transmitting RLC SDUs received from a lower layer to an upper layer regardless of order. Originally, when one RLC SDU is divided into multiple RLC SDUs and received, it may include a function of reassembling and transmitting the same, and may include a function of storing the RLC SN or PDCP SN of the received RLC PDUs and arranging the order to record the lost RLC PDUs.

The NR MACs 2d-15 and 2d-30 may be connected to various NR RLC-layer devices configured in a terminal or a base station, and the main function of the NR MAC may include some of the following functions.
Mapping Between Logical Channels and Transport Channels
Multiplexing/demultiplexing of MAC SDUs
Scheduling information reporting
Error correction through HARQ Priority handling between logical channels of one UE Priority handling between UEs by means of dynamic scheduling MBMS service identification Transport format selection Padding The NR PHY layer 2d-20, 2d-25 may perform an operation of channel-coding and modulating upper-layer data, making an OFDM symbol and transmitting the same on a radio channel, or demodulating and channel-decoding an OFDM symbol received via the radio channel and transmitting the same to an upper layer.

The embodiment of the disclosure proposes a procedure for compressing data and decompressing the same at a base station when a terminal transmits data in an uplink in a wireless communication system, and proposes a method for supporting a data transmission/reception procedure that compresses and transmits data at a transmitting end, and decompresses the same at a transmitting end, using, for example, a specific header format and a resolution method, when decompression fails. Also, the method proposed in the embodiment of the disclosure can be applied to a procedure in which the base station compresses and transmits data when the downlink data is transmitted to the terminal and the terminal receives and decompresses the compressed downlink data. In the embodiment of the disclosure as described above, by compressing and transmitting data at the transmitting end, it is possible to transmit a larger amount of data and improve coverage.

Figure 2E:
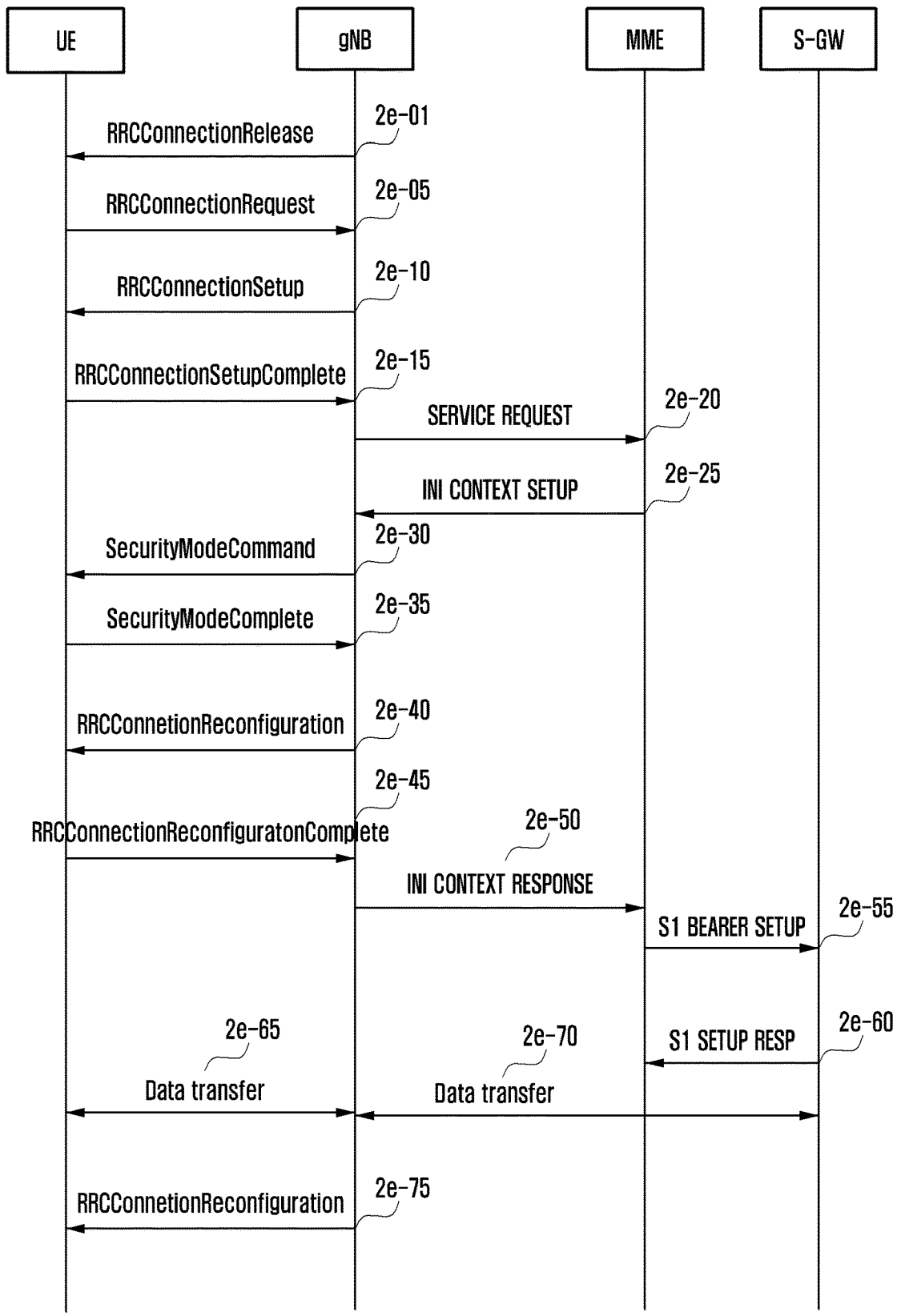
FIG. 2E is a view illustrating a procedure for configuring whether a base station performs uplink data compression when a terminal establishes a connection with a network according to an embodiment of the disclosure.

FIG. 2E is a view illustrating a procedure for configuring whether a base station performs uplink data compression when a terminal establishes a connection with a network according to an embodiment of the disclosure.

FIG. 2E illustrates a procedure for a UE to establish a connection with a network by switching from an RRC idle mode or an RRC inactive mode (or lightly connected mode) to an RRC connected mode in the disclosure, and a procedure for configuring whether to perform uplink data compression (UDC).

In FIG. 2E, the base station may transmit the RRCConnectionRelease message to the terminal to switch the terminal to the RRC idle mode if the terminal, transmitting/receiving data in the RRC connection mode, does not transmit or receive data for a predetermined reason or for a predetermined time (2e-01). In the future, a terminal that is not currently connected (hereinafter referred to as an "idle-mode UE") performs an RRC connection establishment process with a base station when there is data to be transmitted. The terminal performs reverse transmission synchronization with the base station via a random access process and transmits an RRCConnectionRequest message to the base station (2e-05). The message includes the identifier of the terminal and the reason for establishing the connection (establishmentCause). The base station transmits an RRCConnectionSetup message so that the terminal establishes an RRC connection (2e-10). The message may include information indicating whether to use the uplink data compression method (UDC) for each logical channel (logicalchannelconfig), for each bearer, or for each PDCP device (PDCP-config). In addition, more specifically, it is possible to indicate which IP flow or QoS flow is to be used only for uplink data compression (UDC) in each logical channel or bearer or each PDCP device (or SDAP device). (By configuring the information on the IP flow or QoS flow to use or not to use the uplink data compression method for the SDAP device, the SDAP device may indicate to the PDCP device whether or not the SDCP device uses the uplink data compression method for each QoS flow. Alternatively, the PDCP device may itself identify each QoS flow and decide whether or not to apply the uplink compression method.) In addition, if instructed to use the uplink data compression method as above, through the message, an identifier for a predetermined library or dictionary to be used in the uplink data compression method or the size of a buffer to be used in the uplink data compression method may be indicated. Also, the message may include a command to perform setup for uplink decompression or release the same. In addition, when the uplink data compression method is set to be used, the RLC AM bearer (ARQ function, lossless mode with retransmission function) may always be used, and may not be configured together with the header compression protocol (ROHC). In addition, the message may indicate whether to use the function of the SDAP-layer device or the SDAP header for each logical channel (logicalchannelconfig), for each bearer, or for each PDCP device (PDCP-config). In addition, the message may indicate whether to apply ROHC (P packet header compression) for each logical channel (logicalchannelconfig), for each bearer, or for each PDCP device (PDCP-config), and may configure whether to apply ROHC to each of the uplink and downlink as indicators. However, both ROHC and UDC cannot be configured for one PDCP-layer device or logical channel or bearer at the same time, and UDC can be configured for up to two bearers. In addition, the message may indicate whether integrity protection is applied to each logical channel (logicalchannelconfig), to each bearer, or to each PDCP device (PDCP-config), it can be configured in consideration of the maximum data transmission rate of the corresponding PDCP-layer device, or bearer, or logical channel. Also, RRC connection configuration information and the like may be stored in the message. The RRC connection is also called signaling radio bearer (SRB), and is used to transmit and receive RRC messages, which are control messages, between the terminal and the base station.

The terminal, having configured the RRC connection, transmits an RRCConnectionSetupComplete message to the base station (2e-15). If the base station does not know the capability of the terminal that is currently establishing the connection, or if it wants to know the terminal capability, it can send a message inquiring about the capability of the terminal. In response thereto, the terminal can send a message reporting the capabilities thereof. The message may indicate whether the terminal can use uplink data compression (UDC), robust header compression (ROHC), or integrity protection, and can be transmitted in the state of including an indicator indicating the same. The RRCConnectionSetupComplete message includes a control message called SERVICE REQUEST in which the terminal requests the MME to set up a bearer for a given service. The base station transmits the SERVICE REQUEST message received in the RRCConnectionSetupComplete message to the MME (2e-20), and the MME determines whether to provide the service requested by the terminal. As a result of the determination, if the terminal decides to provide the requested service, the MME sends a message INITIAL CONTEXT SETUP REQUEST to the base station (2e-25). The INITIAL CONTEXT SETUP REQUEST message includes quality of service (QoS) information to be applied when configuring a data radio bearer (DRB), and security-related information (e.g., security key, security algorithm) to be applied to the DRB. The base station exchanges the SecurityModeCommand message (2e-30) and the SecurityModeComplete message (2e-35) to establish security configurations with the terminal. When the security configurations are established, the base station transmits an RRCConnectionReconfiguration message to the terminal (2e-40). The RRCConnectionReconfiguration message may include information indicating whether to use the uplink data compression method (UDC) for each logical channel (logicalchannelconfig), for each bearer, or for each PDCP device (PDCP-config). In addition, more specifically, it is possible to indicate whether to use an uplink data compression (UDC) method only for particular IP flow or QoS flow in each logical channel or bearer or each PDCP device (or SDAP device). (Information on IP flow and QoS flow to which the uplink data compression method is used or not used may be configured for the SDAP device, and the SDAP device may indicate to the PDCP device whether or not the SDCP device uses the uplink data compression method to each QoS flow. Alternatively, the PDCP device may itself identify each QoS flow and determine whether or not to apply the uplink compression method.) In addition, if use of the uplink data compression method is indicated above, an identifier for a predetermined library or dictionary to be used in the uplink data compression method or a buffer size to be used in the uplink data compression method may be indicated through the message. Also, the message may include a command to perform configuration for uplink decompression or to release the same. In addition, when configured to use the uplink data compression method in the above, the message can always by configured as an RLC AM bearer (ARQ function, lossless mode with retransmission function), and might not be configured together with the header compression protocol (ROHC). In addition, the message may indicate whether to use the function of the SDAP-layer device or the SDAP header for each logical channel (logicalchannelconfig), for each bearer, or for each PDCP device (PDCP-config), and the message may indicate whether to apply ROHC (IP packet header compression) for each logical channel (logicalchannelconfig), for each bearer, or for each PDCP device (PDCP-config), and whether to apply ROHC for uplink and downlink can be configured as respective indicators. However, both ROHC and UDC cannot be configured for one PDCP-layer device or logical channel or bearer at the same time, and UDC can be configured for up to two bearers. In addition, the message may indicate whether to apply integrity verification for each logical channel (logicalchannelconfig), for each bearer, or for each PDCP device (PDCP-config), and may be configured in consideration of the maximum data transmission rate of the corresponding PDCP layer, bearer, or logical channel. In addition, the message includes the DRB setting information to be processed by the user data, and the terminal applies the information to configure the DRB and transmits an RRC-ConnectionReconfigurationComplete message to the base station (2e-45).

The base station, having completed the DRB setup with the terminal, sends an INITIAL CONTEXT SETUP COMPLETE message to the MME (2e-50), and the MME, upon receiving the same, exchanges the S1 BEARER SETUP message and the S1 BEARER SETUP RESPONSE message to configure the S-GW and S1 bearer (2e-055, 2e-60). The S1 bearer is a connection for data transmission that is established between the S-GW and the base station and corresponds one-to-one to the DRB. When all of the above processes are completed, the terminal transmits and receives data through the base station and the S-GW (2e-65, 2e-70). This general data transmission process is largely composed of three steps: RRC connection configuration, security configuration, and DRB configuration.

In addition, the base station may transmit an RRCConnectionReconfiguration message in order to reconfigure, add, or change configurations to the terminal for a predetermined reason (2e-75). The message may include information indicating whether to use the uplink data compression method (UDC) for each logical channel (logicalchannelconfig), for each bearer, or for each PDCP device (PDCP-config). In addition, more specifically, it is possible to indicate whether to use uplink data compression (UDC) only for an IP flow or a QoS flow in each logical channel or bearer or each PDCP device (or SDAP device). (By configuring the information on the IP flow or QoS flow, which uses or does not use the uplink data compression method for the SDAP device, the SDAP device may indicate to the PDCP device whether or not to use the uplink data compression method for each QoS flow. Alternatively, the PDCP device may itself check each QoS flow and decide whether or not to apply the uplink compression method.) In addition, if instructed to use the uplink data compression method above, through the message, an identifier for a predefined library or dictionary information to be used in the uplink data compression method or a buffer size to be used in the uplink data compression method may be indicated through the message. Also, the message may include a command to perform setup for uplink decompression or release the same. In addition, when the message is configured to use the uplink data compression method as above, it may always be configured as an RLC AM bearer (lossless mode with ARQ function, retransmission function), and might not be configured together with a header compression protocol (ROHC). In addition, the message may indicate whether to use the function of the SDAP-layer device or the SDAP header for each logical channel (logicalchannelconfig), for each bearer, or for each PDCP device (PDCP-config), and the message may indicate whether to apply ROHC (IP packet header compression) for each logical channel (logicalchannelconfig), for each bearer, or for each PDCP device (PDCP-config), and may configure whether or not to apply ROHC as an indicator for each of uplink and downlink. However, the ROHC and UDC cannot be configured for one PDCP-layer device, logical channel, or bearer at the same time, and the UDC can be configured for up to two bearers. In addition, the message may indicate whether to apply integrity verification for each logical channel (logicalchannelconfig), for each bearer, or for each PDCP device (PDCP-config), and may indicate configuration in consideration of the maximum data transmission rate of the corresponding PDCP-layer device, bearer, or logical channel.

Figure 2F:
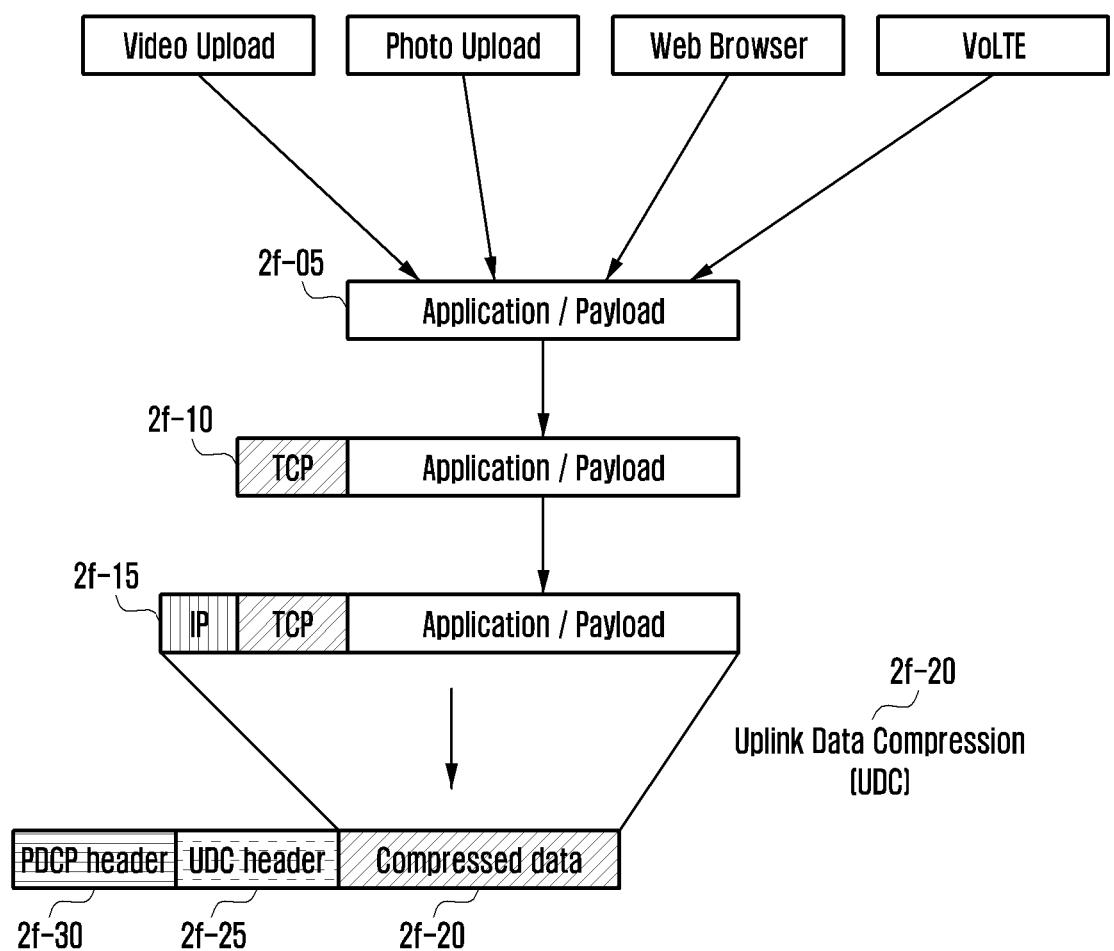
FIG. 2F is a view illustrating a procedure and data configuration for performing uplink data compression according to an embodiment of the disclosure.

FIG. 2F is a view illustrating a procedure and data configuration for performing uplink data compression according to an embodiment of the disclosure.

In FIG. 2F, uplink data 2f-05 may be produced as data corresponding to services such as video transmission, picture transmission, web search, and VoLTE. The data produced in the application-layer device may be processed via TCP/IP or UDP, corresponding to the network data transport layer, construct each header 2f-10, 2f-15, and may be transmitted to the PDCP layer. When the PDCP layer receives data (PDCP SDU) from an upper layer, the following procedure can be performed.

If, in FIG. 2E, configuration is made to use the uplink data compression method in the PDCP layer by the RRC message such as 2e-10 or 2e-40 or 2e-75, uplink data compression for the PDCP SDU as in 2f-20 is performed to compress uplink data, and a corresponding UDC header (a header for compressed uplink data, 2f-25) is constructed. If integrity protection is configured, integrity protection may be performed, ciphering may be performed, and a PDCP PDU may be configured by configuring the PDCP header 2f-30. In the above, the PDCP-layer device includes a UDC compression/decompression device, determines whether or not to perform the UDC procedure for each piece of data as configured in the RRC message, and uses the UDC compression/decompression device. The transmitting end performs data compression using the UDC compression device in the transmitting PDCP-layer device, and the receiving end performs data decompression using the UDC decompression device in the receiving PDCP-layer device.

The procedure of FIG. 2F described above can be applied when compressing downlink data as well as when the terminal compresses uplink data. In addition, the description with regard to the uplink data can be applied to the downlink data in the same way.

Figure 2G:
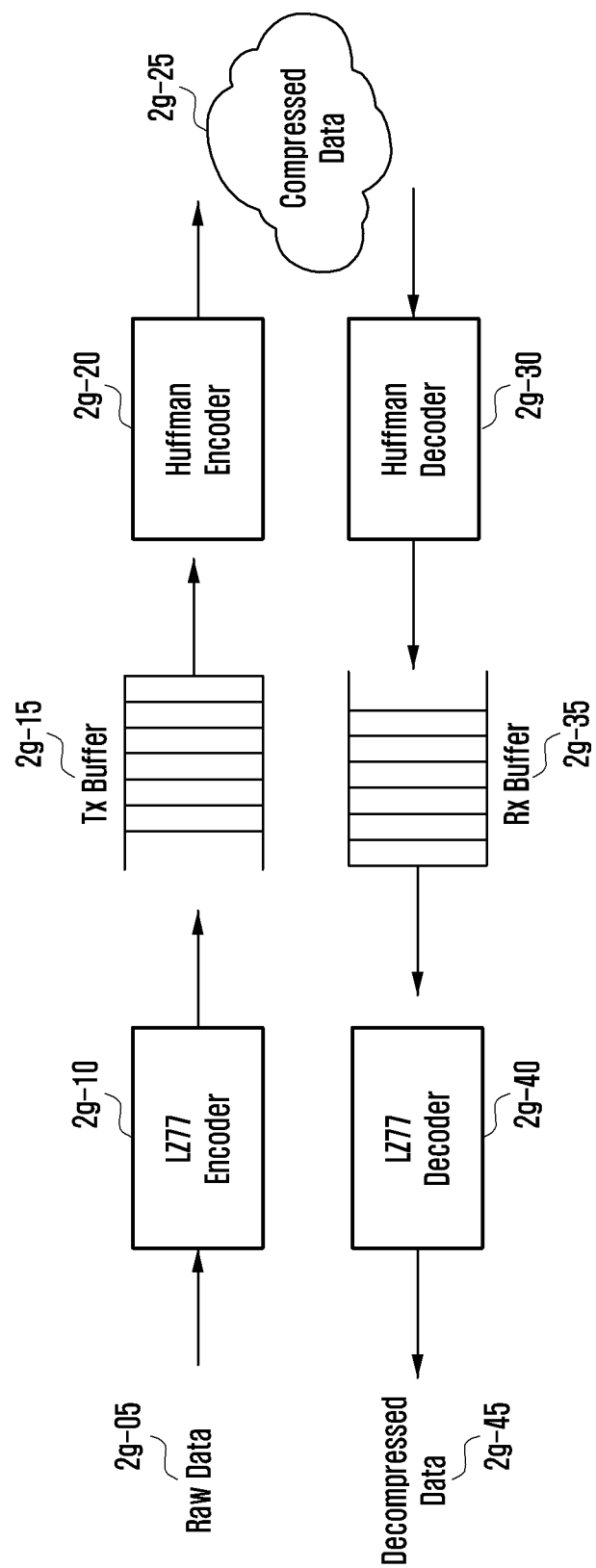
FIG. 2G is a view illustrating an embodiment of an uplink data compression method according to an embodiment of the disclosure.

FIG. 2G is a view illustrating an embodiment of an uplink data compression method according to an embodiment of the disclosure.

FIG. 2G is a view illustrating a description of a DEFLATE-based uplink data compression algorithm, and the DEFLATE-based uplink data compression algorithm is a lossless compression algorithm. The DEFLATE-based uplink data compression algorithm basically compresses uplink data by combining the LZ77 algorithm and Huffman coding. The LZ77 algorithm performs an operation of searching for a duplicate array of data. When searching for duplicate arrays, if duplicate arrays are found by searching for duplicate arrays through a sliding-window, the LZ77 algorithm expresses the position and degree of overlapping of the duplicate arrays in the sliding window as lengths to perform data compression. The sliding window is also called a buffer in the uplink data compression (UDC) method, and may be configured as 8 kilobytes or 32 kilobytes. That is, the sliding window or buffer can perform compression by recording 8192 or 32768 characters, searching duplicate arrays, and expressing them by position and length. Therefore, since the LZ algorithm is a sliding-window method, that is, since previously coded data is updated in a buffer, and coding is again performed on subsequent data, there is a correlation between successive data. Therefore, the coded data should be decoded normally, after which the data can be decoded normally. The compressed codes (expression of position, length, etc.), expressed by position and length according to the LZ77 algorithm, are compressed once more via Huffman coding. Huffman coding searches for duplicate codes again, and uses a short notation for codes with a high degree of overlapping and a long notation for codes with a low degree of overlapping to perform compression once again. The Huffman coding is prefix coding, and is an optimal coding scheme in which all codes are distinctly decodable.

As described above, the transmitting end performs encoding by applying the LZ77 algorithm to the original data (2g-05, 2g-10), updates the buffer (2g-15), produces checksum bits for the contents (or data) of the buffer, and configures the same in the UDC header. The checksum bits are used at the receiving end to determine whether the buffer status is valid. Codes encoded with the LZ77 algorithm can be compressed once again with Huffman coding and transmitted as uplink data (2g-25). The receiving end, rather than the transmitting end, performs the decompression procedure on the received compressed data. That is, the receiving end performs Huffman decoding (2g-30), updates the buffer (2g-35), and checks the validity of the updated buffer with checksum bits in the UDC header. When it is determined that the checksum bits are not error-free, decoding may be performed using the LZ77 algorithm (2g-40) to decompress the data and restore the original data to be delivered to the upper layer (2g-45).

As described above, since the LZ algorithm is a sliding-window method, that is, since previously coded data is updated in a buffer, and coding is performed on immediately following data, successive data has correlation each other. Therefore, the coded data should be decoded normally, after which the data can be decoded normally. Therefore, the receiving PDCP-layer device checks the PDCP serial number of the PDCP header and checks the UDC header (checks the indicator indicating whether or not data compression has been performed) to perform a data compression procedure in ascending order of PDCP serial number on the data to which the data compression procedure has been applied.

Figure 2H:
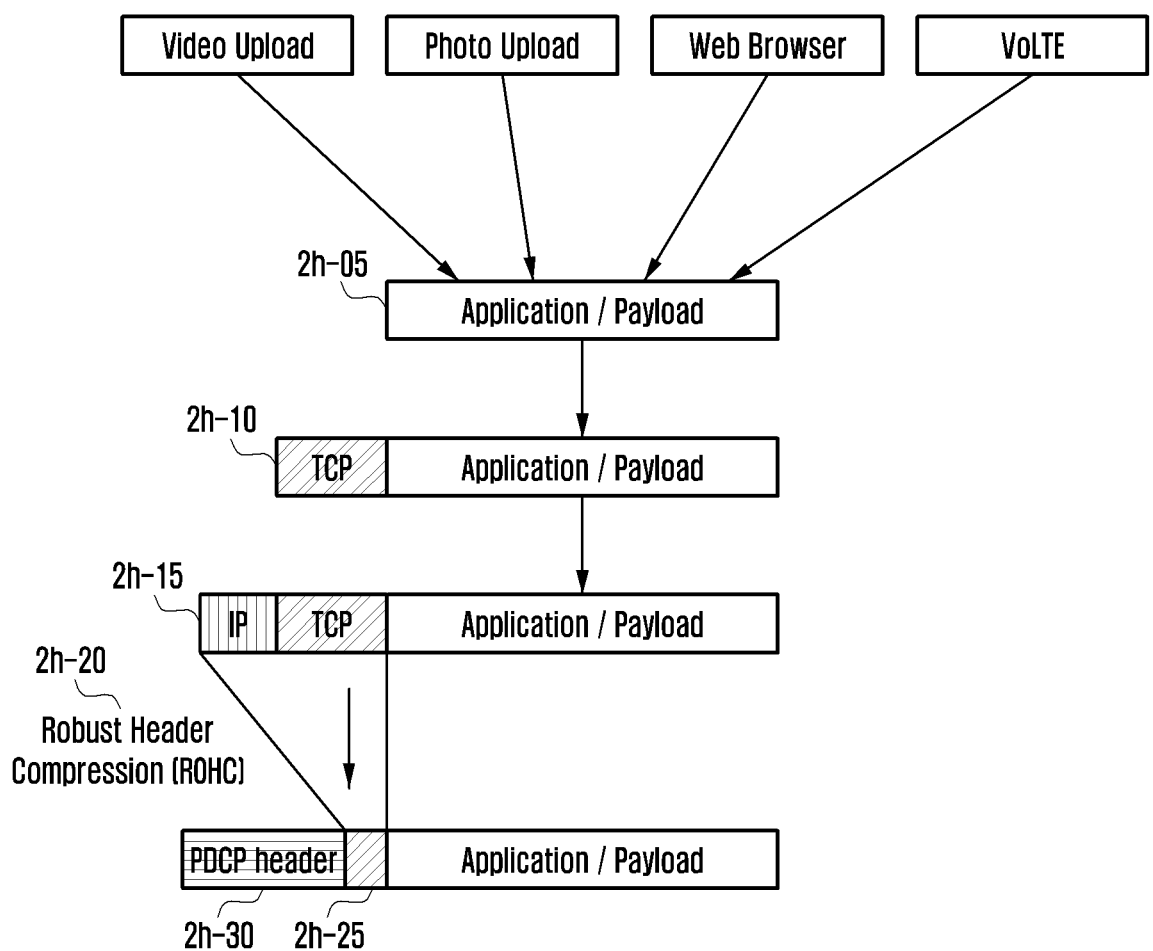
FIG. 2H is a view illustrating a procedure and data configuration for performing robust header compression (ROHC) according to an embodiment of the disclosure.

FIG. 2H is a view illustrating a procedure and data configuration for performing robust header compression (ROHC) according to an embodiment of the disclosure.

In FIG. 2H, the uplink data 2h-05 may be generated as data corresponding to services such as video transmission, picture transmission, web search, and VoLTE. The data generated in the application-layer device is processed through TCP/IP or UDP corresponding to the network data transport layer, may constructs each header 2h-10 and 2h-15, and may be transmitted to the PDCP layer. When the PDCP layer receives data (PDCP SDU) from an upper layer, the following procedure can be performed.

If, in FIG. 2E, configuration is made to use the uplink data compression method in the PDCP layer via the RRC message, such as 2e-10 or 2e-40 or 2e-75, the header compression (ROHC) method may be performed for the PDCP SDU as in 2h-20 to compress the header 2h-15 of the received upper-layer data and generate compressed data 2h-25. If integrity protection is configured, integrity protection may be performed, ciphering may be performed, and a PDCP PDU may be configured by configuring the PDCP header 2h-30. In the above, the PDCP-layer device includes a header compression/decompression device, determines whether or not to perform header compression for each piece of data as configured in the RRC message, and uses the header compression/decompression device. The transmitting end performs data compression using the header compression device in the transmitting PDCP-layer device, and the receiving end performs data decompression using the header decompression device in the receiving PDCP-layer device.

The procedure of FIG. 2H described above can be applied when compressing downlink data as well as when the terminal compresses uplink data. In addition, the description with regard to the uplink data can be applied to the downlink data in the same way.

Figure 2I:
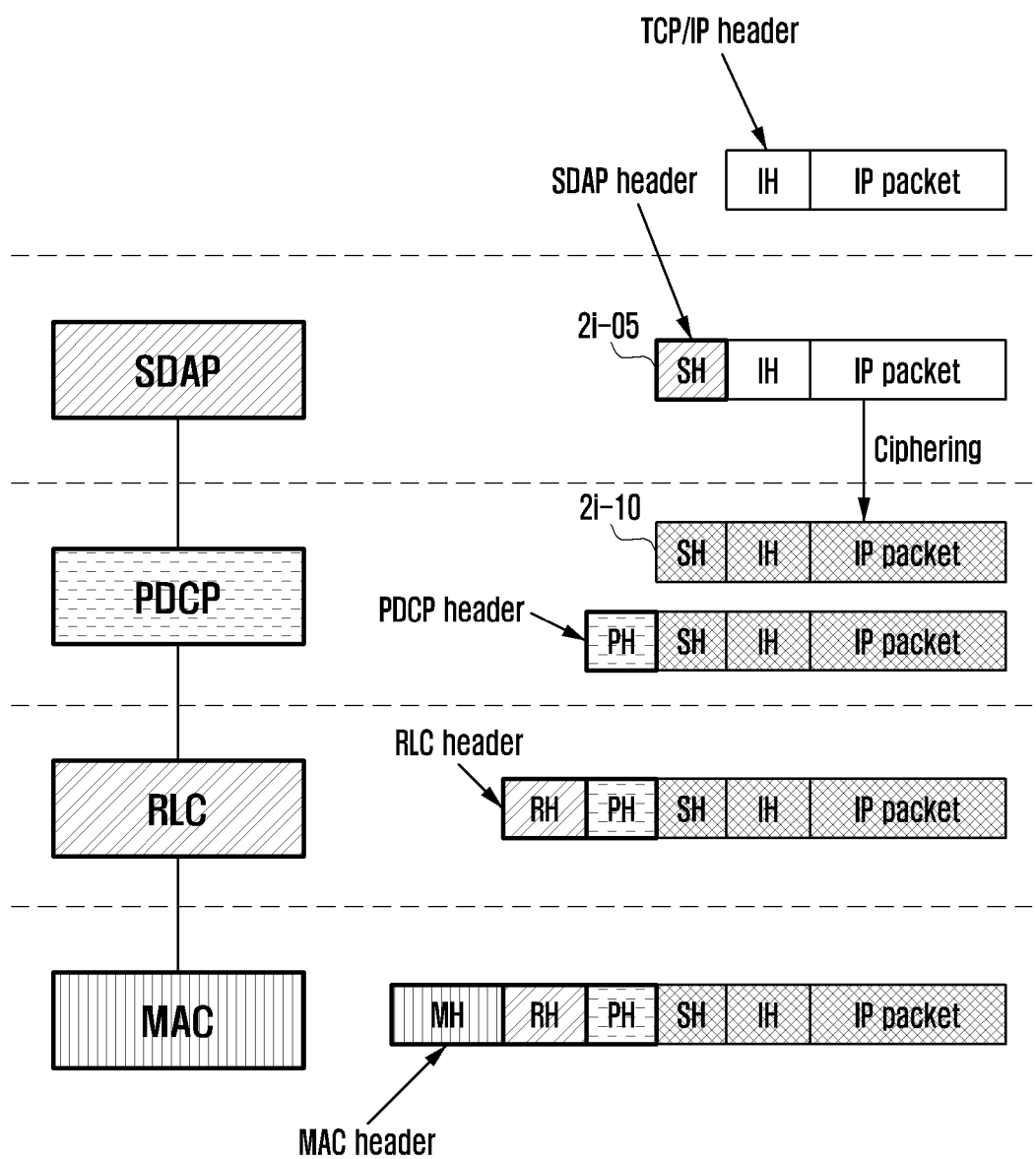
FIG. 2I is a view illustrating a procedure for generating an SDAP header for data received from an upper layer and encrypting the SDAP header in a PDCP-layer device according to an embodiment of the disclosure.

FIG. 2I is a view illustrating a procedure for generating an SDAP header for data received from an upper layer and encrypting the SDAP header in a PDCP-layer device according to an embodiment of the disclosure.

In FIG. 2, when the SDAP-layer device is configured to use the SDAP-layer device function by the RRC message such as 2e-10 or 2e-40 or 2e-75 in FIG. 2e or is configured to use the SDAP header, when receiving data from the upper layer, the SDAP-layer device can generate and configure the SDAP header as in 2i-05 and deliver the same to the PDCP-layer device. The PDCP-layer device performs integrity protection when integrity verification is configured for the PDCP SDUs (SDAP headers and IP packets, 2i-10) received from the higher SDAP-layer device, performs encryption, generates and configures a PDCP header, joins the same, and sends the same to the lower layer to perform RLC data processing in the RLC-layer device and the MAC-layer device.

Figure 2J:
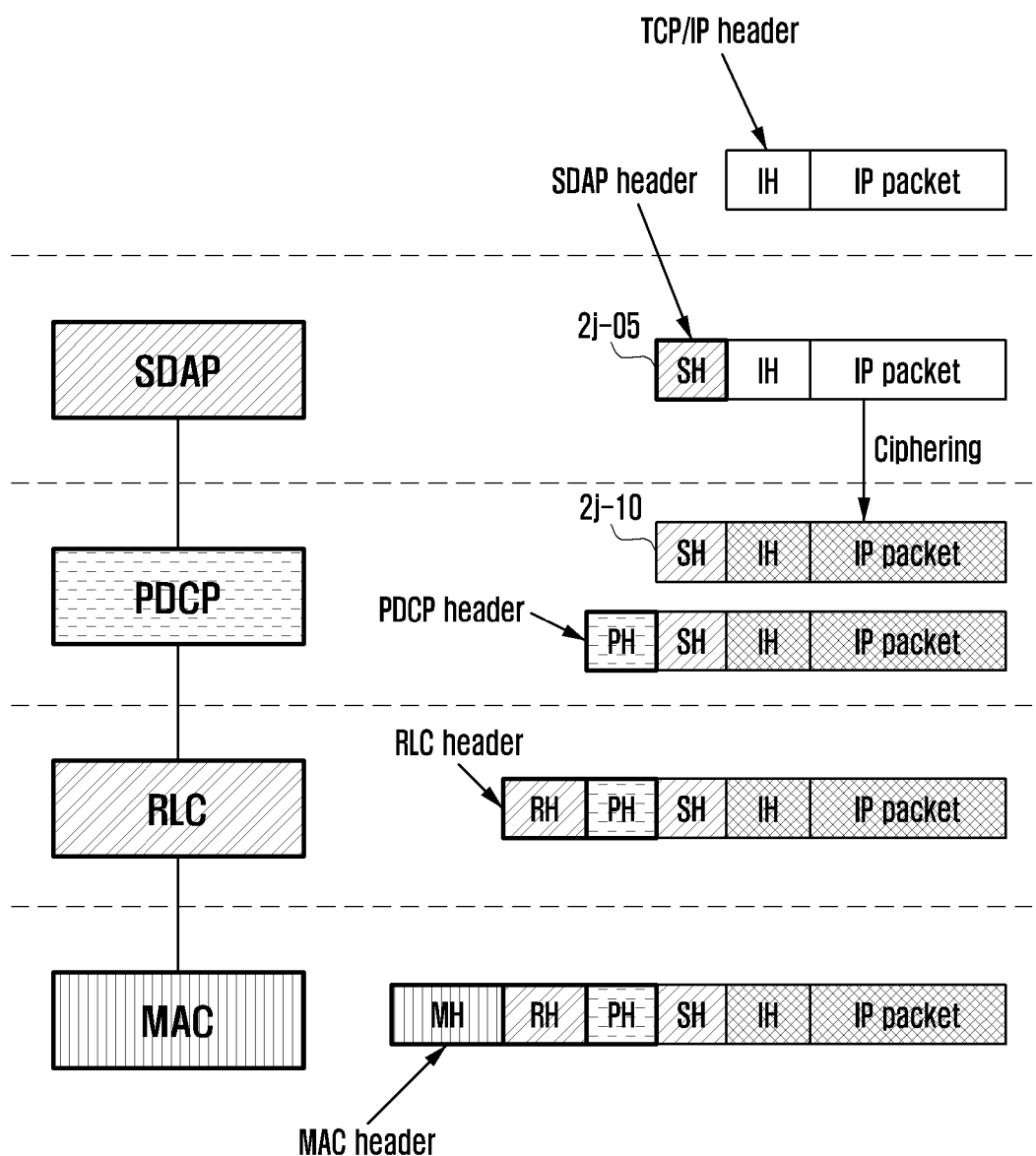
FIG. 2J is a view of a procedure for generating an SDAP header for data received from an upper layer in a PDCP-layer device and not performing encryption on the SDAP header according to an embodiment of the disclosure.

FIG. 2J is a view of a procedure for generating an SDAP header for data received from an upper layer in a PDCP-layer device and not performing encryption on the SDAP header according to an embodiment of the disclosure.

In FIG. 2J, when the SDAP-layer device is set to use the SDAP-layer device function by the RRC message such as 2e-10 or 2e-40 or 2e-75 in FIG. 2e or is set to use the SDAP header, when receiving data from the upper layer, the SDAP-layer device may generate and configure the SDAP header as in 2j-05 and deliver the same to the PDCP-layer device. The PDCP-layer device is characterized in that it encrypts only the remaining data (P packet) except the SDAP header for the PDCP SDU (SDAP header and IP packet, 2j-10) received from the upper SDAP-layer device. In addition, the PDCP-layer device is characterized in that, if integrity verification is configured, the integrity protection is performed only on the remaining data except the SDAP header for the PDCP SDU (SDAP header and IP packet, 2j-10) received from the upper SDAP-layer device. That is, if integrity verification is configured, the PDCP-layer device applies integrity protection to the rest of the data (P packet), other than the SDAP header for the PDCP SDU (SDAP header and IP packet, 2j-10) received from the upper SDAP-layer device, performs encryption, and then produces, configures and joins the PDCP header and transfers to the lower layer to perform data processing in the RLC-layer device and the MAC-layer device. If the SDAP header is not encrypted, the implementation of the base station structure can be facilitated, as described above. In particular, if the SDAP header is not encrypted by the CU in the split central unit (CU)/distributed unit (DU) structure, the SDAP header can be read from the DU and the QoS information can be checked and applied to the scheduling, which is advantageous in matching and adjusting QoS. There is also a benefit in terms of data processing in terminal and base-station implementations.

Figure 2K:
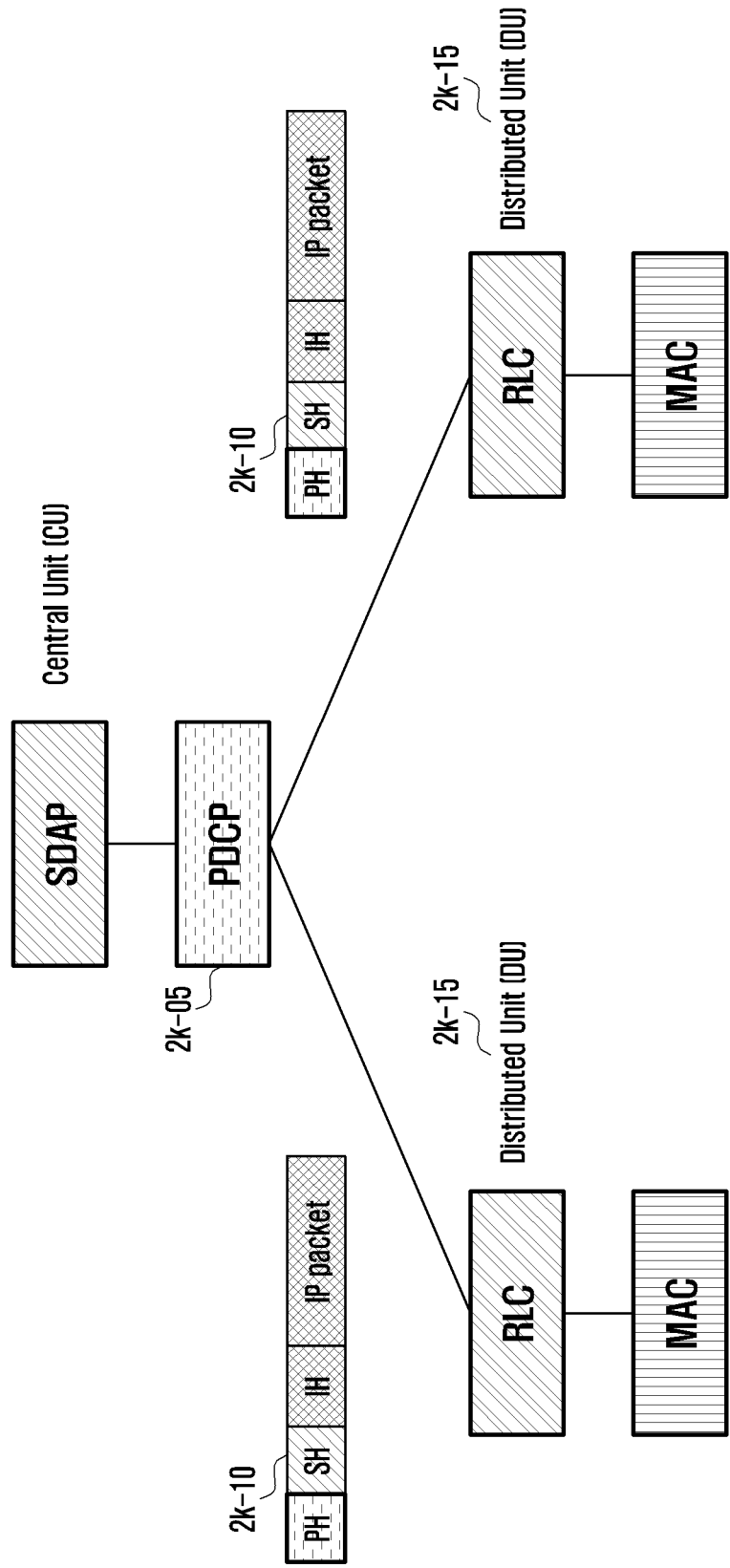
FIG. 2K is a view showing the gain in the structure of the base-station implementation when the unencrypted SDAP header according to the embodiment of the disclosure is applied.

FIG. 2K is a view showing the gain in the structure of the base-station implementation when the unencrypted SDAP header according to the embodiment of the disclosure is applied.

As in FIG. 2K, in order to reduce initial facility costs and maintenance costs in the implementation of a base station, upper-layer devices (e.g., a PDCP-layer device and upper-layer devices) may be implemented in a central unit (CU), and lower-layer devices (for example, an RLC-layer device and lower-layer devices) may be implemented in a plurality of distributed units (DUs) connected to the CU. In this CU-DU split structure, when the unencrypted SDAP header is applied by the PDCP-layer device 2k-05 as proposed in FIG. 2j of the disclosure, the SDAP header is not encrypted, even in a plurality of DUs 2k-15. Therefore, the SDAP header 2k-10 can be read, and QoS information can be checked and applied to scheduling of the DU. Therefore, the QoS information of the SDAP header can be used to allocate and schedule transmission resources in the DU, so it can be advantageous to adjust and adjust QoS for each service.

Figure 2L:
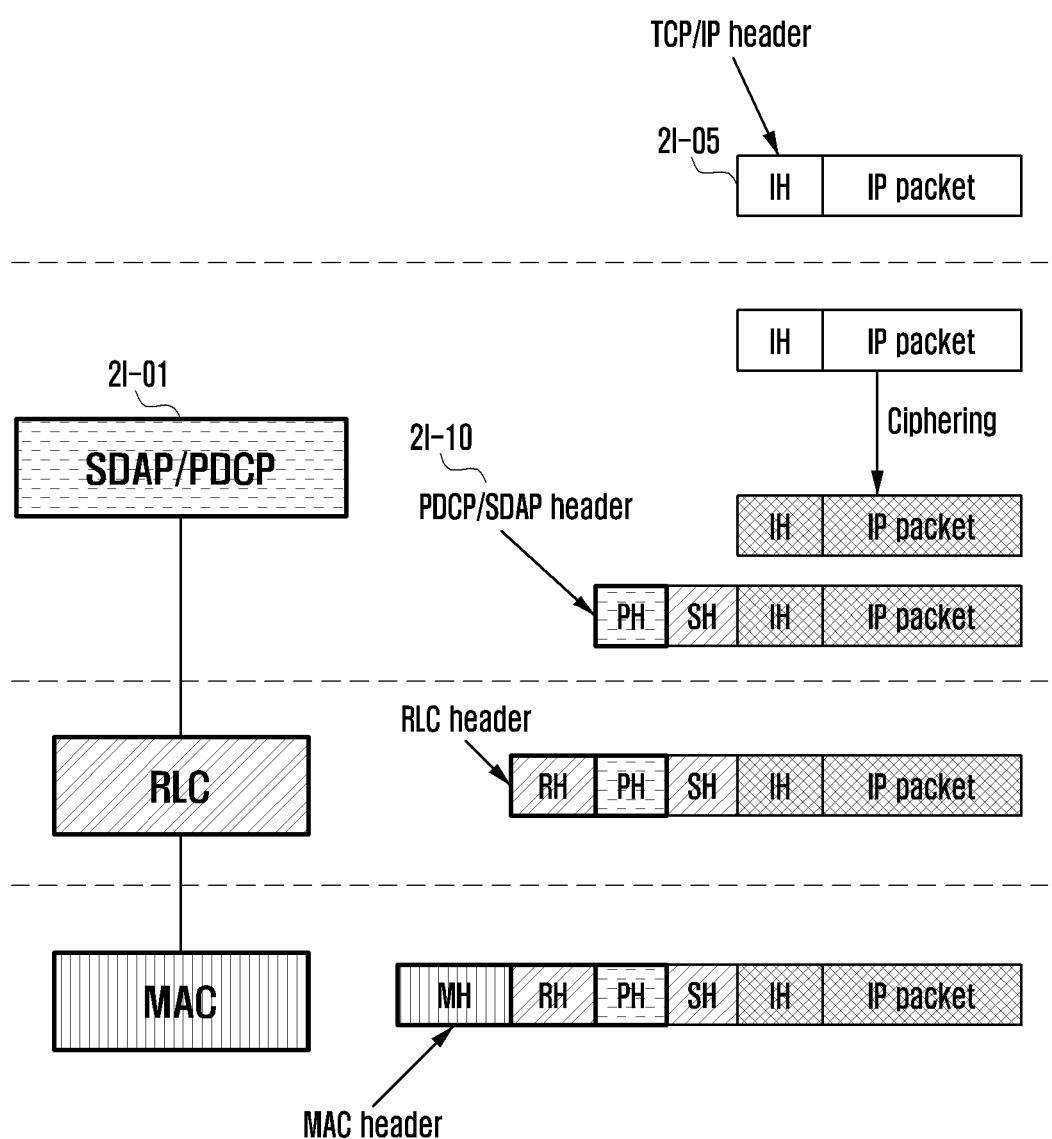
FIG. 2L is a view illustrating processing gains obtained in a base station and a terminal implementation when an unencrypted SDAP header according to an embodiment of the disclosure is applied.

FIG. 2L is a view illustrating processing gains that are obtained in a base station and a terminal implementation when an unencrypted SDAP header according to an embodiment of the disclosure is applied.

In FIG. 2L, when implementing a terminal and a base station, SDAP-layer devices and PDCP-layer devices can be integrated into a single-layer device (2l-01). Since the SDAP-layer device is logically the upper-layer device of the PDCP-layer device, when receiving data (2l-05) from the upper application layer, if the SDAP-layer device is configured to use the SDAP-layer device function by an RRC message such as 2e-10 or 2e-40 or 2e-75 in FIG. 2E, or is configured to use the SDAP header, when receiving data from the upper layer, the SDAP header should be generated and configured as indicated by 2j-05 in FIG. 2J. However, in the implementation of the terminal and the base station, a ciphering procedure or an integrity protection procedure is a highly complex operation, and can be implemented by applying a hardware (HW) accelerator. HW accelerators have high processing gains in repetitive and continuous procedures. However, if the SDAP header is configured whenever the SDAP-layer device receives data from the upper-layer device, the encryption procedure is performed on the data portion, excluding the SDAP header, and the PDCP header is generated and attached to the SDAP header, interruption may occur in the HW accelerator in the above procedure, due to the procedure of generating the SDAP header before performing encryption.

Accordingly, an embodiment of the disclosure proposes a method of integrating an SDAP-layer device and a PDCP-layer device into a single-layer device in an implementation with an unencrypted SDAP header. That is, when data is received from the upper application layer, the encryption procedure is continuously and repeatedly performed every time data is received, and the PDCP header and SDAP header 2l-10 may be simultaneously generated, to be bonded to the encrypted data, and transmitted to the lower layer. Generation of the PDCP header and the SDAP header may be performed in parallel with the encryption procedure. When generating the headers in parallel, the SDAP header, the PDCP header, or the RLC header or the MAC header may be generated together, and the headers may be joined at the beginning of the data processing to prepare for transmission (MAC PDU configuration may be prepared).

In addition, the receiving end separates the SDAP header, the PDCP header, the UDC header, or the RLC header or the MAC header from the data to read all at a time, identify all the information corresponding to each layer, and processes the data in the reverse order of data processing at the transmitting end. Therefore, the HW accelerator can be continuously and repeatedly applied, and there is no interruption such as SDAP header generation in the middle, thereby increasing the efficiency of data processing. In addition, if integrity protection is configured, integrity protection may be repeatedly performed by applying a hardware accelerator as described for the encryption procedure before performing the encryption procedure. That is, integrity protection can be applied and encryption can be performed.

As for the receiving PDCP-layer device, as in 2l-01, a method of implement a single layer device by integrating the SDAP layer device and the PDCP layer device can be applied. That is, when data is received from a lower layer (RLC layer), when the SDAP-layer device function is configured to be used by an RRC message such as 2e-10 or 2e-40 or 2e-75 in FIG. 2e, or when the SDAP header is configured to be used, the PDCP header and SDAP header can be read at once, the headers can be removed, and a deciphering procedure can be repeatedly applied to data. In addition, when integrity protection is configured, integrity verification may be repeatedly performed by applying a hardware accelerator as described for the decryption procedure after performing the decryption procedure. That is, decryption may be performed and integrity verification may be performed.

Figure 2M:
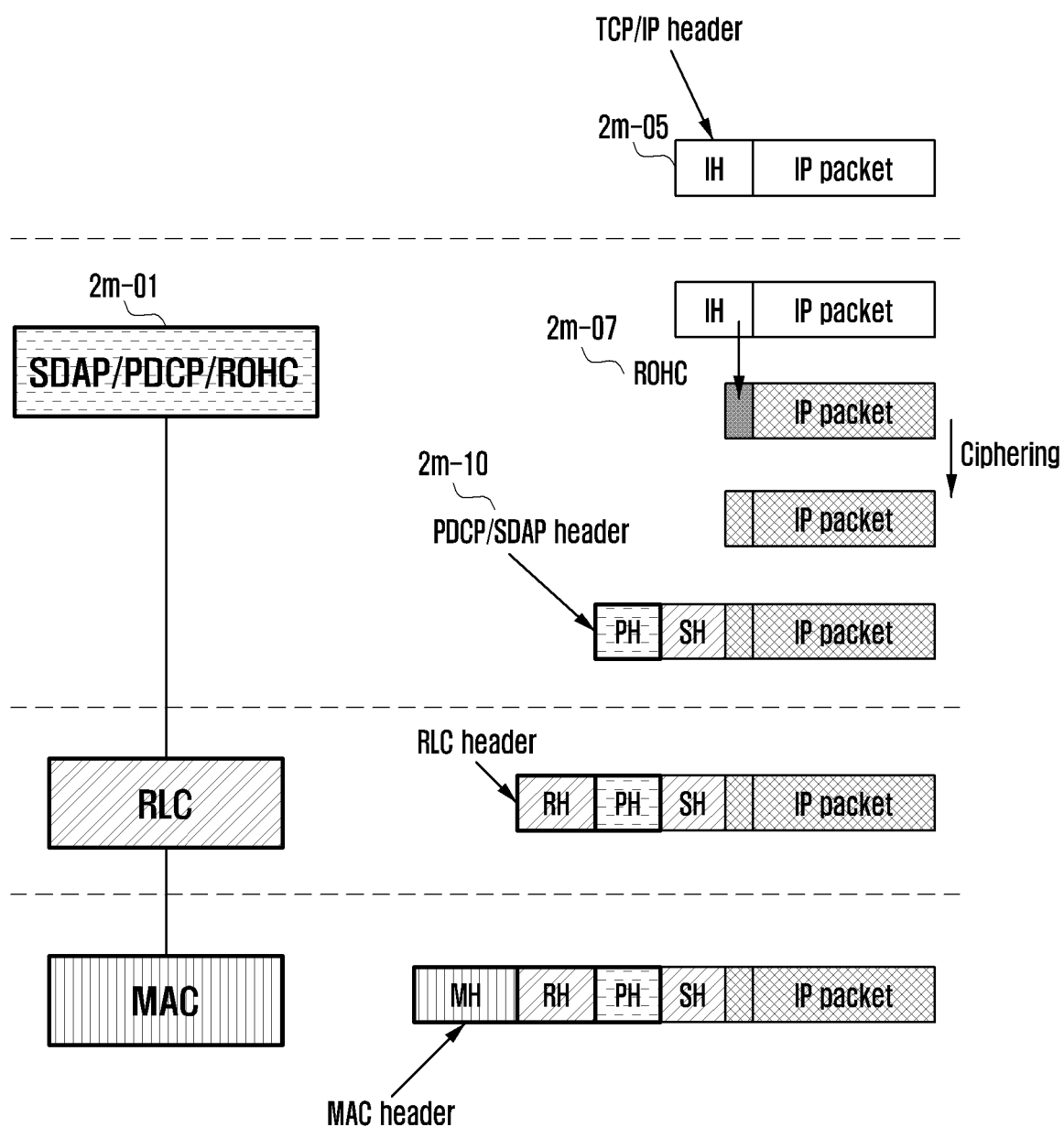
FIG. 2M is a view illustrating processing gains that can be obtained from a base station and a terminal implementation in which ROHC is set when an encrypted SDAP header is applied according to an embodiment of the disclosure.

FIG. 2M is a view illustrating processing gains that can be obtained from a base station and a terminal implementation in which ROHC is set when an unencrypted SDAP header is applied according to an embodiment of the disclosure.

In FIG. 2M, when implementing a terminal and a base station, SDAP-layer devices and PDCP-layer devices may be integrated into a single-layer device (2m-01). Since the SDAP-layer device is logically the upper-layer device of the PDCP-layer device, when receiving data (2m-05) from the upper application layer, in the case in which the SDAP-layer device is configured to use the SDAP-layer device function or an SDAP header through an RRC message such as 2e-10 or 2e-40 or 2e-75 in FIG. 2e, when receiving data from the upper layer, the SDAP header should be generated and configured as indicated by 2j-05 in FIG. 2j. However, in the implementation of the terminal and the base station, the ciphering procedure can be implemented by applying a hardware (HW) accelerator, because it is a highly complex operation. HW accelerators have high processing gains in repetitive and continuous procedures. However, if a process of configuring the SDAP header, performing the encryption procedure on the data portion excluding the SDAP header, generating the PDCP header, and attaching the same to the SDAP header is performed whenever the SDAP-layer device receives data from the upper-layer device, it may interrupt the HW accelerator due to the procedure of generating the SDAP header before performing encryption.

Therefore, the embodiment of the disclosure proposes a method for implementing a single-layer device by integrating the SDAP-layer device and the PDCP-layer device in an implementation with an unencrypted SDAP header in the case in which the ROHC is configured. That is, when data is received from the upper application layer, every time data is received, ROHC is applied to compress the data of the upper layer to generate a compressed header (2m-07), an encryption procedure is continuously and repeatedly performed, and the PDCP header and SDAP header (2m-10) can be generated at the same time to be joined to the encrypted data and transmitted to the lower layer. Generation of the PDCP header and the SDAP header can be performed in parallel with the encryption procedure. When generating the header in parallel, the SDAP header, the PDCP header, the RLC header and the MAC header are generated together, and headers may be joined at the beginning of the data processing to prepare for transmission (MAC PDU configuration may be prepared). In addition, the receiving end may separate the SDAP header, the PDCP header, the UDC header, the RLC header, and the MAC header at a time to read all the information corresponding to each layer, and process the data in the reverse order of data processing at the transmitting end. Therefore, the HW accelerator can be continuously and repeatedly applied, and there is no interruption such as SDAP header generation in the middle, thereby increasing the efficiency of data processing. In addition, if integrity protection is configured, integrity protection may be repeatedly performed by applying a hardware accelerator as described for the encryption procedure before performing the encryption procedure. That is, integrity protection can be applied and encryption can be performed.

As for the receiving PDCP-layer device, as in 2m-01, a method of integrating the SDAP-layer device and the PDCP-layer device into a single-layer device to implement a single-layer device can be applied in the case in which the ROHC is configured. That is, when data is received from a lower layer (RLC layer), when the SDAP-layer device function is configured to be used by an RRC message such as 2e-10 or 2e-40 or 2e-75 in FIG. 2e or when the SDAP header is configured to be used, the PDCP header and SDAP header can be read and removed at once, a deciphering procedure can be repeatedly applied to data, and a decompression procedure may be performed on the upper-layer header (P packet header). In addition, when integrity protection is configured, integrity verification may be repeatedly performed by applying a hardware accelerator as described for the decryption procedure after performing the decryption procedure. That is, decryption may be performed and integrity verification may be performed.

Figure 2N:
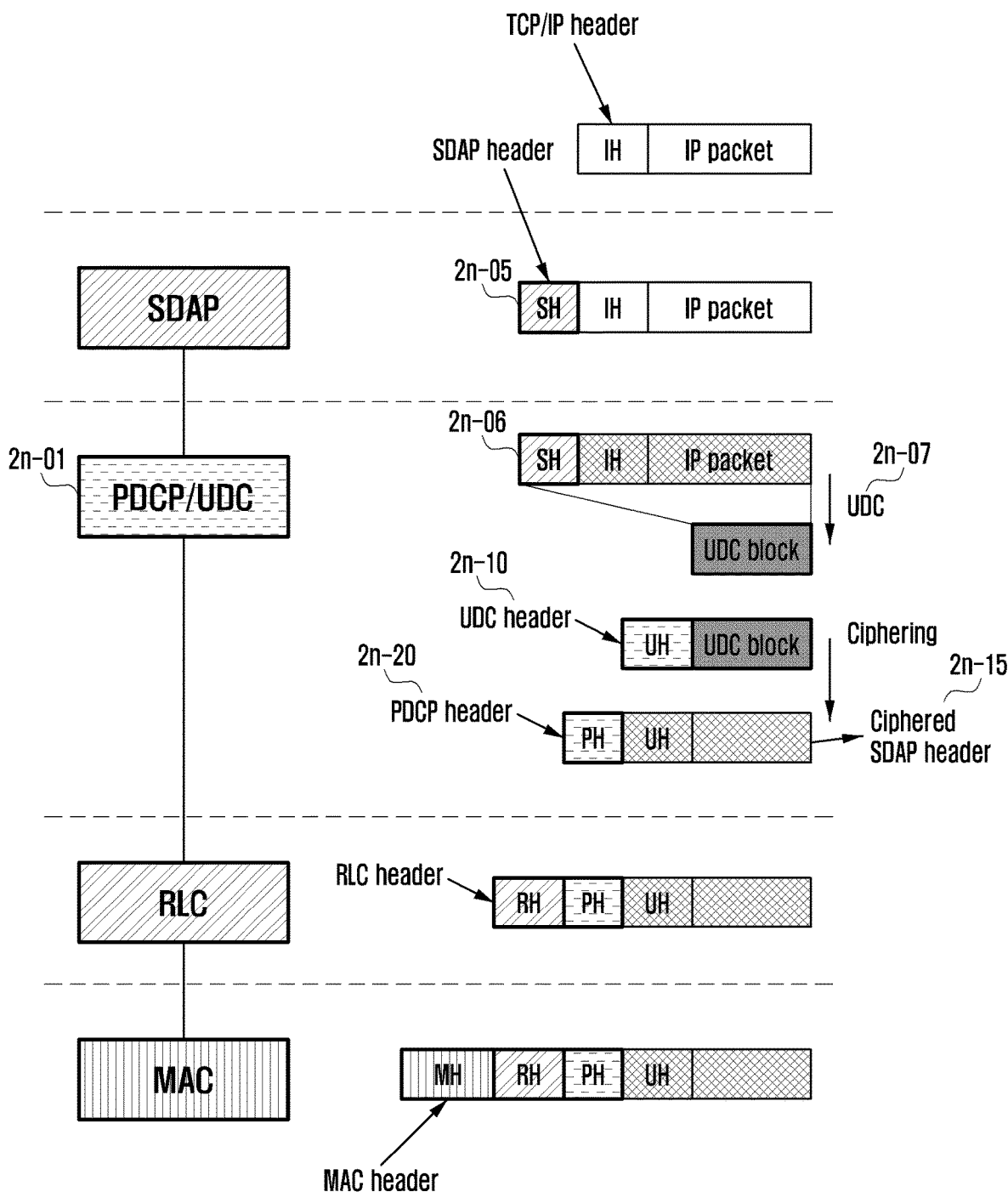
FIG. 2N is a view for explaining generation of an SDCP header for data received from an upper layer and application a user data compression procedure (UDC) to an SDAP header in a PDCP-layer device according to an embodiment of the disclosure.
Figure 20:
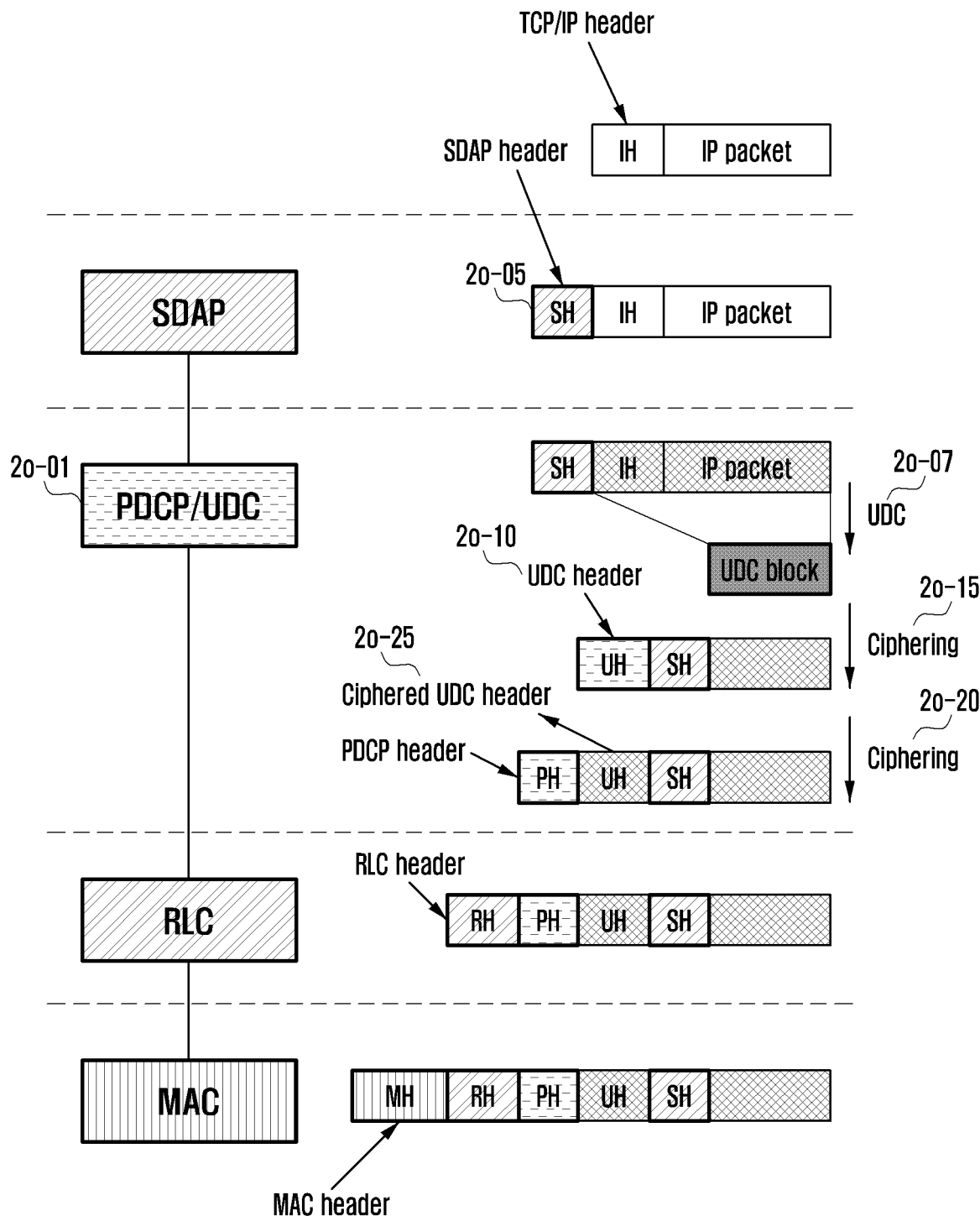

FIG. 2N is a view for explaining the generation of an SDCP header for data received from an upper layer and application of a user data compression procedure (UDC) to an SDAP header in a PDCP-layer device, according to an embodiment of the disclosure.

In FIG. 2N, when the SDAP-layer device is configured to use the SDAP-layer device function by using RRC messages such as 2e-10 or 2e-40 or 2e-75 in FIG. 2E, or is configured to use the SDAP header, and when user data compression (uplink data compression, UDC) is configured, when receiving data from the upper layer, the SDAP-layer device SDAP header may generate and configure the SDAP header as indicated by 2n-05 and transfer the same to the PDCP-layer device. The PDCP-layer device may perform user data compression on the PDCP SDU (SDAP header and IP packet, 2n-06) received from the upper SDAP-layer device (2n-07). In addition, a UDC header may be generated and attached by calculating the checksum field and setting whether to apply the UDC (2n-10). In addition, encryption may be performed on the UDC header and the compressed UDC block, and a PDCP header 2n-20 may be generated, configured, joined, and then forwarded to a lower layer to process data in RLC-layer devices and MAC-layer devices.

The procedure described in connection with FIG. 2N may be characterized by applying a user data compression (UDC) procedure to the SDAP header. However, if the user data compression procedure is applied to the SDAP header as in the above procedure, the SDAP header is encrypted because the encryption procedure is applied to the compressed UDC block. Therefore, it is impossible to obtain the advantages of the base-station implementation illustrated in FIG. 2K and the processing gains of the base station and terminal described in connection with FIGS. 2L and 2M. Accordingly, an embodiment of the disclosure proposes a procedure that does not apply a user data compression (UDC) procedure to the SDAP header in order to obtain the advantages of the base-station implementation illustrated in FIG. 2K and described above and the processing gains of the base station and terminal illustrated in FIGS. 2L and 2M.

FIG. 2O is a view for proposing and explaining a method of generating an SDAP header for data received from an upper layer without applying a user data compression (UDC) procedure to the SDAP header in a PDCP-layer device, according to an embodiment of the disclosure.

In FIG. 2O, when the SDAP-layer device is configured to use the SDAP-layer device function by using RRC messages such as 2e-10 or 2e-40 or 2e-75 in FIG. 2E, or when configured to use the SDAP header, and when user data compression (uplink data compression, UDC) is configured, when receiving data from the upper layer, the SDAP-layer device SDAP header may generate and configure the SDAP header as 2o-05 and transfer the same to the PDCP-layer device. The PDCP-layer device may perform user data compression on the rest of the data except the SDAP header in the PDCP SDU (SDAP header and IP packet, 2o-06) received from the upper SDAP-layer device (2o-07). In addition, a UDC header may be generated and attached by calculating the checksum field and setting whether to apply the UDC (2o-10). If integrity protection is configured, integrity protection is applied to the UDC header and to the compressed UDC block before performing the integrity protection encryption procedure, and then encryption of the UDC block is performed in order to perform encryption on the UDC header and the compressed UDC block. In addition, encryption may be separately performed in the UDC header (2o-15, 2o-20). If encryption is performed only once, the SDAP header is removed in the middle, encryption is performed on the UDC header and the UDC block at once, the unencrypted SDAP header is inserted between the UDC header and the UDC block, data is configured, the PDCP header is generated and configured (2o-20), bonded, and transferred to the lower layer to perform data processing in the RLC-layer device and the MAC-layer device. As described above, if encryption is applied to the UDC header even if the user data compression header is not applied to the SDAP header, the user data compression procedure in the terminal and base-station implementation become complicated, the procedure may needlessly be performed twice when performing encryption and decryption, and even if it is performed once, data processing may be complicated. Therefore, an embodiment of the disclosure proposes a method of not performing encryption on the UDC header. However, even if data processing is complicated, as described above, if the UDC header and data (UDC block) are encrypted separately, the risk of hacking can be effectively reduced and security can be increased. Therefore, this can be an embodiment for enhancing security in the disclosure.

The procedure illustrated in FIG. 2O may be characterized by not applying a user data compression (UDC) procedure to the SDAP header. Therefore, it is impossible to obtain the advantages of the base-station implementation illustrated in FIG. 2K and the processing gains of the base station and terminal illustrated in FIGS. 2L and 2M. However, even if the user data compression header is not applied to the SDAP header, if encryption is applied to the UDC header, the user data compression procedure is complicated in the terminal and base-station implementation, and when performing encryption and decryption, it may be unnecessary to perform the same twice, and even if performed once, data processing may be complicated. Therefore, an embodiment of the disclosure proposes a method of not performing encryption on the UDC header.

Figure 2P:
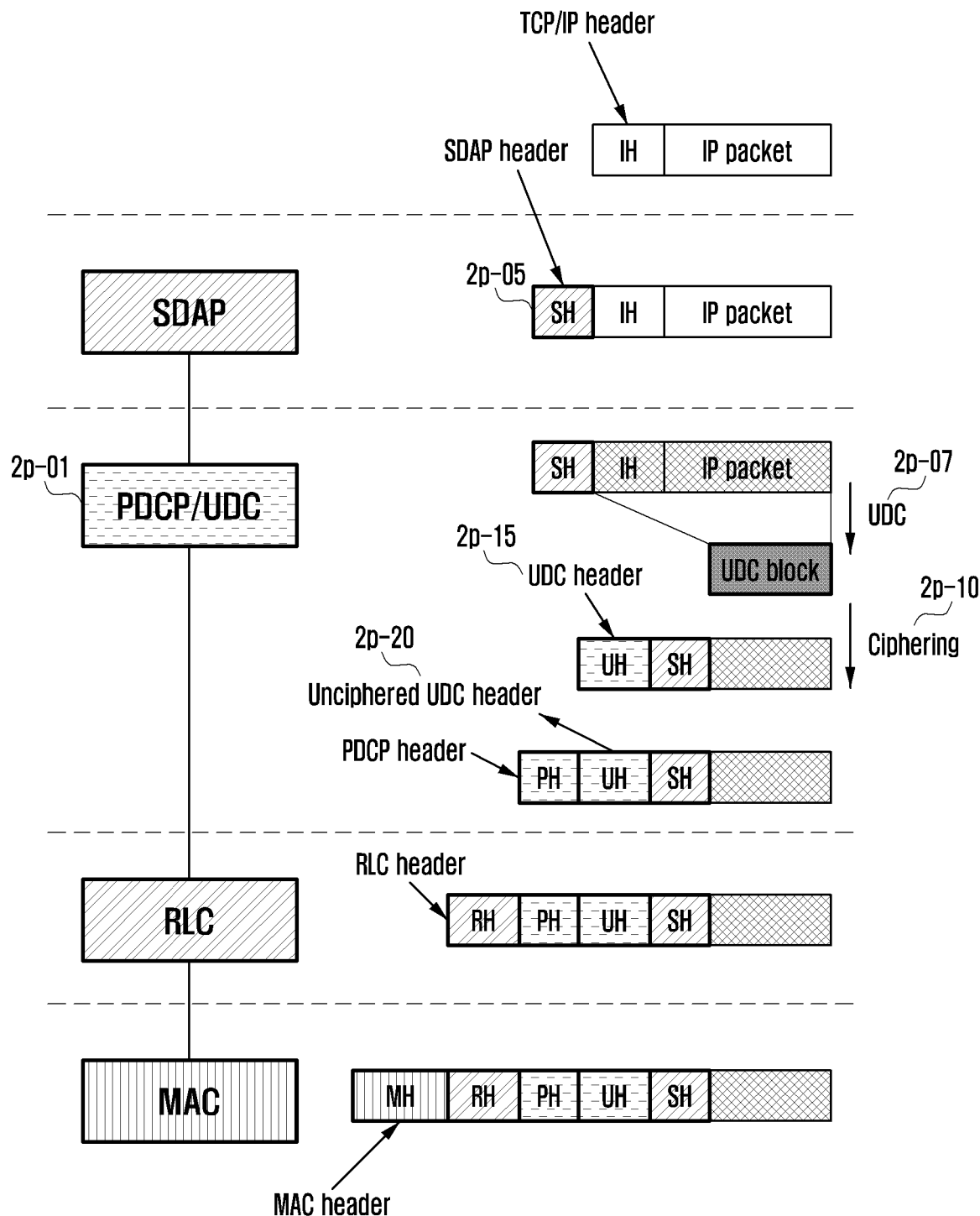
FIG. 2P is a view for proposing and explaining a method of generating an SDAP header for data received from an upper layer in a PDCP-layer device and not applying encryption to a UDC header without applying a user data compression (UDC) procedure to the SDAP header in a PDCP-layer device according to an embodiment of the disclosure.

FIG. 2P is a view for proposing and explaining a method of generating an SDAP header for data received from an upper layer in a PDCP-layer device, not applying encryption to a UDC header, and not applying a user data compression (UDC) procedure to the SDAP header in a PDCP-layer device, according to an embodiment of the disclosure.

In FIG. 2P, when the SDAP-layer device is configured to use the SDAP-layer device function by using RRC messages such as 2e-10 or 2e-40 or 2e-75 in FIG. 2E, or when configured to use the SDAP header, and when user data compression (uplink data compression, UDC) is configured, when receiving data from the upper layer, the SDAP-layer device may generate and configure the SDAP header as indicated by 2p-05, and may transfer the same to the PDCP-layer device. The PDCP-layer device may perform user data compression on the rest of the data except the SDAP header in the PDCP SDU (SDAP header and IP packet, 2p-06) received from the upper SDAP-layer device (2p-07). In addition, if integrity protection is configured, integrity protection may be applied to the UDC block compressed by the user data compression before performing the encryption procedure. That is, integrity protection is not applied to the UDC header or to the SDAP header. In addition, encryption may be applied to the UDC block compressed by the user data compression (2p-10). In addition, a UDC header may be generated and attached by calculating the checksum field and configuring whether to apply UDC (2p-15, 2p-20). In addition, the PDCP header may be generated, configured, joined, and then transmitted to a lower layer to process data in the RLC-layer device and the MAC-layer device. As suggested above, if the user data compression header is not applied to the SDAP header and encryption is not applied to the UDC header, the user data compression procedure and the encryption and decryption procedures are simplified in the terminal and base-station implementation, and complicated procedures are eliminated. This simplifies processing procedures of the implementation and reduces the processing burden thereof.

The procedure illustrated in FIG. 2P may be characterized in that the user data compression (UDC) procedure is not applied to the SDAP header and in that encryption is not performed on the UDC header. In addition, the procedure may be characterized in that encryption is not performed without applying integrity protection to the UDC header or to the SDAP header. Therefore, it is possible to obtain the advantages of the base-station implementation illustrated in FIG. 2K and the processing gains of the base station and terminal illustrated in FIGS. 2L and 2M. In addition, if encryption is not performed on the UDC header in the above procedure, the validity of the UDC buffer contents can be confirmed by first reading and calculating the checksum field of the UDC header before performing decryption at the receiving end. Therefore, if a checksum failure occurs, the amount of data to be processed can be reduced because the corresponding data can be immediately discarded and a checksum failure processing procedure can be performed without performing a decoding procedure.

Figure 2Q:
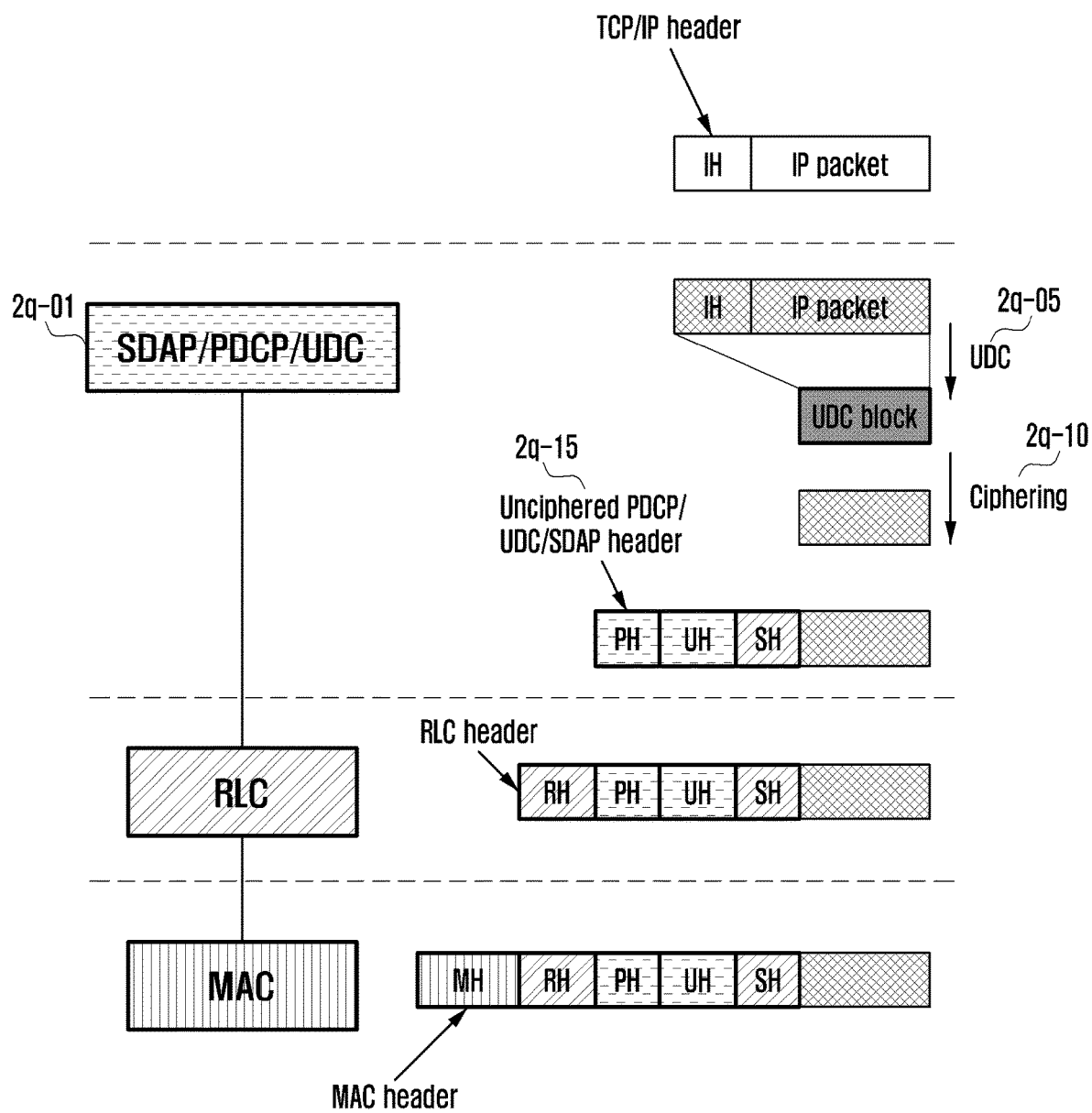
FIG. 2Q is a view illustrating the processing gain that can be obtained in a base station and a terminal implementation in an SDAP/PDCP-layer device or a bearer or a logical channel in which UDC is configured when applying an unencrypted SDAP header without user data compression and applying an unencrypted UDC header, according to an embodiment of the disclosure.

FIG. 2Q is a view illustrating a processing gain that can be obtained in a base station and a terminal implementation in an SDAP/PDCP-layer device or a bearer or a logical channel in which UDC is configured when applying an unencrypted SDAP header without user data compression and applying an unencrypted UDC header according to an embodiment of the disclosure.

In FIG. 2Q, when implementing a terminal and a base station, an SDAP-layer device and a PDCP-layer device may be integrated and implemented as a single-layer device (2q-01). Since the SDAP-layer device is logically the upper-layer device of the PDCP-layer device, when receiving data (2q-05) from the upper application layer, in the case in which the SDAP-layer device is configured to use the SDAP-layer device function or an SDAP header by an RRC message such as 2e-10 or 2e-40 or 2e-75 in FIG. 2E, when receiving data from the upper layer, the SDAP header should be generated and configured as 2j-05 in FIG. 2J. However, in the implementation of the terminal and the base station, the ciphering procedure can be implemented by applying a hardware (HW) accelerator because it is a highly complex operation. HW accelerators have high processing gains in repetitive and continuous procedures. However, if a process of configuring the SDAP header, performing the encryption procedure on the data portion excluding the SDAP header, generating the PDCP header, and attaching the same to the SDAP header is performed whenever the SDAP-layer device receives data from the upper-layer device, it may interrupt the HW accelerator due to the procedure of generating the SDAP header before performing encryption.

Therefore, the embodiment of the disclosure proposes a method for implementing a single-layer device by integrating the SDAP-layer device and the PDCP-layer device in an implementation with an unencrypted SDAP header in the case in which the ROHC is configured. That is, when data is received from the upper application layer, user data compression (UDC) is applied to compress the data of the upper layer to generate a compressed UDC block each time data is received, (2q-05), an encryption procedure may be continuously and repeatedly performed, and the PDCP header, the UDC header and the SDAP header (2q-15) may be generated at the same time, joined to the encrypted data, and transmitted to the lower layer. Generation of the PDCP header, the UDC header, and the SDAP header may be performed in parallel with the encryption procedure. When generating the headers in parallel, the SDAP header, PDCP header, UDC header, RLC header and MAC header are generated together, and the headers may be joined at the beginning of the data processing to thus prepare for transmission (MAC PDU configuration may be prepared). In addition, the receiving end may read all of the SDAP header, PDCP header, UDC header, RLC header and MAC header at one time, identify all of the information corresponding to each layer, and process the data in the reverse order of data processing at the transmitting end. Therefore, the HW accelerator can be continuously and repeatedly applied, and there is no interruption such as SDAP header generation in the middle, thereby increasing the efficiency of data processing. The HW accelerator can also be applied to the user data compression procedure. In addition, if integrity protection is configured, integrity protection may be repeatedly performed by applying a hardware accelerator as described for the encryption procedure before performing the encryption procedure. That is, integrity protection can be applied and encryption can be performed.

As for the receiving PDCP-layer device, as in 2q-01, a method of integrating the SDAP-layer device and the PDCP-layer device into a single-layer device to implement a single-layer device can be applied in the case in which the ROHC is configured. That is, when data is received from a lower layer (RLC layer), when the SDAP-layer device function is configured to be used by an RRC message such as 2e-10 or 2e-40 or 2e-75 in FIG. 2e, or when the SDAP header is configured to be used, the PDCP header, the UDC header, and SDAP header may be read and removed at once, a deciphering procedure may be repeatedly applied to data, and a user data decompression procedure may be performed. In addition, if encryption is not performed on the UDC header in the above procedure, the validity of the UDC buffer contents may be confirmed by first reading and calculating the checksum field of the UDC header before performing decryption at the receiving end. Therefore, if a checksum failure occurs, the amount of data to be processed can be reduced because the corresponding data can be immediately discarded and a checksum failure processing procedure can be performed without performing a decoding procedure. In addition, if integrity protection is configured, integrity verification can be repeatedly performed by applying a hardware accelerator as described for the decryption procedure after performing the decryption procedure. That is, decryption can be performed and integrity verification can be performed.

Figure 2R:
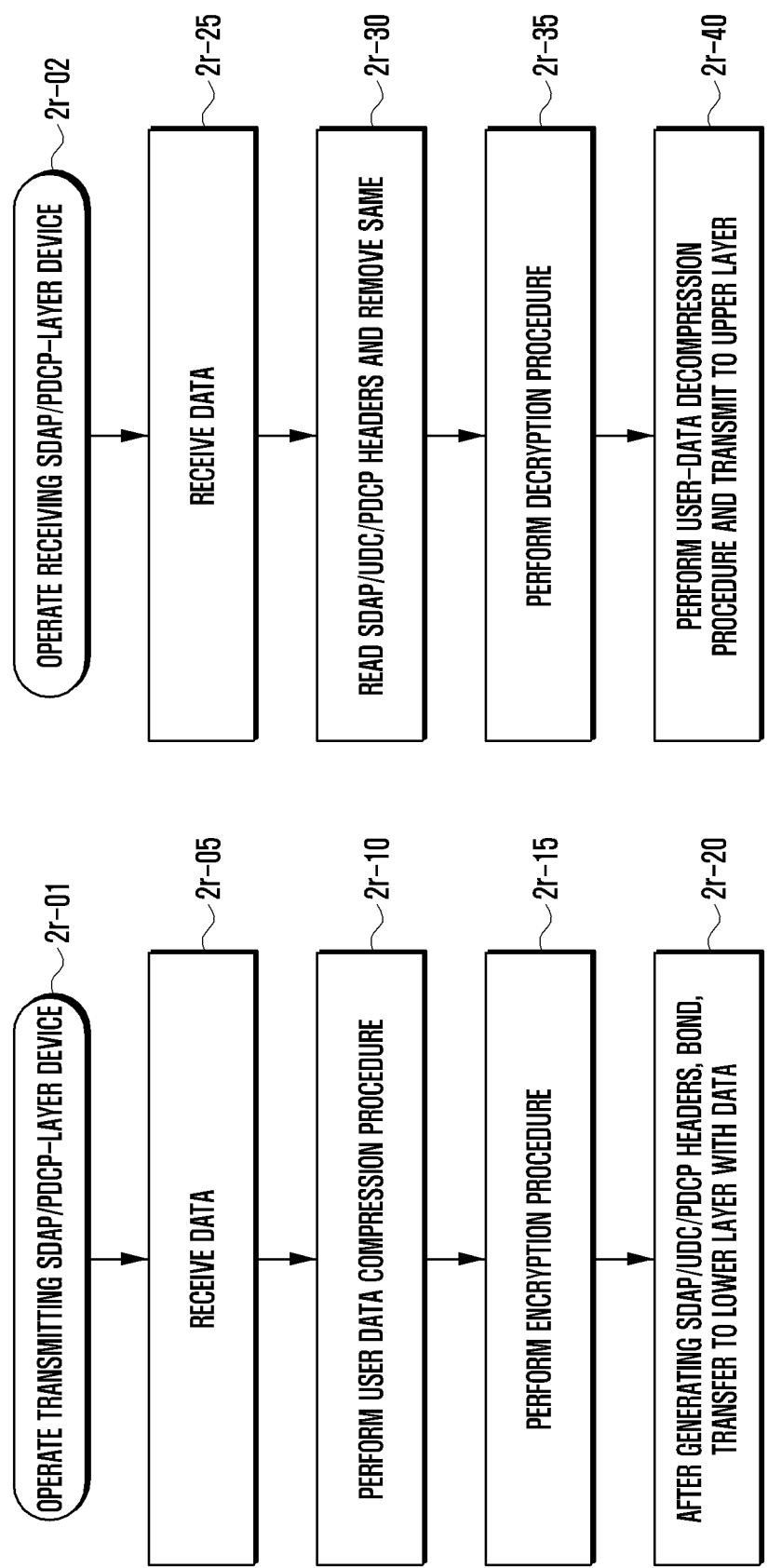
FIG. 2R is a view illustrating the operation of a transmitting SDAP/PDCP-layer device and a receiving SDAP/PDCP-layer device in the SDAP/PDCP-layer device or the bearer or logical channel in which the UDC is configured when applying unencrypted SDAP header without user data compression and applying an unencrypted UDC header, according to an embodiment of the disclosure.

FIG. 2R is a view illustrating the operations of a transmitting SDAP/PDCP-layer device and a receiving SDAP/PDCP-layer device in the SDAP/PDCP-layer device or the bearer or logical channel in which the UDC is configured when applying unencrypted SDAP header without user data compression and with unencrypted UDC header, according to an embodiment of the disclosure.

In FIG. 2R, when implementing a terminal and a base station, an SDAP-layer device and a PDCP-layer device may be integrated and implemented as a single-layer device (2r-01). In an embodiment of the disclosure, a method for integrating SDAP-layer devices and PDCP-layer devices into a single-layer device by way of implementation with a non-encrypted SDAP header when UDC is configured is proposed. That is, when receiving data from the upper application layer (2r-05), the transmitting SDAP/PDCP-layer device may apply user data compression (UDC) whenever data is received to compress the data of the upper layer to generate a compressed UDC block (2r-10) and continuously and repeatedly perform the encryption procedures (2r-15), and the PDCP header, UDC header and SDAP header (2r-20) can be generated at the same time to thus be joined to the encrypted data and transmitted to a lower layer. Generation of the PDCP header, the UDC header, and the SDAP header may be performed in parallel with the encryption procedure. When generating the headers in parallel, the SDAP header, PDCP header, UDC header, RLC header and MAC header can be generated together, and headers can be joined at the beginning of data processing to prepare for transmission (MAC PDU configuration can be prepared). In addition, the receiving end may separate the SDAP header, PDCP header, UDC header, RLC header, and MAC header from data at one time, read all the information corresponding to each layer, and process the data in the reverse order of data processing at the transmitting end. Therefore, the HW accelerator can be continuously and repeatedly applied, and there is no interruption such as SDAP header generation in the middle, thereby increasing the efficiency of data processing. The HW accelerator can also be applied to the user data compression procedure.

Even in the receiving PDCP-layer device, the method of integrating the SDAP-layer device and the PDCP-layer device into a single-layer device can be applied when the UDC is configured. That is, when data is received from the lower layer (RLC layer) (2r-25), the SDAP-layer device function is configured to use the SDAP-layer device function by an RRC message such as 2e-10, 2e-40, or 2e-75 in FIG. 2E or is configured to use the SDAP header, and the receiving SDAP/PDCP-layer device may read and remove the PDCP header, the UDC header, and the SDAP header all at once (2r-30), repeatedly apply a decoding procedure to the data (2r-35), perform a user data decompression procedure, and transmit the result thereof to the upper layer (2r-40).

In the above-described embodiment of the disclosure, there is proposed a method in which the SDAP layer and the PDCP layer are implemented in an integrated manner, the data processing of the PDCP-layer device is performed in order to remove the interference of the HW accelerator due to the generation of the SDAP header for each piece of received data, and when generating the PDCP header, the UDC header or SDAP header is used, and the advantages of reducing the number of unnecessary memory accesses caused by generating the SDAP header in advance and increasing the efficiency of the HW accelerator have been explained. In addition, the proposed method can efficiently perform terminal data processing on the receiving side of the terminal in the same manner.

In the embodiment of the disclosure, the implementation complexity and problems that may occur due to the generation and encryption of SDAP headers (ciphering) and uplink data compression (UDC) truncation are described, and a method for solving the problems is proposed.

In the above, whether to use the SDAP header for each bearer may be configured as an RRC message by the base station, as illustrated in FIG. 2E, and whether the UDC for each bearer is applied may also be configured by the base station as an RRC message, as described above.

In the next embodiment of the disclosure, it is proposed that the SDAP header and the UDC cannot be simultaneously used for one bearer when the base station sets whether to use the SDAP header for each bearer and whether to apply the UDC as an RRC message (the SDAP header cannot be configured for a DRB configured with UDC, or both SDAP header and UDC cannot be configured for a DRB, or either an SDAP header or UDC can be configured for a DRB, not both). That is, it is possible to prohibit the base station from simultaneously configuring the use of the SDAP header and the UDC application for one bearer in an RRC message. As described above, when the UDC procedure is performed on the UDC-configured bearer, the UDC procedure is complicated, and implementation complexity is further increased due to generation and non-encryption of the SDAP header. The UDC is applied to the uplink data, and when the SDAP header is configured for the uplink data, this corresponds to the case where remapping between the bearer and the flow is configured. In this case, it might not be appropriate to use UDC. This is because it is very inefficient to perform re-mapping between bearers and flows to the bearer to which the UDC is applied because the UDC procedure needs the transmitting end and receiving end to be synchronized for data compression. Therefore, if the use of the SDAP header and the setting of the UDC are not simultaneously set for one bearer in order to deal with the above-described complexity, the complex problems described above do not occur. Therefore, in another embodiment of the disclosure, the base station does not allow the UE to simultaneously configure the use of the SDAP header and the UDC for one bearer.

In the above, when the base station does not simultaneously configure the use of the SDAP header and the UDC for a single bearer to the terminal, the UDC header can be encrypted for enhanced security. That is, when receiving upper-layer data, after data compression is performed by a UDC procedure, a UDC header may be generated, ciphering may be performed on the UDC header and the compressed UDC data block, and a PDCP header may be generated in front of the encrypted UDC header and the UDC data block to be concatenated and transferred to a lower layer.

As another method, when the base station does not simultaneously configure the use of the SDAP header and the UDC for a single bearer, the base station can quickly check the checksum field of the UDC header and quickly determine whether to discard the UDC data in order to reduce the number of decoding procedures. That is, the UDC header might not be encrypted. That is, when receiving the upper-layer data, data compression may be performed by a UDC procedure, encryption may be performed on the compressed data block, and a UDC header and PDCP header may be generated to be concatenated in front of the encrypted UDC data block and transferred to a lower layer. Therefore, the receiving PDCP-layer device may check the UDC header before performing decryption, check the validity of the UDC with the checksum field, and if it is not valid, discard the received data immediately without performing decryption. Decryption may be performed only on data that is verified as the checksum field, and a user data decompression procedure may be performed.

In addition, the integrity verification protection procedure may also cause a complicated implementation problem when the integrity verification protection procedure is configured for one bearer with SDAP header use or UDC application. Therefore, it is not possible to allow SDAP header usage and integrity verification protection to be simultaneously set in one bearer. In addition, it might not be permitted to simultaneously configure the integrity verification and UDC application for one bearer.

Figure 2S:
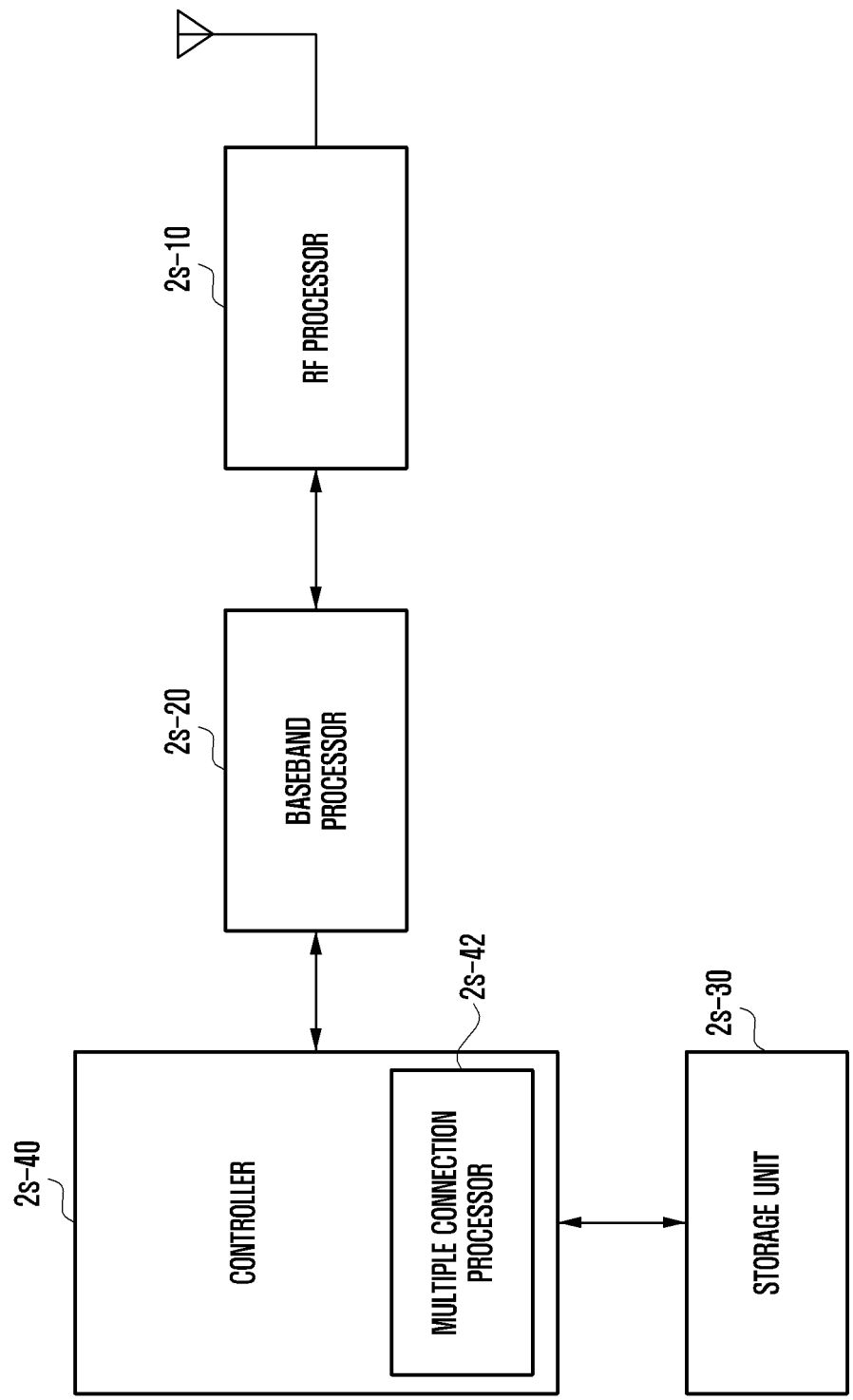
FIG. 2S is a view illustrating the configuration of a terminal according to an embodiment of the disclosure.

FIG. 2S is a view showing the configuration of a terminal according to an embodiment of the disclosure.

Referring to FIG. 2S, the terminal includes a radio-frequency (RF) processor 2s-10, a baseband processor 2s-20, a storage unit 2s-30, and a controller 2s-40. The controller 2s-40 may further include a multiple-connection processor 2s-42.

The RF processor 2s-10 performs a function for transmitting and receiving a signal via a wireless channel, such as band conversion and amplification of the signal. That is, the RF processor 2s-10 up-converts a baseband signal provided from the baseband processor 2s-20 to an RF band signal and then transmits the same through an antenna, and down-converts an RF band signal received through the antenna to a baseband signal. For example, the RF processor 2s-10 may include a transmission filter, a reception filter, an amplifier, a mixer, an oscillator, a digital-to-analog converter (DAC), an analog-to-digital converter (ADC), etc. In FIG. 1H, although only one antenna is illustrated, the terminal may have multiple antennas. Also, the RF processor 2s-10 may include a plurality of RF chains. Furthermore, the RF processor 2s-10 may perform beamforming. For the beamforming, the RF processor 2s-10 may adjust the phase and magnitude of each of signals transmitted and received through multiple antennas or antenna elements. In addition, the RF processor may perform MIMO, and may receive multiple layers when performing MIMO operations. The RF processor 2s-10 may perform reception beam sweeping by appropriately configuring a plurality of antennas or antenna elements under the control of the controller, or may adjust the direction and beam width of the reception beam so that the reception beam is coordinated with the transmission beam.

The baseband processor 2s-20 performs a function of conversion between a baseband signal and a bit stream according to the physical-layer standard of a system. For example, during data transmission, the baseband processor 2s-20 generates complex symbols by encoding and modulating a transmission bit stream. In addition, upon receiving data, the baseband processor 2s-20 restores the received bit stream through demodulation and decoding of the baseband signal provided from the RF processor 2s-10. For example, in the case of conforming to an orthogonal frequency-division multiplexing (OFDM) method, when transmitting data, the baseband processor 2s-20 encodes and modulates a transmission bit stream to generate complex symbols, maps the complex symbols to subcarriers, and then configures OFDM symbols via an inverse fast Fourier transform (IFFT) operation and cyclic prefix (CP) insertion. In addition, when receiving data, the baseband processor 2s-20 divides the baseband signal provided from the RF processor 2s-10 into units of OFDM symbols, restores signals mapped to subcarriers via a fast Fourier transform (FFT) operation, and then restores a received bit stream via demodulation and decoding.

The baseband processor 2s-20 and the RF processor 2s-10 transmit and receive signals as described above. Accordingly, each of the baseband processor 2s-20 and the RF processor 2s-10 may be referred to as a transmitter, a receiver, a transceiver, or a communicator. Furthermore, at least one of the baseband processor 2s-20 and the RF processor 2s-10 may include a plurality of communication modules to support a plurality of different radio access technologies. In addition, at least one of the baseband processor 2s-20 and the RF processor 2s-10 may include different communication modules to process signals in different frequency bands. For example, the different radio access technologies may include an LTE network, an NR network, and the like. In addition, the different frequency bands may include a super-high-frequency (SHF) (e.g., 2.5 GHz, 5 GHz) band and a millimeter-wave (e.g., 60 GHz) band.

The storage unit 2s-30 stores data such as a basic program, an application, and configuration information for the operation of the terminal. The storage unit 2s-30 provides stored data in response to a request from the controller 2s-40.

The controller 2s-40 controls the overall operation of the terminal according to an embodiment of the disclosure. For example, the controller 2s-40 transmits and receives signals through the baseband processor 2s-20 and the RF processor 2s-10. In addition, the controller 2s-40 records and reads data in the storage unit 2s-30. To this end, the controller 2s-40 may include at least one processor. For example, the controller 2s-40 may include a communication processor (CP) that performs control for communication and an application processor (AP) that controls an upper layer such as an application.

Figure 2T:
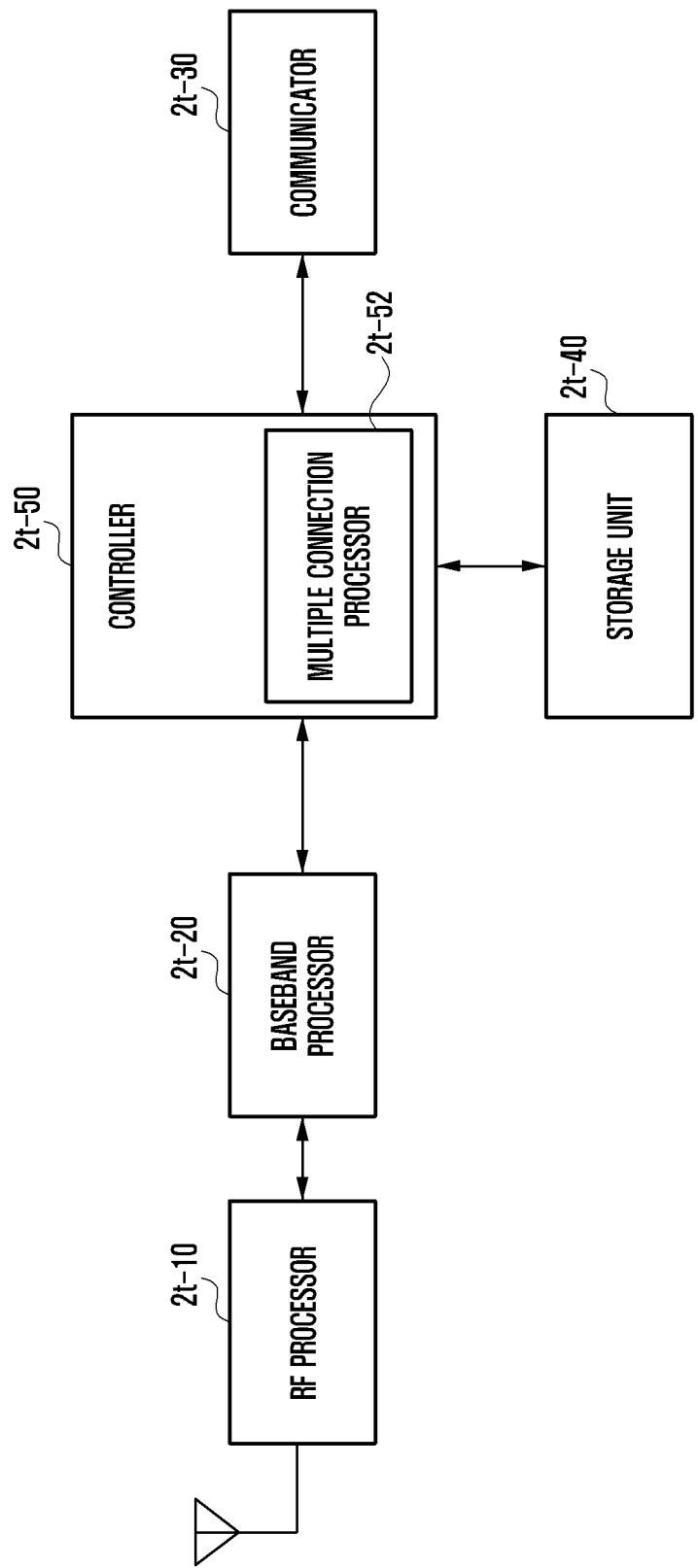
FIG. 2T is a view illustrating the configuration of a base station according to an embodiment of the disclosure.

FIG. 2T is a view illustrating the configuration of a base station according to an embodiment of the disclosure.

As illustrated in FIG. 2T, the base station includes an RF processor 2t-10, a baseband processor 2t-20, a backhaul communicator 2t-30, a storage unit 2t-40, and a controller 2t-50. The controller 2t-50 may further include a multiple-connection processor 2t-52.

The RF processor 2t-10 performs functions for transmitting and receiving a signal via a wireless channel, such as band conversion and amplification of the signal. That is, the RF processor 2t-10 up-converts a baseband signal provided from the baseband processor 1i-20 to an RF band signal and then transmits the same through an antenna, and down-converts an RF band signal received through the antenna to a baseband signal. For example, the RF processor 2t-10 may include a transmission filter, a reception filter, an amplifier, a mixer, an oscillator, a DAC, an ADC, etc. In FIG. 2T, although only one antenna is illustrated, the first connection node may have multiple antennas. Also, the RF processor 2t-10 may include a plurality of RF chains. Furthermore, the RF processor 2t-10 may perform beamforming. For the beamforming, the RF processor 2t-10 may adjust the phase and magnitude of each of signals transmitted and received through multiple antennas or antenna elements. The RF processor may perform down-MIMO operations by transmitting one or more layers.

The baseband processor 2t-20 performs a function of conversion between a baseband signal and a bit stream according to the physical-layer standard of the first wireless access technology. For example, during data transmission, the baseband processor 2t-20 generates complex symbols by encoding and modulating a transmission bit stream. In addition, upon receiving data, the baseband processor 2t-20 restores the received bit stream through demodulation and decoding of the baseband signal provided from the RF processor 2t-10. For example, in the case of conforming to the OFDM method, when transmitting data, the baseband processor 2t-20 encodes and modulates a transmission bit stream to generate complex symbols, maps the complex symbols to subcarriers, and then configures OFDM symbols via IFFT operation and CP insertion. In addition, when receiving data, the baseband processor 2t-20 divides the baseband signal provided from the RF processor 2t-10 into units of OFDM symbols, restores signals mapped to subcarriers via the FFT operation, and then restores a received bit stream via demodulation and decoding. The baseband processor 2t-20 and the RF processor 2t-10 transmit and receive signals as described above. Accordingly, each of the baseband processor 2t-20 and the RF processor 2t-10 may be referred to as a transmitter, a receiver, a transceiver, or a communicator.

The backhaul communicator 2t-30 provides an interface for performing communication with other nodes in a network.

The storage unit 2t-40 stores data such as a basic program, an application, and configuration information for the operation of the terminal. In particular, the storage unit 2t-40 may store information on bearers allocated to the connected terminal, measurement results reported from the connected terminal, and the like. In addition, the storage unit 2t-40 may store information serving as a criterion for determining whether to provide or interrupt multiple connections to the terminal. Then, the storage unit 2t-40 provides stored data in response to a request from the controller 2t-50.

The controller 2t-50 controls the overall operation of the terminal according to an embodiment of the disclosure. For example, the controller 2t-50 transmits and receives signals through the baseband processor 2t-20 and the RF processor 2t-10 or through the backhaul communicator 2t-30. In addition, the controller 2t-50 records and reads data in the storage unit 2t-40. To this end, the controller 2t-50 may include at least one processor.

Third Embodiment

Figure 3A:
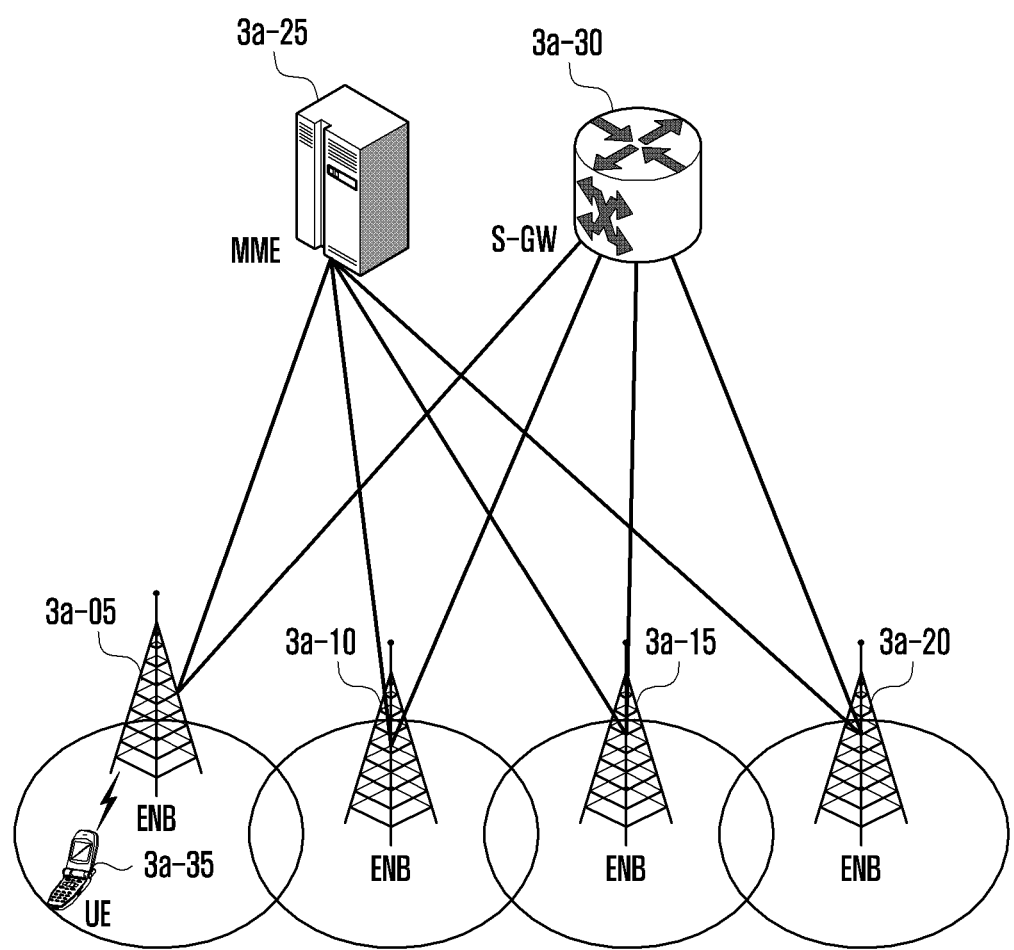
FIG. 3A is a view illustrating the structure of an LTE system according to an embodiment of the disclosure.

FIG. 3A is a view illustrating the structure of an LTE system according to an embodiment of the disclosure.

Referring to FIG. 3A, as illustrated, the wireless access network of the LTE system is composed of next-generation base stations (evolved node B, hereinafter "ENB", "Node B" or "base station") 3a-05, 3a-10, 3a-15, and 3a-20, a mobility management entity (MME) 3a-25, and a serving gateway (S-GW) 3a-30. A user equipment (hereinafter, UE or terminal) 3a-35 is connected to an external network through the ENB 3a-05, 3a-10, 3a-15, and 3a-20 and the S-GW 3a-30.

In FIG. 3A, the ENBs 3a-05, 3a-10, 3a-15, and 3a-20 correspond to the existing node B of a UMTS system. The ENB 3a-05 is connected to the UE 3a-35 by a wireless channel and performs a more complicated role than the existing Node B. In the LTE system, since all user traffic including real-time services such as Voice over IP (VoIP), carried over the Internet protocol, are served through a shared channel, a device is required to perform scheduling by collecting status information, such as buffer status, available transmission power status, and channel status of UEs, and the ENBs 3a-05, 3a-10, 3a-15, and 3a-20 are responsible therefor. One ENB usually controls multiple cells. For example, in order to realize a transmission rate of 100 Mbps, the LTE system uses orthogonal frequency-division multiplexing (OFDM) in, for example, a 20 MHz bandwidth, as a radio access technology. In addition, an adaptive modulation and coding (hereinafter, referred to as AMC) method is applied to determine the modulation scheme and the channel-coding rate according to the state of the channel used by a terminal. The S-GW 3a-30 is a device that provides a data bearer and creates or removes a data bearer under the control of the MME 3a-25. The MME 2a-25 is a device that is responsible for various control functions as well as mobility management functions for the terminals 3a-35, and is connected to multiple base stations 3a-05, 3a-10, 3a-15, and 3a-20.

Figure 3B:
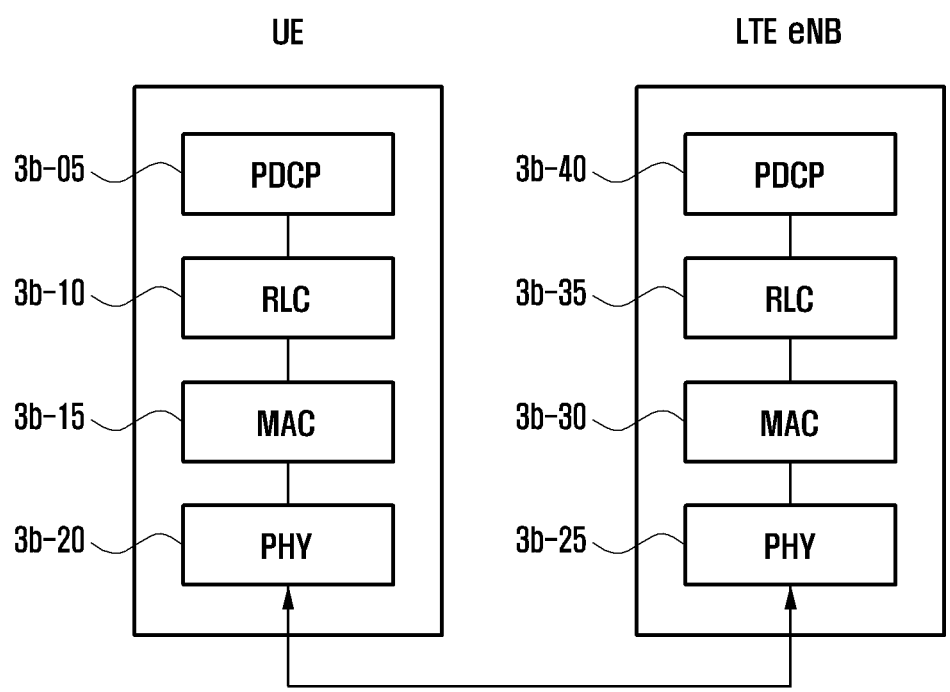
FIG. 3B is a view illustrating a radio protocol structure in an LTE system according to an embodiment of the disclosure.

FIG. 3B is a view illustrating a radio protocol structure in an LTE system according to an embodiment of the disclosure.

Referring to FIG. 3B, the wireless protocol of the LTE system is composed of a packet data convergence protocol (PDCP) 3b-05 and 3b-40, radio link control (RLC) 3b-10 and 3b-35, and medium access control (MAC) 3b-15 and 3b-30, in a terminal and ENB. The packet data convergence protocols (PDCPs) 3b-05 and 3b-40 are responsible for IP header compression/decompression. The main functions of the PDCP are summarized as follows.

Header compression and decompression: ROHC only
    Transfer of user data
    In-sequence delivery of upper-layer PDUs at PDCP re-establishment procedure for RLC AM
    For split bearers in DC (only support for RLC AM): PDCP PDU routing for transmission and PDCP PDU reordering for reception
    Duplicate detection of lower-layer SDUs at PDCP re-establishment procedure for RLC AM
    Retransmission of PDCP SDUs at handover and, for split bearers in DC, of PDCP PDUs at PDCP data recovery procedure, for RLC AM
    Ciphering and deciphering
    Timer-based SDU discard in uplink The radio link control (hereinafter, referred to as RLC) 3b-10 and 3b-35 reconfigures the PDCP packet data unit (PDU) to an appropriate size to perform an ARQ operation. The main functions of RLC are summarized as follows.

Transfer of upper-layer PDUs
    Error correction through ARQ (only for AM data transfer)
    Concatenation, segmentation and reassembly of RLC SDUs (only for UM and AM data transfer)
    Re-segmentation of RLC data PDUs (only for AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM data transfer)
    RLC re-establishment The MACs 3b-15 and 3b-30 are connected to various RLC-layer devices configured in a terminal or a base station, and perform operations of multiplexing RLC PDUs to MAC PDUs and demultiplexing RLC PDUs from MAC PDUs. The main functions of MAC are summarized as follows.

Mapping between logical channels and transport channels
    Multiplexing/demultiplexing of MAC SDUs belonging to one or different logical channels into/from transport blocks (TB) delivered to/from the physical layer on transport channels
    Scheduling information reporting
    Error correction through HARQ
    Priority handling between logical channels of one UE
    Priority handling between UEs by means of dynamic scheduling
    MBMS service identification function
    Transport format selection function
    Padding function The physical layers 3b-20 and 3b-25 channel-code and modulate the upper-layer data, convert the same into an OFDM symbol and transmit the same to a radio channel, or demodulate and decode an OFDM symbol received through the radio channel and transmit the same to the upper layer.

Figure 3C:
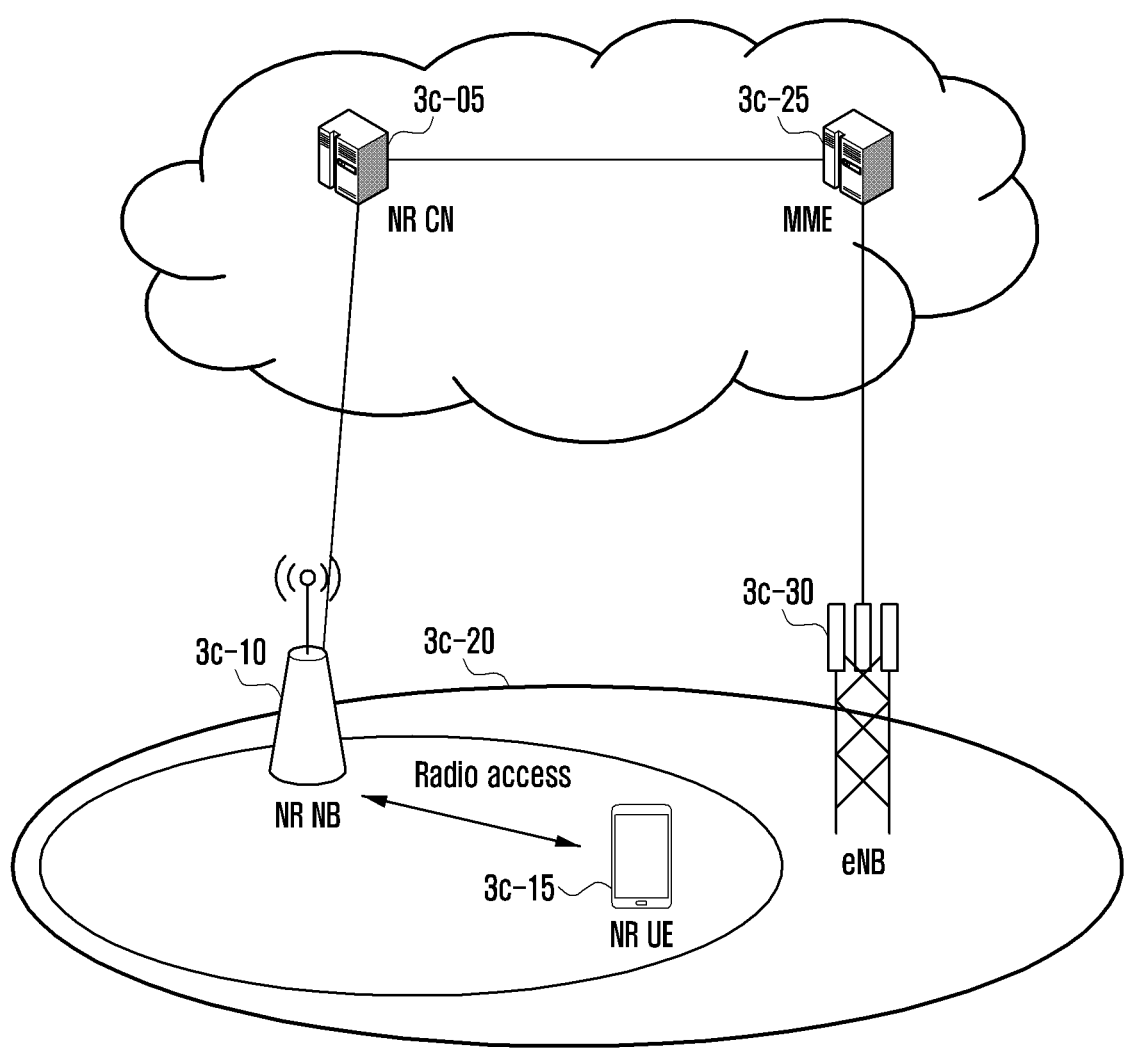
FIG. 3C is a view illustrating the structure of a next-generation mobile communication system according to an embodiment of the disclosure.

FIG. 3C is a view showing the structure of a next-generation mobile communication system according to an embodiment of the disclosure.

Referring to FIG. 3C, the radio access network of the next-generation mobile communication system includes a next-generation base station (new radio Node B, hereinafter NR gNB or NR base station) 3c-10 and a new radio core network (NR CN) 3c-05. The user terminal (new radio user equipment, hereinafter NR UE or terminal) 3c-15 accesses an external network through the NR gNB 3c-10 and the NR CN 3c-05.

In FIG. 3C, the NR gNB 3c-10 corresponds to an evolved node B (eNB) of an existing LTE system. The NR gNB 3c-10 is connected to the NR UE 3c-15 through a wireless channel, and can provide service superior to the existing Node B. In the next-generation mobile communication system, since all user traffic is served through a shared channel, a device is required to collect and schedule status information such as buffer status of UEs, available transmission power status, and channel status, and the NR NB 3c-10 is responsible therefor. One NR gNB 3c-10 usually controls multiple cells. In order to implement ultra-high-speed data transmission compared to the current LTE, more than the existing maximum bandwidth may be provided, and an orthogonal frequency-division multiplexing (OFDM) radio access technology may be additionally combined with the beamforming technology. In addition, an adaptive modulation and coding (hereinafter, referred to as "AMC") method is applied to determine the modulation scheme and the channel-coding rate according to the state of the channel used by a terminal. The NR CN 3c-05 performs functions such as mobility support, bearer setup, and QoS configuration. The NR CN 3c-05 is a device that is responsible for various control functions as well as mobility management functions for a terminal 3c-15, and is connected to multiple base stations. In addition, the next-generation mobile communication system can be linked with the existing LTE system, and the NR CN 3c-05 is connected to the MME 3c-25 through a network interface. The MME 3c-25 is connected to the eNB 3c-30, which is the existing base station.

Figure 3D:
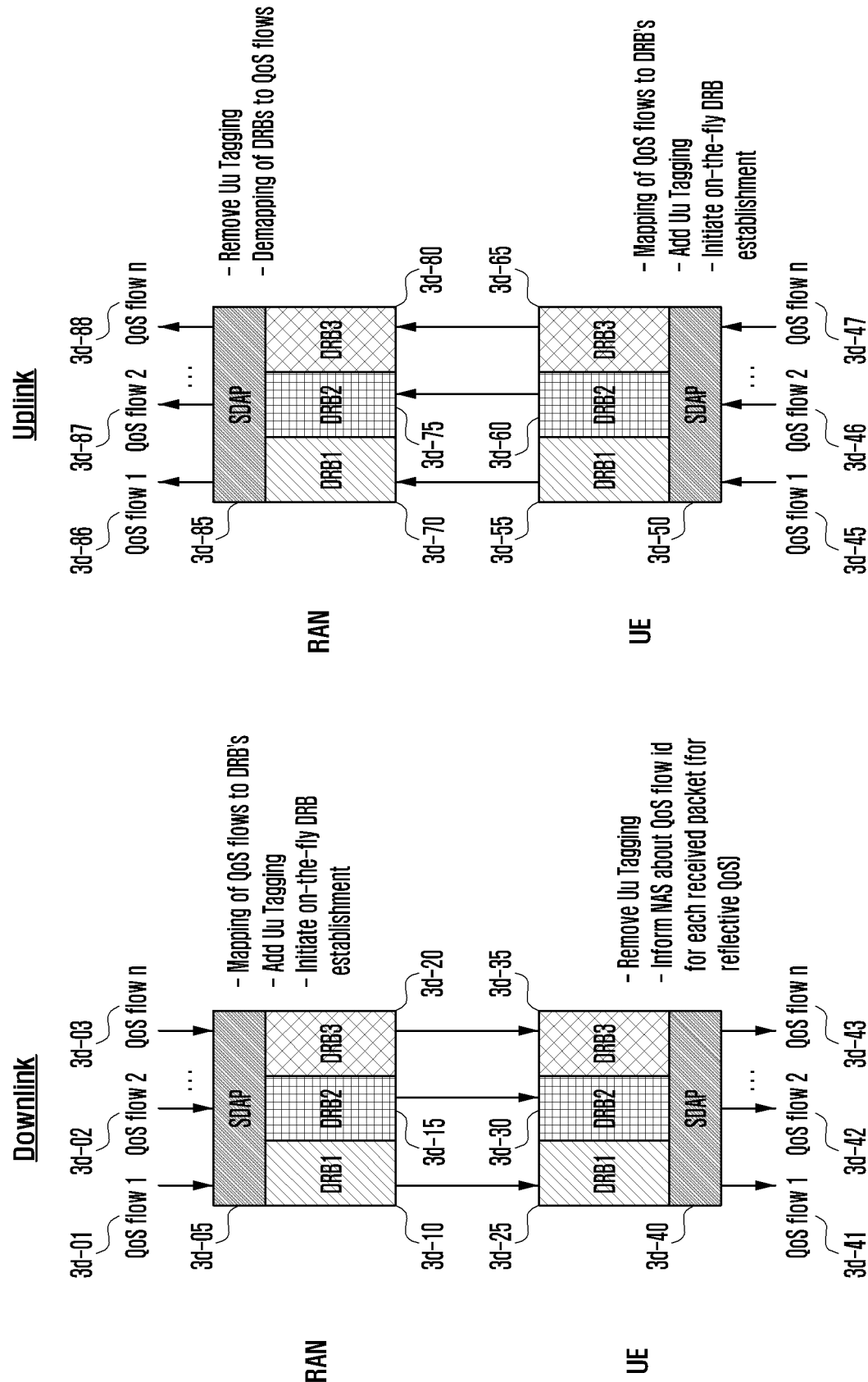
FIG. 3D is a view for explaining new functions for handling QoS in an NR system according to an embodiment of the disclosure.

FIG. 3D is a view for explaining new functions for handling QoS in an NR system according to an embodiment of the disclosure.

In the NR system, a service requiring different quality of service (QoS), that is, a user traffic transmission path, should be configured according to QoS requirements, or IP flow for each service should be controlled. The NR core network may establish a plurality of packet data unit (PDU) sessions, and each PDU session may include a plurality of IP flows. The NR gNB can map a plurality of QoS flows to a plurality of data radio bearers (DRBs) and simultaneously configure the same. That is, for the downlink, a plurality of QoS flows 3d-01, 3d-02, 3d-03 can be mapped to the same DRB or to different DRBs 3d-10, 3d-15, 3d-20. In order to do this, it is necessary to mark the QoS flow ID in the downlink packet. Alternatively, DRB mapping can be explicitly configured through an RRC control message. Since the above functions are not available in the existing LTE PDCP protocol, a new protocol (service data adaptation protocol (SDAP)) 3d-05, 3d-40, 3d-50, 3d-85 has been introduced. In addition, the above indication allows the terminal to implement reflective QoS for uplink. "Reflective QoS" means a method of mapping to allow a terminal to perform uplink transmission through a DRB through which a downlink packet having a specific flow ID transmitted by the gNB is transmitted, and to indicate this, 1 or 2 reflective QoS indicator (RQI) bits may be included in the SDAP header. Explicitly displaying the QoS flow ID in the downlink packet as described above is a simple method in which the access stratum (AS) of the terminal provides the information to the NAS of the terminal. The method of mapping IP flows to DRBs in the downlink may be performed in the following two steps.
1. NAS level mapping: IP flow→QoS flow
2. AS level mapping: QoS flow→DRB In the downlink reception, the presence or absence of QoS flow mapping information and reflective QoS operation for each received DRB 3d-25, 3d-30, 3d-35 can be identified for each received DRB 3d-25, 3d-30, 3d-35, and the corresponding information can be transmitted to the NAS. That is, if the RQI bits are configured as 1 in the SDAP header of the received data packet, the terminal indicates that the AS and NAS-mapping rules have been updated, and thus the mapping rules can be updated and the uplink packets can be transmitted accordingly. That is, two steps of mapping can be used for the uplink as well. First, IP flows are mapped to QoS flows through NAS signaling, and QoS flows are mapped to DRBs 3d-55, 3d-60, 3d-65 defined in the AS. The terminal may indicate the QoS flow ID in the uplink packet, or may transmit the packet as it is without displaying the QoS flow ID. The function is performed in the SDAP of the terminal. When the QoS flow ID is indicated in the uplink packet, the base station may display and transmit the QoS flow ID without an uplink traffic flow template (TFT) to the packet that delivers the information to the NG-U.

Figure 3E:
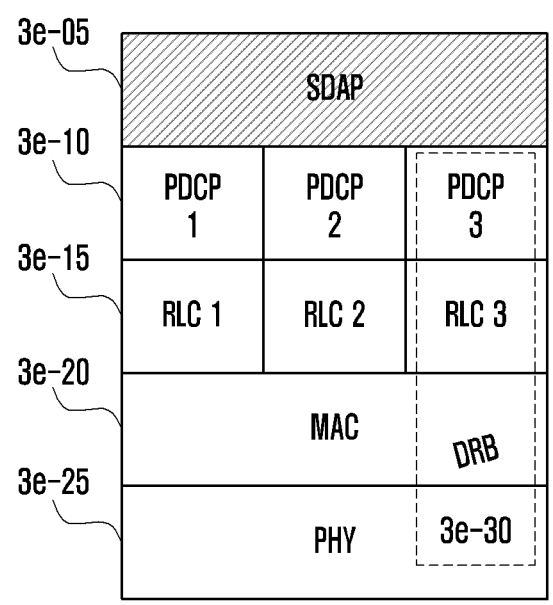
FIG. 3EA is a view illustrating a protocol stack including SDAP in NR according to an embodiment of the disclosure.
Figure 3E:
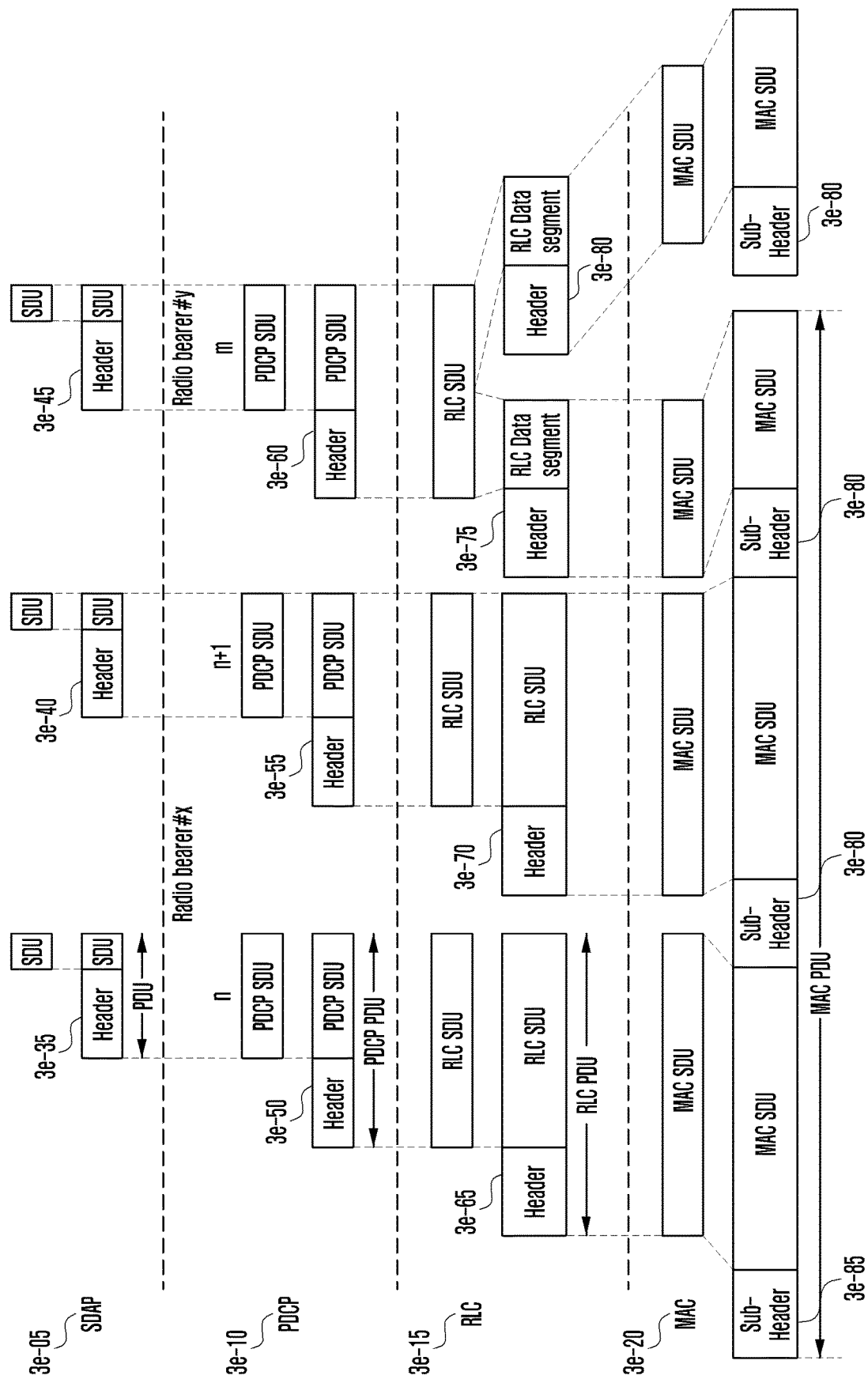

FIGS. 3EA and 3EB are views illustrating protocol stacks including SDAPs in the NR according to an embodiment of the disclosure.

In order to deal with the new QoS function of the NR system, the following information must be transmitted through the wireless interface.
Downlink: QOS flow ID+Reflective QOS processing required indicator
Uplink: QOS flow ID In the NR, an interface for transmitting the above new information to Uu is required, and a new protocol responsible for the function is defined on the PDCP (3e-10) layer. The SDAP 3e-05 is not a DRB-based protocol, but a packet is transmitted according to the established DRB 3e-30 mapping rule. That is, when IP traffic occurs, the IP flow is mapped to the QoS flow ID in the SDAP 3e-05 and then the QoS flow ID is mapped to the DRB. Here, the IP traffic is composed of an IP header and a payload, and SDAP headers 3e-35, 3e-40, 3e-45 can be located in front of the IP packet. In PDCP 3e-10, IP header compression is performed and PDCP headers 3e-50, 3e-55, 3e-60 are added. In the RLC 3e-15 and MAC 3e-20, each RLC header 3e-65, 3e-70, 3e-75, 3e-80 and a MAC sub-header 3e-65 are sequentially added. After adding the MAC headers, the MAC PDU is delivered to the PHY.

When the gNB determines to apply the reflective mechanism (indicates the terminal to send an uplink packet to the same DRB where the QoS flow ID included in the downlink packet is delivered) to the UE, the QoS flow ID and reflective QoS indicator are delivered to the SDAP 3e-05 layer of the downlink packet. The SDAP header may have a length of 1 byte, and may be composed of a QoS flow ID (7 bits) and an RQI (1 bits). Alternatively, the SDAP header may be composed of QoS flow ID (6 bits) and an RQI (2 bits), in which case the RQI indicator indicates the reflective QoS of each of the AS and NAS. In the following, it is assumed that one RQI bit is configured.

In performing the above process, when the gNB delivers the QoS flow ID to all data packets, the terminal continuously performs an operation of updating the mapping rule through the received QoS flow ID. That is, when the RQI bit is set to 1, the terminal updates the NAS-mapping rule and the AS-mapping rule and transmits an uplink data packet according to the corresponding rule on the assumption that both the NAS- and AS-mapping rules have been updated. Basically, the NAS reflective QoS is triggered when the mapping rule between IP flow and QoS flow in the NR core network is updated, and the AS reflective QoS is triggered when the mapping rule between QoS flow and DRB in the wireless base station is updated.

However, considering the signaling standard between the base station and the core network, the core network configures and transmits an RQI bit indicating the N3 header of the data packet transmitted to the base station when the NAS-mapping rule is updated. In the above, the N3 header is an interface between the core network and the base station. If the RQI bit of the N3 header received from the core network is configured to 1, the base station configures the RQI bit of the SDAP header to 1 and transmits the same to the terminal. Alternatively, even if the RQI bit of the N3 header is 0, when the AS-mapping rule is changed, the base station configures the RQI bit of the SDAP header to 1 and transmits the same to the terminal. However, if the above operation is performed, since the terminal side should keep storing the mapping information table (TFT table) for NAS mapping and AS mapping, the amount of information to be stored by the terminal may increase, and if not properly managed, confusion due to duplicate mapping may occur. To solve this, a timer is activated in the terminal and the NR core network at the moment that the NAS reflective QoS rule is applied, and if the data packet to which the rule is applied is not received for a preset timer, the configured NAS reflective QoS mapping information is removed. For reference, when a data packet to which the same QoS mapping rule is applied is transmitted and received while the timer is running, the timer is restarted.

In an embodiment of the disclosure, problems and issues due to differences in the QoS flow and DRB mapping operation in an NR system compared to an LTE system will be identified and resolved. Basically, the LTE system has 1:1 mapping between the evolved packet system (EPS) and the DRB, and the established mapping is maintained until the corresponding service is terminated. On the other hand, in the NR system, QoS flow and DRB mapping can be dynamically configured, so a specific QoS flow can be mapped to a DRB different from the initially configured DRB. In addition, as described above, the base station can recognize that a new QoS flow is transmitted through a specific DRB only when the first packet of the new QoS flow transmitted by the terminal is received. However, when there is a lot of data of the QoS flow buffered in the corresponding DRB, a delay occurs in recognizing that a new QoS flow has been transmitted. In an embodiment of the disclosure, a solution to the following two issues is proposed to solve this problem.
1. Suggestion of terminal operation to enable the scheduler of the base station to quickly recognize the first packet of a new QoS flow received by a specific DRB.
2. Proposal to prevent infrequent QoS flow mapping update operation at the receiving end by guaranteeing in-sequence delivery of the changed DRB and data packets from the previous DRB when re-mapping QoS according to DRB change.

FIG. 3F is a view for explaining problems and issues when a first packet of a new QoS flow in a specific DRB is received in a delayed manner, considered in an embodiment of the disclosure.

In phase 1, a terminal receives the configurations for DRBs via an RRC message of a base station. The configurations include detailed layer (MAC, RLC, PDCP) configuration information of DRBs, information about DRBs to which each QoS flow will be delivered, and information about which DRB is the default DRB. Viewing the transmitting end of the terminal, each of the QoS flows 3f-05, 3f-10, 3f-15 is delivered to the DRB initially set in the SDAP layer 3g-20, that is, packet delivery and transmission for an operation for data transmission are performed to lower layers of specific DRBs 3f-25 and 3f-30. In FIG. 3F, QoS flow #1 and QoS flow #2 are configured as DRB 2, and QoS flow #1 is mapped to DRB 1, where DRB 1 is configured as default DRB.

In the NR, the mapping between the DRB and the QoS flow may be changed regardless of whether handover is performed, and the QoS flow may be changed to a DRB different from the previous DRB due to the change in the mapping rule. Alternatively, if the newly generated uplink packet does not satisfy the mapping rule set to RRC or the reflective QoS mapping rule, the packet of the corresponding QoS flow is transmitted through the default DRB. When the DRB mapping of a new uplink packet or a packet having a specific QoS flow is different, the UE delivers a packet corresponding to the QoS flow through the default DRB or the changed DRB.

In phase 2, when QoS flows such as 3f-35, 3f-40, and 3f-45 are mapped to a new DRB, in operation 3f-50, the corresponding SDAP SDU is classified in the SDAP layer, and the SDAP PDU is transmitted to the corresponding DRB and to lower layers. This example shows the case where QoS flow #2 is changed from DRB 2 3f-60 to DRB 1 3f-55, which is the default DRB. The change is performed after the 26th SDAP PDU of QoS flow #2 is delivered and before the 27th SDAP PDU is delivered. The previous SDAP PDUs will be delivered to DRB 2, and the corresponding SDAP PDUs are delivered to DRB 1 after the mapping rule is changed. Here, the SDAP PDU numbers are not actually existing numbers, but are written to aid in understanding. However, due to differences in packets stored in the transmission buffer for each DRB, the actual order of delivery to the receiving end may be different. That is, a new packet of DRB 2 (packet 27 of QoS flow #2) may be received before packets of the previous DRB 1.

In Phase 3, the receiving end, and precisely the receiving end of the base station, receives packets transmitted by the terminal, and the order in which the packets are received depends on how much data is in the buffer for each DRB (3f-65). In this example, it can be seen that out-of-sequence delivery occurs for packets of QoS flow #2, so that received packets are received with ping-pong effect between different DRBs. In this case, since it is interpreted that the new QoS flow is continuously mapped through the corresponding DRB, the receiver of the base station performs an unintended QoS reflective operation. A method for solving this will be described in the following examples.

FIG. 3G is a view for explaining a method of preferentially processing a corresponding SDAP packet when a new QoS flow is received in the receiving SDAP layer of the terminal according to Embodiment 3-1 of the disclosure.

This embodiment deals with a method for solving a transmission time delay that may occur when reception of the first packet of the new QoS flow delivered to the changed DRB is slow, that is, when other QoS flow packets are already accumulated in the transmission buffer of the DRB. Basically, if a specific QoS flow is changed from a previous DRB to another DRB, the changed DRB should be quickly identified at the receiving end, and the scheduler of the base station should quickly schedule and process the corresponding QoS flow. To this end, the embodiment deals with a method of delivering SDAP PDUs to be processed and delivered first.

In phase 1, the terminal receives configurations for DRBs through the RRC message of the base station. The configurations include detailed layer (MAC, RLC, PDCP) configuration information of DRBs, information about the DRBs to which each QoS flow will be delivered, and information about which DRB is the default DRB. Viewing the transmitting end of the terminal, each of the QoS flows 3g-05, 3g-10, 3g-15, 3g-20 is delivered to the DRB initially set in an SDAP layer 3g-25, that is, packet delivery and transmission for an operation for data transmission are performed in (?) lower layers of specific DRBs 3g-30, 3g-35, 3g-40. In FIG. 3G, it is assumed that QoS flow #1 is configured as DRB 3, that QoS flow #2 and QoS flow #5 are configured as DRB 2, and that QoS flow #3 is mapped to DRB 1, where DRB 1 is configured as a default DRB.

In phase 2, if the receiving end of the terminal accurately receives the SDAP SDU of the new downlink QoS flow from the base station in the receiving SDAP layer of the terminal, that is, if QoS flow #4 was previously transmitted and received through DRB 2 (3g-50) but a new downlink packet corresponding to QoS flow #4 is received by DRB 1 (3g-45), the terminal updates the mapping rules between the QoS flow and the DRB and then performs transmission/reception with the DRB 1 (3g-45) for the subsequent QoS flow #4.

In phase 3, the transmitting end of the terminal needs to quickly deliver the first packet (3g-75) for the new QoS flow #4 to DRB 1 (3g-70) according to the mapping rule update of the QoS flow and the DRB determined in the previous operation. If a large number of packets corresponding to different QoS flows are accumulated in the transmission buffer of DRB 1 (3g-70), this operation is necessary because the update of the new QoS flow #4 packet can be performed slowly and can be solved by the following procedure.

1. The SDAP layer of the terminal indicates to the PDCP layer whether expedited delivery is required for the SDAP PDU (requires message transfer between SDAP and PDCP layers).

2. In the PDCP layer, the PDCP PDU including the packet indicated by the SDAP layer is delivered to the lower layer, and the corresponding PDCP PDU is delivered before other PDCP PDUs waiting in the buffer. To this end, an indicator indicating expedited delivery may be included in the PDCP header. This serves as an instruction not to trigger the reordering timer at the receiving end, so the packet can be quickly delivered to the upper layer of the receiving end.

3. In the RLC layer, an RLC PDU including a packet received from the PDCP is generated and positioned so that the packet can be delivered before other RLC PDUs stored in the RLC buffer.

Figure 3H:
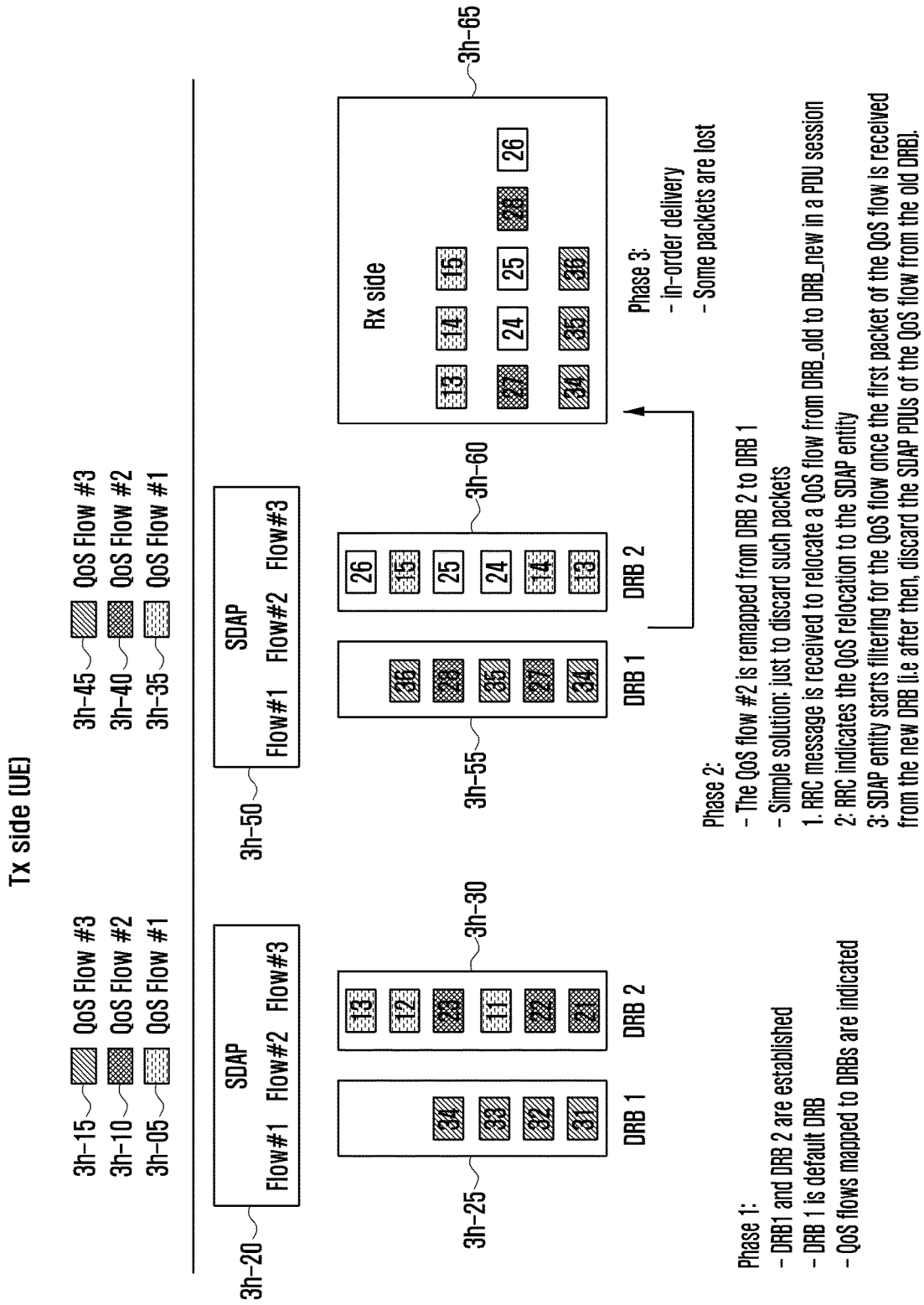
FIG. 3H is a view illustrating a method for guaranteeing in-sequence delivery at a receiving end when QoS flow is re-mapped according to Embodiment 3-2 of the disclosure.

FIG. 3H is a view for explaining a method for guaranteeing in-sequence delivery at a receiving end when a QoS flow is re-mapped according to Embodiment 3-2 of the disclosure.

As illustrated in FIG. 3F, when the DRB of the new QoS flow is changed, out-of-sequence delivery occurs, so received packets can be received with ping-pong effect between different DRBs. In this case, since the new QoS flow is continuously mapped through the corresponding DRB, the receiver of the base station performs an unintended QoS reflective operation. In this embodiment, a method for solving this is proposed.

In phase 1, a terminal receives the configurations for DRBs through the RRC message of the base station. The configurations include detailed layer (MAC, RLC, PDCP) configuration information of DRBs, information about DRBs to which each QoS flow will be delivered, and information about which DRB is the default DRB. Viewing the transmitting end of the terminal, each of the QoS flows 3h-05, 3h-10, 3h-15 is delivered to the DRB initially set in an SDAP layer 3g-20; that is, packet delivery and transmission for a data transmission operation are performed in lower layers of specific DRBs 3h-25, 3h-30. In FIG. 3H, QoS flow #1 and QoS flow #2 are configured as DRB 2 (3h-30), and QoS flow #1 is mapped to DRB 1 (3h-25), where DRB 1 (3h-25) is configured as default DRB.

In phase 2, when QoS flows 3h-35, 3h-40, and 3h-45 are mapped to a new DRB, in operation 3h-50, the SDAP SDU is classified in the SDAP layer, and the SDAP PDU is delivered to the corresponding DRB and the lower layer. This example shows the case where QoS flow #2 is changed from DRB 2 (3f-60) to DRB 1 (3f-55), which is the default DRB. The change is performed after the 26th SDAP PDU of QoS flow #2 is delivered and before the 27th SDAP PDU is delivered. The previous SDAP PDUs will be delivered to DRB 2 (3h-60), and the corresponding SDAP PDUs are delivered to DRB 1 (3h-55) after the mapping rule is changed.

Here, the SDAP PDU numbers are not actually existing numbers, but are written to aid in understanding. However, due to differences in packets stored in the transmission buffer for each DRB, the actual order of delivery to the receiving end may be different. That is, a new packet (packet 27 of QoS flow #2) of DRB 2 (3h-60) may be received before packets of the previous DRB 1 (3h-55). This may be explained as re-mapping from the previous PDCP A of the corresponding QoS flow #2 to the new PDCP B. In order to solve the above out-of-sequence delivery problem, the following procedure is proposed.
1. An RRC message that resets a specific QoS flow of a specific PDU session from a previous DRB to a new DRB is received.
2. The SDAP entity to reconfigure QoS in the RRC of a terminal is indicated.
3. When the SDAP entity receives the first packet of the new QoS flow through the new DRB, it performs a filtering operation (that is, it discards the SDAP PDU of the corresponding QoS flow received through the previous DRB).

Due to the above operation, the terminal performs packet transmission to guarantee in-sequence delivery. That is, filtering is applied to packets 24, 25, and 26 of QoS flow #2, which is discarded from the buffer. In phase 3, the receiving end, precisely the receiving end of the base station, receives the packets delivered by the terminal. Due to the proposed operation, out-of-sequence delivery of the packets of QoS flow #2 does not occur anymore. That is, it can be seen that the received packet is no longer received with ping-pong effect between different DRBs. Instead, data stored in the transfer buffer of the previous DRB are lost and transferred through the retransmission operation.

Figure 3I:
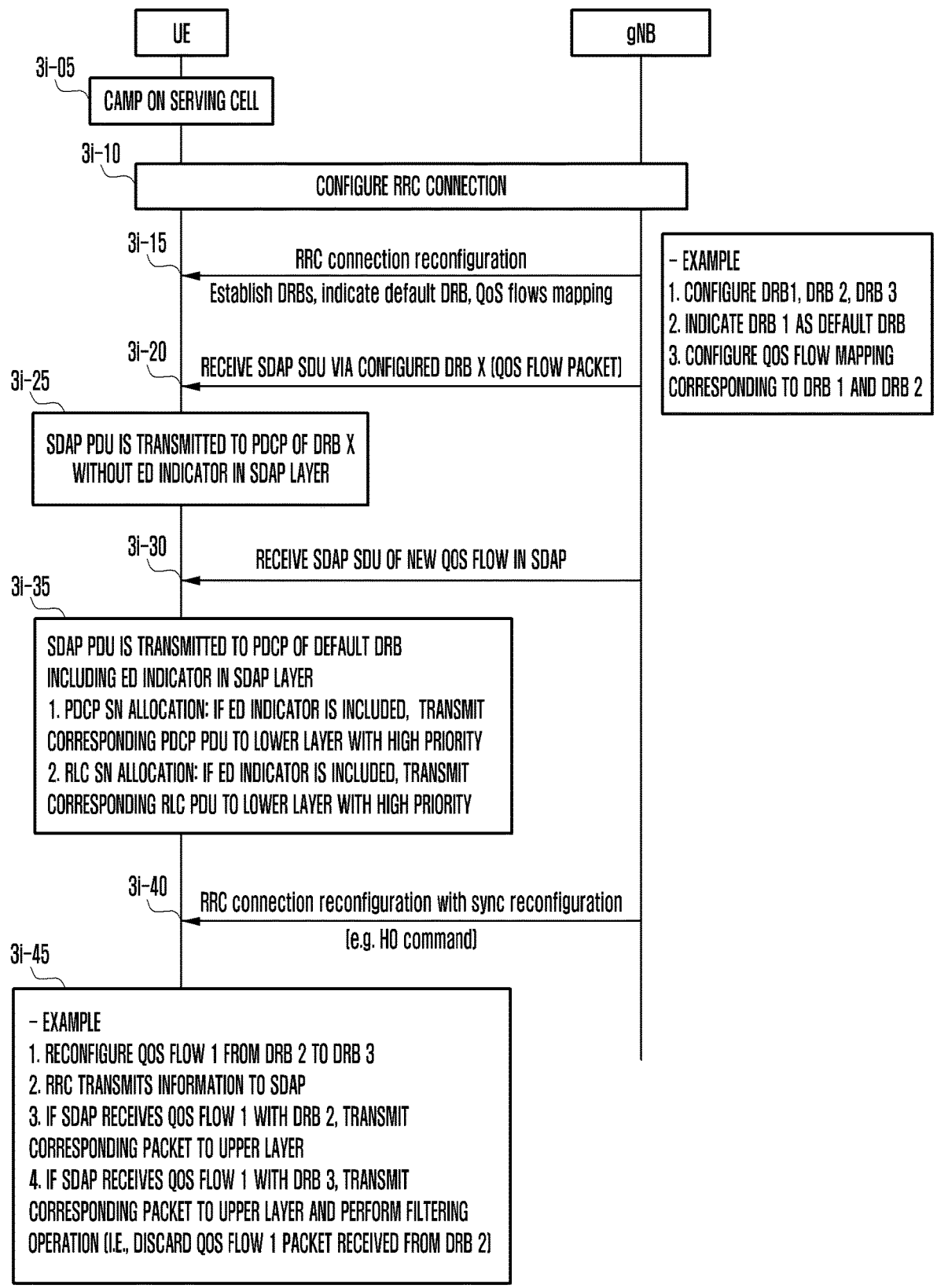
FIG. 3I is a view illustrating a method for delivering a new QoS flow packet when QoS flow and mapping change of DRB are performed according to an embodiment of the disclosure.

FIG. 3I is a view illustrating a method for delivering a new QoS flow packet when mapping of changes in QoS flow and DRB is performed, as proposed in an embodiment of the disclosure.

Here, the method proposed in the above embodiments 3-1 and 3-2 is applied, and FIG. 3I illustrates the entire operation in which, when the mapping of the QoS flow and the DRB is changed thereby, the first packet of the new QoS flow transmitted to the new DRB is first transmitted and the corresponding QoS flow packets stored in the transmission buffer of the previous DRB are discarded, thereby guaranteeing in-sequence delivery at the base-station receiving end.

After the terminal camps on the serving cell (3i-05), the terminal configures RRC connection to the cell and transitions to the connection mode (3i-10). In operation 3i-15, the terminal receives the RRC connection reconfiguration message from the base station, and receives configuration DRBs, default DRB indication, and mapping information between QoS flow and DRB. As an example of the configuration, in FIG. 3, DRB 1, DRB 2, and DRB 3 are configured, DRB 1 is indicated as a default DRB, and QoS flow mappings corresponding to DRB 1 and DRB 2 may be configured. In operation 3i-20, the terminal receives a downlink data packet transmitted by the base station. Specifically, in the above operation, the terminal receives the SDAP SDU via the preset DRB x and decodes the SDAP header of the corresponding packet to check the QoS flow ID. In operation 3i-25, the terminal transmits the PDCP of the DRB x to the lower layer without any special action because the corresponding SDAP SDU is received through the preset DRB x. That is, a separate expedited delivery operation is not configured. The above expedited delivery operation is illustrated in FIG. 3G, and is a method in which a terminal informs a lower layer of an SDAP SDU requiring expedited delivery.

If the SDAP SDU of the new QoS flow is received through the specific DRB in the SDAP of the UE in operation 3i-30, it is necessary to quickly process the QoS flows indicated by the first packet. That is, in operation 3i-35, the SDAP layer of the terminal transmits the corresponding SDAP PDU to the PDCP of the default DRB (or modified DRB) including an expedited (ED) indicator. Here, the ED indicator may be included as 1 bit in the PDCP header. Then, the PDCP layer allocates a PDCP sequence number (SN) to the corresponding PDCP SDU, and if the ED indicator is included, the PDCP PDU is transmitted to the lower layer with high priority. In addition, in the RLC layer, the RLC SN is allocated to the corresponding RLC SDU, and if the ED indicator is included, the RLC PDU is transmitted to the lower layer with high priority.

In operation 3i-40, the terminal also receives an RRC connection reconfiguration message including synchronization settings from the base station. An example of the above message is a handover command message. Also, the message may include reconfiguring a specific QoS flow of a specific PDU session from a previous DRB to a new DRB. In operation 3i-45, the terminal receiving the RRC message performs DRB reconfiguration indicated in the RRC message. For example, it may include content that QoS flow 1 is reconfigured from DRB 2 to DRB 3. In addition, the RRC layer of the terminal indicates that the above QoS flow and DRB reconfiguration are provided to the SDAP entity, and then, when the QoS flow 1 is received by the SDAP entity as DRB 2, the corresponding packet is transmitted to the upper layer. If the SDAP receives QoS flow 1 as DRB 3, the packet is delivered to the upper layer and a filtering operation is performed. That is, from that time on, packets of QoS flow 1 received from DRB 2 are discarded. This is to achieve in-sequence delivery.

Figure 3J:
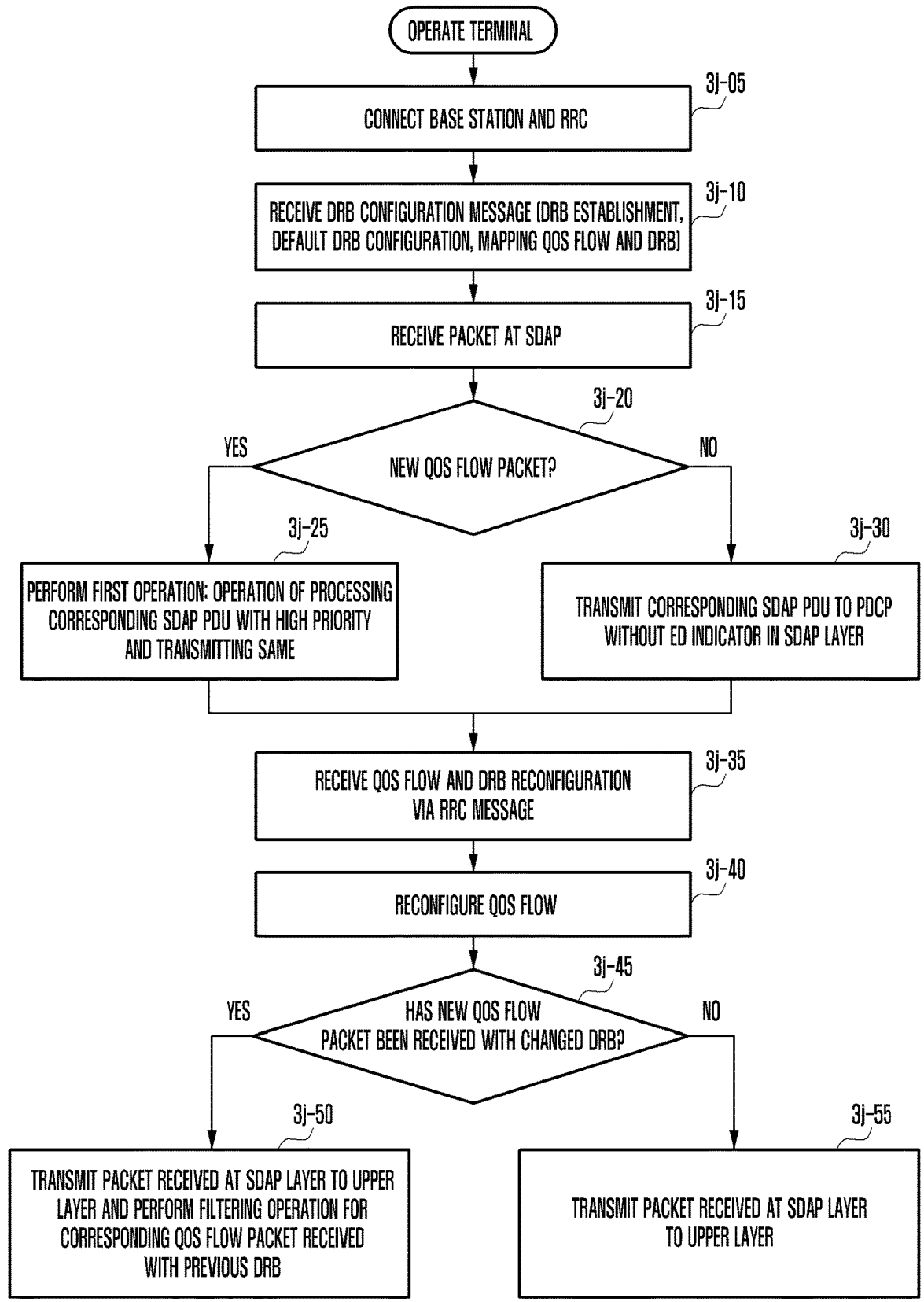
FIG. 3J is a view illustrating overall terminal operation according to an embodiment of the disclosure.

FIG. 3J is a view illustrating overall terminal operation according to an embodiment of the disclosure.

After camping on a serving cell, the terminal establishes an RRC connection with the cell and transitions to the connected mode (3j-05). In operation 3j-10, the terminal receives the configurations for DRBs through the RRC message of a base station. The configurations include detailed layer (MAC, RLC, PDCP) configuration information of DRBs, information on DRBs to which each QoS flow is to be delivered, and information about which DRB is the default DRB. As an example of the configuration, DRB 1, DRB 2, and DRB 3 are configured in FIG. 3J, DRB 1 is indicated as a default DRB, and QoS flow mapping corresponding to DRB 1 and DRB 2 may be configured. In operation 3j-15, the terminal receives a downlink data packet transmitted by the base station. In the above operation, the terminal receives the SDAP SDU through the preconfigured DRB x and decodes the SDAP header of the corresponding packet to check the QoS flow ID.

In operation 3j-20, the terminal determines whether the SDAP packet received through DRB x is a new QoS flow packet, and performs different operations. If the packet received from the SDAP layer is a new QoS flow packet (i.e., if the first packet of the new QoS flow is received in DRB x), the terminal performs the first operation. The first operation of operation 3j-25 is an operation that allows the first packet of the new QoS flow to be processed and delivered first. When the terminal receives the SDAP SDU of the new QoS flow, the corresponding SDAP PDU is delivered to the PDCP of the default DRB (or modified DRB) as an expedited (ED) indicator to quickly process the QoS flow indicated by the first packet (SDAP PDU). Here, the expedited (ED) indicator may be included as 1 bit in the PDCP header. Subsequently, in the PDCP layer, a PDCP sequence number (SN) is allocated to the corresponding PDCP SDU, and if the ED indicator is included, the PDCP PDU is transmitted to the lower layer with high priority. In addition, in the RLC layer, the RLC SN is allocated to the corresponding RLC SDU, and if the ED indicator is included, the corresponding RLC PDU is delivered to the lower layer with high priority. If the SDAP SDU received by the terminal is received through the preset DRB x, in operation 3j-30, the terminal delivers the PDCP of the DRB x to the lower layer without any special action. That is, a separate expedited delivery operation is not configured.

In operation 3j-35, the terminal receives an RRC connection reconfiguration message including synchronization configuration information from the base station. An example of the above message is a handover command message. Also, the message may include reconfiguring a specific QoS flow of a specific PDU session from a previous DRB to a new DRB. In operation 3j-40, the terminal receiving the RRC message performs DRB reconfiguration indicated by the RRC message. For example, content that QoS flow 1 is reconfigured from DRB 2 to DRB 3 may be included. In addition, the RRC layer of the terminal indicates that the above QoS flow and DRB reconfiguration are indicated to the SDAP entity, and the operation is different depending on whether a new QoS flow packet is received with the changed DRB. If SDAP receives QoS flow 1 as DRB 3, that is, if a new QoS flow packet is received as a modified DRB, the terminal delivers the packet to the upper layer in operation 3j-50 and performs a filtering operation. That is, from that time on, the packet of QoS flow 1 received from DRB 2, that is, the previous DRB, is discarded. This is to achieve in-sequence delivery. On the other hand, if a new QoS flow packet is received by the previous DRB before being received by the changed DRB, that is, when QoS flow 1 is received by the SDAP entity as DRB 2, the packet is transmitted to the upper layer.

Figure 3K:
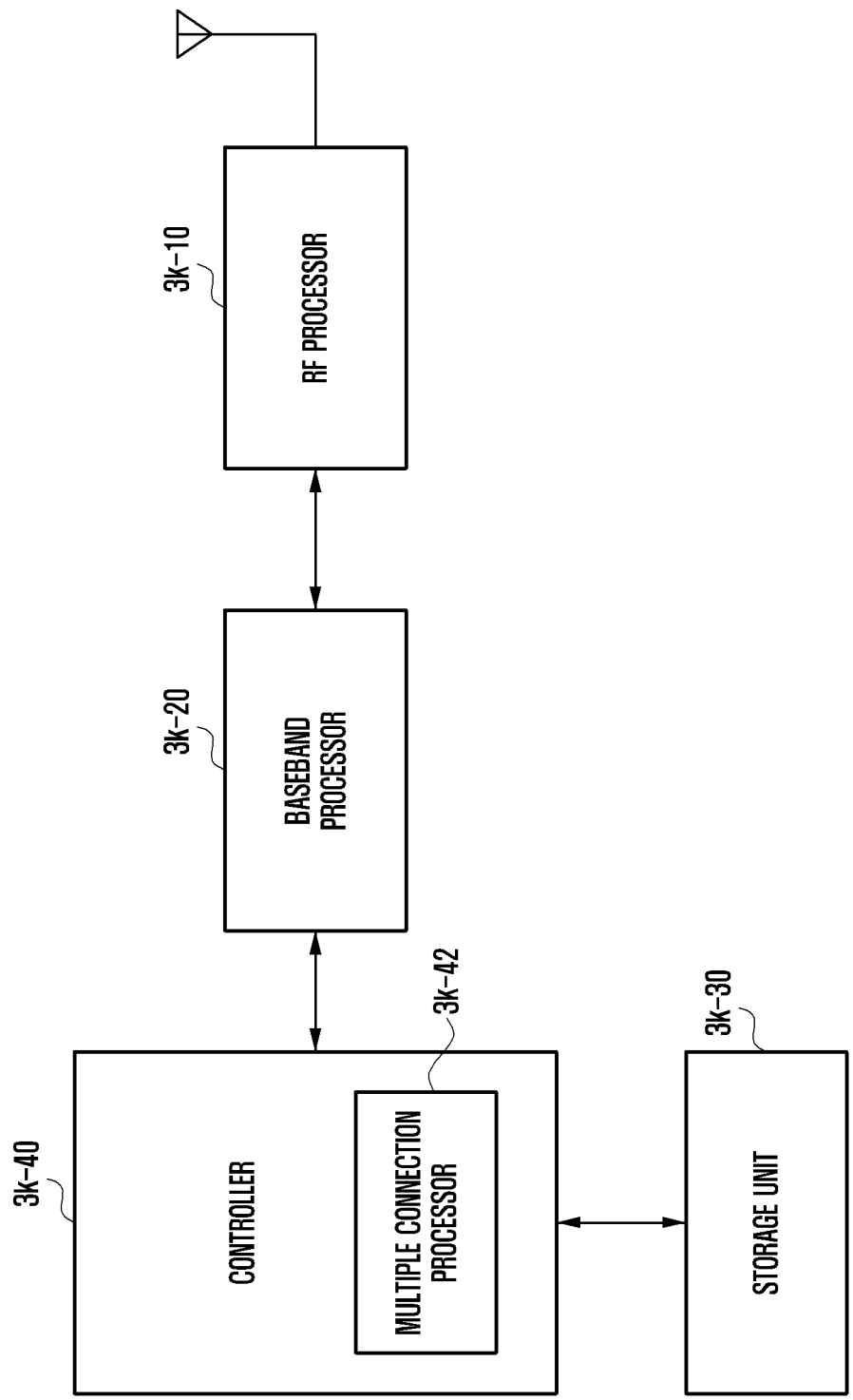
FIG. 3K is a view illustrating the configuration of a terminal according to an embodiment of the disclosure.

FIG. 3K is a view illustrating the configuration of a terminal according to an embodiment of the disclosure.

Referring to FIG. 3K, the terminal includes a radio-frequency (RF) processor 3k-10, a baseband processor 3k-20, a storage unit 3k-30, and a controller 3k-40. The controller 3k-40 may include a multiple-connection processor 3k-42.

The RF processor 3k-10 performs a function for transmitting and receiving a signal via a wireless channel, such as band conversion and amplification of the signal. That is, the RF processor 3k-10 up-converts a baseband signal provided from the baseband processor 3k-20 to an RF band signal and then transmits the same through an antenna, and down-converts an RF band signal received through the antenna to a baseband signal. For example, the RF processor 3k-10 may include a transmission filter, a reception filter, an amplifier, a mixer, an oscillator, a digital-to-analog converter (DAC), an analog-to-digital converter (ADC), etc. In FIG. 3K, although only one antenna is illustrated, the terminal may have multiple antennas. Also, the RF processor 3k-10 may include a plurality of RF chains. Furthermore, the RF processor 3k-10 may perform beamforming. For the beamforming, the RF processor 3k-10 may adjust the phase and magnitude of each of signals transmitted and received through multiple antennas or antenna elements. In addition, the RF processor may perform MIMO, and may receive multiple layers when performing MIMO operations.

The baseband processor 3k-20 performs a function of conversion between a baseband signal and a bit stream according to the physical-layer standard of a system. For example, during data transmission, the baseband processor 3k-20 generates complex symbols by encoding and modulating a transmission bit stream. In addition, upon receiving data, the baseband processor 3k-20 restores the received bit stream through demodulation and decoding of the baseband signal provided from the RF processor 3k-10. For example, in the case of conforming to an orthogonal frequency-division multiplexing (OFDM) method, when transmitting data, the baseband processor 3k-20 encodes and modulates a transmission bit stream to generate complex symbols, maps the complex symbols to subcarriers, and then configures OFDM symbols via an inverse fast Fourier transform (IFFT) operation and cyclic prefix (CP) insertion. In addition, when receiving data, the baseband processor 3k-20 divides the baseband signal provided from the RF processor 3k-10 into units of OFDM symbols, restores signals mapped to subcarriers via the fast Fourier transform (FFT) operation, and then restores a received bit stream via demodulation and decoding.

The baseband processor 3k-20 and the RF processor 3k-10 transmit and receive signals as described above. Accordingly, each of the baseband processor 3k-20 and the RF processor 3k-10 may be referred to as a transmitter, a receiver, a transceiver, or a communicator. Furthermore, at least one of the baseband processor 3k-20 and the RF processor 3k-10 may include a plurality of communication modules to support a plurality of different radio access technologies. In addition, at least one of the baseband processor 3k-20 and the RF processor 3k-10 may include different communication modules to process signals in different frequency bands. For example, the different radio access technologies may include a wireless LAN (e.g., IEEE 802.11), a cellular network (e.g., LTE), and the like. In addition, the different frequency bands may include a super-high-frequency (SHF) (e.g., 2.NRHz, NRHz) band and a millimeter-wave (e.g., 60 GHz) band.

The storage unit 3k-30 stores data such as a basic program, an application, and configuration information for the operation of the terminal. In particular, the storage unit 3k-30 may store information related to the second access node, which performs wireless communication using the second wireless access technology. The storage unit 3k-30 provides stored data in response to a request from the controller 3k-40.

The controller 3k-40 controls the overall operation of the terminal according to an embodiment of the disclosure. For example, the controller 3k-40 transmits and receives signals through the baseband processor 3k-20 and the RF processor 3k-10. In addition, the controller 3k-40 records and reads data in the storage unit 3k-30. To this end, the controller 3k-40 may include at least one processor. For example, the controller 3k-40 may include a communication processor (CP) that performs control for communication and an application processor (AP) that controls an upper layer such as an application.

Figure 3L:
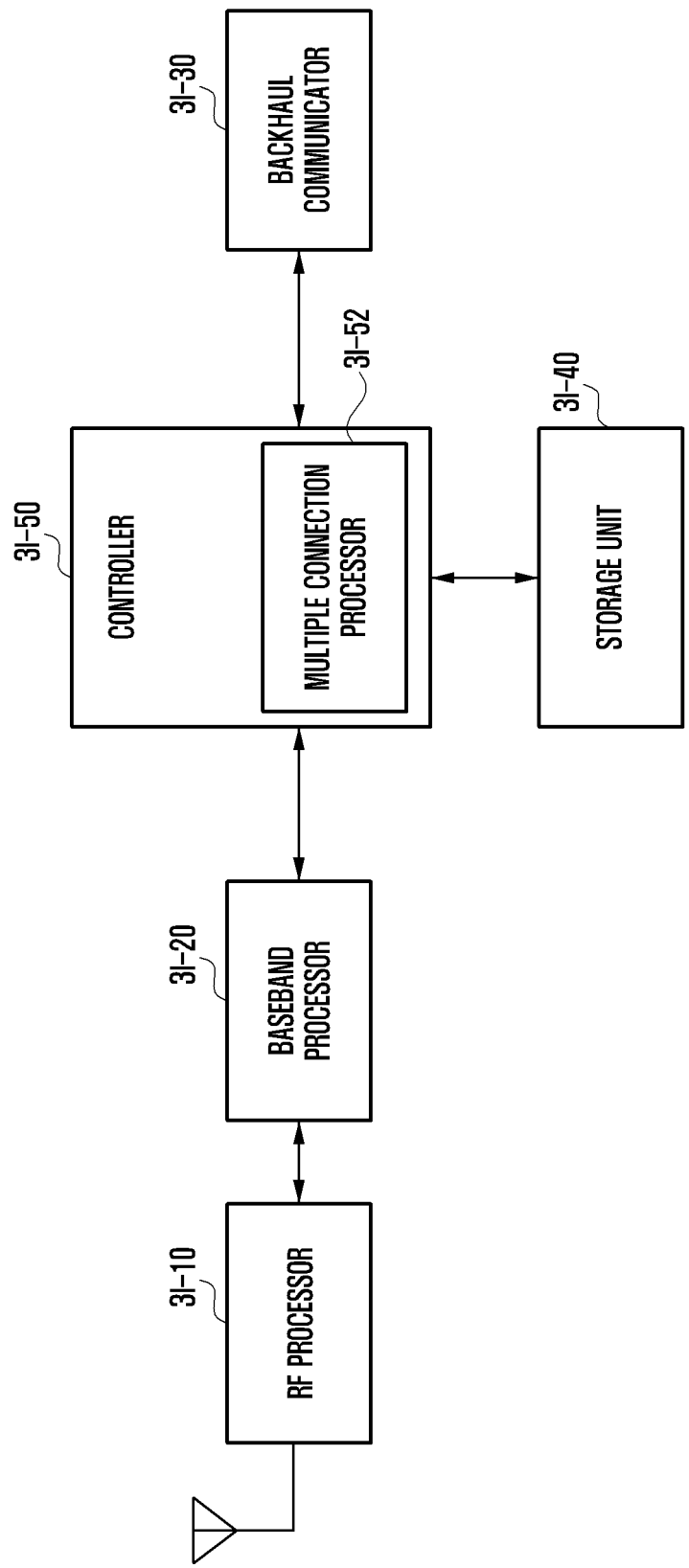
FIG. 3L is a view illustrating the configuration of an NR base station according to an embodiment of the disclosure.

FIG. 3L is a view illustrating the configuration of a base station according to an embodiment of the disclosure.

As illustrated in FIG. 3L, the base station includes an RF processor 3*l*-10, a baseband processor 3*l*-20, a backhaul communicator 3*l*-30, a storage unit 3*l*-40, and a controller 3*l*-50. The controller 3*l*-50 may include a multiple-connection processor 3*l*-52.

The RF processor 3*l*-10 performs a function for transmitting and receiving a signal via a wireless channel, such as band conversion and amplification of the signal. That is, the RF processor 3*l*-10 up-converts a baseband signal provided from the baseband processor 3*l*-20 to an RF band signal and then transmits the same through an antenna, and down-converts an RF band signal received through the antenna to a baseband signal. For example, the RF processor 3*l*-10 may include a transmission filter, a reception filter, an amplifier, a mixer, an oscillator, a DAC, an ADC, etc. In FIG. 3L, although only one antenna is illustrated, the first connection node may have multiple antennas. Also, the RF processor 3*l*-10 may include a plurality of RF chains. Furthermore, the RF processor 3*l*-10 may perform beamforming. For the beamforming, the RF processor 3*l*-10 may adjust the phase and magnitude of each of signals transmitted and received through multiple antennas or antenna elements. The RF processor may perform down-MIMO operations by transmitting one or more layers.

The baseband processor 3*l*-20 performs a function of conversion between a baseband signal and a bit stream according to the physical-layer standard of a first radio access technology. For example, during data transmission, the baseband processor 3*l*-20 generates complex symbols by encoding and modulating a transmission bit stream. In addition, upon receiving data, the baseband processor 3*l*-20 restores the received bit stream through demodulation and decoding of the baseband signal provided from the RF processor 3*l*-10. For example, in the case of conforming to the OFDM method, when transmitting data, the baseband processor 3*l*-20 encodes and modulates a transmission bit stream to generate complex symbols, maps the complex symbols to subcarriers, and then configures OFDM symbols via IFFT operation and CP insertion. In addition, when receiving data, the baseband processor 3*l*-20 divides the baseband signal provided from the RF processor 3*l*-10 into units of OFDM symbols, restores signals mapped to subcarriers via the FFT operation, and then restores a received bit stream via demodulation and decoding. The baseband processor 3*l*-20 and the RF processor 3*l*-10 transmit and receive signals as described above. Accordingly, each of the baseband processor 3*l*-20 and the RF processor 3*l*-10 may be referred to as a transmitter, a receiver, a transceiver, or a wireless communicator.

The backhaul communicator 3*l*-30 provides an interface for performing communication with other nodes in a network. That is, the backhaul communicator 3*l*-30 converts a bit stream transmitted from the base station to another node, for example, an auxiliary base station or a core network, into a physical signal, and converts the physical signal received from the other node into a bit stream.

The storage unit 3*l*-40 stores data such as a basic program, an application, and configuration information for the operation of the terminal. In particular, the storage unit 3*l*-40 may store information on bearers allocated to the connected terminal, measurement results reported from the connected terminal, and the like. In addition, the storage unit 3*l*-40 may store information serving as a criterion for determining whether to provide or interrupt multiple connections to the terminal. Then, the storage unit 3*l*-40 provides stored data in response to a request from the controller 3*l*-50.

The controller 3*l*-50 controls the overall operation of the terminal according to an embodiment of the disclosure. For example, the controller 3*l*-50 transmits and receives signals through the baseband processor 3*l*-20 and the RF processor 3*l*-10 or through the backhaul communicator 3*l*-30. In addition, the controller 3*l*-50 records and reads data in the storage unit 3*l*-40. To this end, the controller 3*l*-50 may include at least one processor.

The third embodiment of the disclosure is summarized as follows.

1. Main Points

Prioritizing the first packet of new QoS flow

The SDAP indicates to the PDCP whether expedited delivery shall apply to the SDAP PDU.

The PDCP submits the corresponding PDCP PDU to the lower layer ahead of PDCP PDUs waiting in the buffer. An expedited-delivery indication can be added to the PDCP header so that the receiver does not trigger the reordering timer but performs delivery to the upper layer immediately.

The RLC submits the corresponding RLC PDU to the lower layer ahead of RLC PDUs awaiting in the buffer.

In-sequence delivery during QoS flow remapping is preserved.

Assuming that QoS flow x is remapped from PDCP A to PDCP B (or from DRB A to DRB B), in-sequence delivery is broken if QoS flow x packet from PDCP A is delivered to the upper layer after a packet from PDCP B is delivered.

Therefore, the simplest solution is simply to discard such packets. The sequence is as follows.

1: An RRC message is received to relocate a QoS flow from DRB_old to DRB_new in a PDU session.

2: The RRC indicates QoS relocation to the SDAP entity.

3: The SDAP entity starts filtering for the QoS flow once the first packet of the QoS flow is received from the new DRB (thereafter, SDAP PDUs of the QoS flow are discarded from the old DRB).

2. Operations
UE: Camp on NR cell.
UE<->GNB: RRC connection establishment.
UE<-GNB: RRC connection reconfiguration.
  DRB1, DRB 2 and DRB 3 are established.
  DRB 1 is default DRB.
  QoS flows mapped to DRB 1 and QoS flows mapped to DRB 2 are indicated.
UE: SDAP SDU for QoS flow mapped to DRB 2 is received.
  The SDAP submits the SDAP PDU to the PDCP of the DRB2 w/o ED indication.
UE: An SDAP SDU for a new QoS flow is received by the SDAP.
  The SDAP submits the SDAP PDU to the PDCP of default DRB with ED indication.
  The PDCP allocates the PDCP SN for the PDCP SDU. If ED is indicated, the PDCP PDU is submitted to the lower layer with ED indication ahead of PDCP PDUs having a lower COUNT.
  RLC allocates RLC SN for the RLC SDU. If ED is indicated, the RLC SDU is submitted to the lower layer ahead of RLC PDUs with lower RLC SNs.
UE<-GNB: RRC connection reconfiguration with synchronous reconfiguration indication (i.e., HO command).
  QoS relocation is indicated for QoS flow 1 from DRB 2 to DRB 3.
  The RRC indicates to the SDAP entity that QoS flow 1 is relocated from DRB 2 to DRB 3.
  The SDAP receives QoS flow 1 packet from DRB 2, then delivers the packet to the upper layer.
  The SDAP receives QoS flow 1 packet from DRB 3, then delivers the packet to the upper layer and starts filtering (or discarding) QoS flow 1 packets from DRB 2.

The particular embodiments of the disclosure described and shown in the specification and the drawings have been presented to easily explain the technical contents of the embodiments of the disclosure and help understanding of the embodiments of the disclosure, and are not intended to limit the scope of the embodiments of the disclosure. Therefore, the scope of the disclosure should be construed to include, in addition to the embodiments disclosed herein, all changes and modifications derived on the basis of the technical idea of the disclosure.

The invention claimed is:

1. A method of operating a terminal, the method comprising:
  receiving, from a base station, a radio resource control (RRC) message comprising information indicating whether to use uplink data compression (UDC);
  receiving data from an upper application layer of the terminal;
  compressing the data and encrypting the compressed data;
  generating an uplink data compression (UDC) header and a service data adaptation protocol (SDAP) header together;
  generating a block to which the UDC header and the SDAP header are bonded in the encrypted data; and
  transmitting the block to a lower layer of the terminal.

2. The method of claim 1, wherein an encryption is not performed on the UDC header, and a compression is not performed on the SDAP header.

3. The method of claim 1, wherein the SDAP layer and the packet data convergence protocol (PDCP) layer of the terminal are configured as one first-layer device, and
  wherein a compression and an encryption of the data and bonding of the UDC header and the SDAP header are performed in the first-layer device.

4. The method of claim 1, wherein the RRC message further comprises information indicating at least one of a PDCP device, a bearer, an IP flow, or a quality of service (QoS) flow, to which the uplink data compression is applied.

5. A terminal comprising:
  a transceiver; and
  a controller configured to:
    receive a radio resource control (RRC) message comprising information indicating whether to use uplink data compression (UDC) from a base station,
    receive data from an upper application layer of the terminal,
    compress the data and encrypt the compressed data,
    generate an uplink data compression (UDC) header and a service data adaptation protocol (SDAP) header together,
    generate a block to which the UDC header and the SDAP header are bonded in the encrypted data, and
    transmit the block to a lower layer of the terminal.

6. The terminal of claim 5, wherein an encryption is not performed on the UDC header, and a compression is not performed on the SDAP header.

7. The terminal of claim 5, wherein the SDAP layer and the packet data convergence protocol (PDCP) layer of the terminal are configured as one first-layer device, and
  wherein a compression and an encryption of the data and bonding of the UDC header and the SDAP header are performed in the first-layer device.

8. The terminal of claim 5, wherein the RRC message further comprises information indicating at least one of a PDCP device, a bearer, an IP flow, or a quality of service (QoS) flow, to which the uplink data compression is applied.

9. A method of operating a base station, the method comprising:
  transmitting a radio resource control (RRC) message comprising information indicating whether to use uplink data compression (UDC) to a terminal;
  receiving first data from the terminal;
  obtaining an uplink data compression (UDC) header and a service data adaptation protocol (SDAP) header, which are bonded in the first data;
  decoding and decompressing second data from which the UDC header and the SDAP header are removed; and
  transmitting the decompressed second data to an upper layer of the base station.

10. The method of claim 9, wherein an encryption is not performed on the UDC header of the first data, and a compression is not performed on the SDAP header.

11. The method of claim 9, wherein the SDAP layer and the packet data convergence protocol (PDCP) layer of the base station are configured as one first-layer device, and
  wherein a decompression, a decryption of the second data and a removal of the UDC header and SDAP header are performed in the first-layer device.

12. The method of claim 9, wherein the RRC message further comprises information indicating at least one of a PDCP device, a bearer, an IP flow, or a quality of service (QoS) flow, to which the uplink data compression is applied.

13. A base station comprising:
  a transceiver; and
  a controller configured to:
    transmit a radio resource control (RRC) message comprising information indicating whether to use uplink data compression (UDC) to a terminal, receive first data from the terminal, obtain an uplink data compression (UDC) header and a service data adaptation protocol (SDAP) header, which are bonded in the first data, decode and decompress second data from which the UDC header and the SDAP header are removed, and transmit the decompressed second data to an upper layer of the base station.

14. The base station of claim 13, wherein an encryption is not performed on the UDC header of the first data, and a compression is not performed on the SDAP header.

15. The base station of claim 13, wherein the SDAP layer and the packet data convergence protocol (PDCP) layer of the base station are configured as one first-layer device, wherein a decompression, a decryption of the second data and a removal of the UDC header and SDAP header are performed in the first-layer device, and wherein the RRC message further comprises information indicating at least one of a PDCP device to which the uplink data compression is applied, a bearer, an IP flow, or a quality of service (QoS) flow.

* * * * *